United States Patent [19]
Haraguchi et al.

[11] Patent Number: 5,687,414
[45] Date of Patent: Nov. 11, 1997

[54] CAMERA ADAPTED TO FILM CARTRIDGE WITH A DEVICE TO DETERMINE IF IMAGE RECORDING MEDIUM IN CARTRIDGE IS DEVELOPED AND A DEVICE ALLOWING RE-PHOTOGRAPHY OF PHOTOGRAPHED IMAGE

[75] Inventors: Shosuke Haraguchi; Masakazu Taku, both of Kanagawa-ken, Japan

[73] Assignee: Canon Kabushiki Kaisha, Tokyo, Japan

[21] Appl. No.: 423,729

[22] Filed: Apr. 18, 1995

[30] Foreign Application Priority Data

Apr. 21, 1994 [JP] Japan ................... 6-105038
Apr. 21, 1994 [JP] Japan ................... 6-105040

[51] Int. Cl.⁶ .............. G03B 19/02; G03B 17/26
[52] U.S. Cl. ............ 396/391; 396/207; 396/515; 396/516; 396/538
[58] Field of Search ............ 354/21, 207, 208, 354/209, 275, 105, 106, 110, 111; 352/78 C; 396/389, 390, 391, 511, 512, 514, 515, 516, 538, 207, 567

[56] References Cited

U.S. PATENT DOCUMENTS

| | | | |
|---|---|---|---|
| 3,864,706 | 2/1975 | Urano | 354/209 |
| 3,970,380 | 7/1976 | Ashida et al. | 352/78 C |
| 4,168,896 | 9/1979 | Mielke | 354/209 |
| 4,232,957 | 11/1980 | Kovacs | 354/209 |
| 4,723,141 | 2/1988 | Hamada et al. | 354/209 |
| 5,032,861 | 7/1991 | Pagano | 354/275 |
| 5,083,155 | 1/1992 | Kataoka et al. | 354/275 |
| 5,229,810 | 7/1993 | Cloutier et al. | 354/106 |
| 5,296,887 | 3/1994 | Zander | 354/275 |
| 5,321,455 | 6/1994 | Cocca | 354/207 |
| 5,333,033 | 7/1994 | Blackman | 354/275 |

FOREIGN PATENT DOCUMENTS

| | | |
|---|---|---|
| 0482464 | 4/1992 | European Pat. Off. . |
| 4329486 | 5/1994 | Germany . |

Primary Examiner—A. A. Mathews
Attorney, Agent, or Firm—Robin, Blecker, Daley and Driscoll

[57] ABSTRACT

A camera adapted to use an image recording medium cartridge in which an image recording medium is contained or an apparatus adapted for this kind of camera includes a determination portion for determining whether the image recording medium contained in the image recording medium cartridge is already developed.

34 Claims, 45 Drawing Sheets

(STATE A)

(STATE B)

(STATE C)

(STATE D)

(STATE A)

(STATE B)

(STATE C)

(STATE D)

(STATE A)

(STATE B)

(STATE C)

(STATE D)

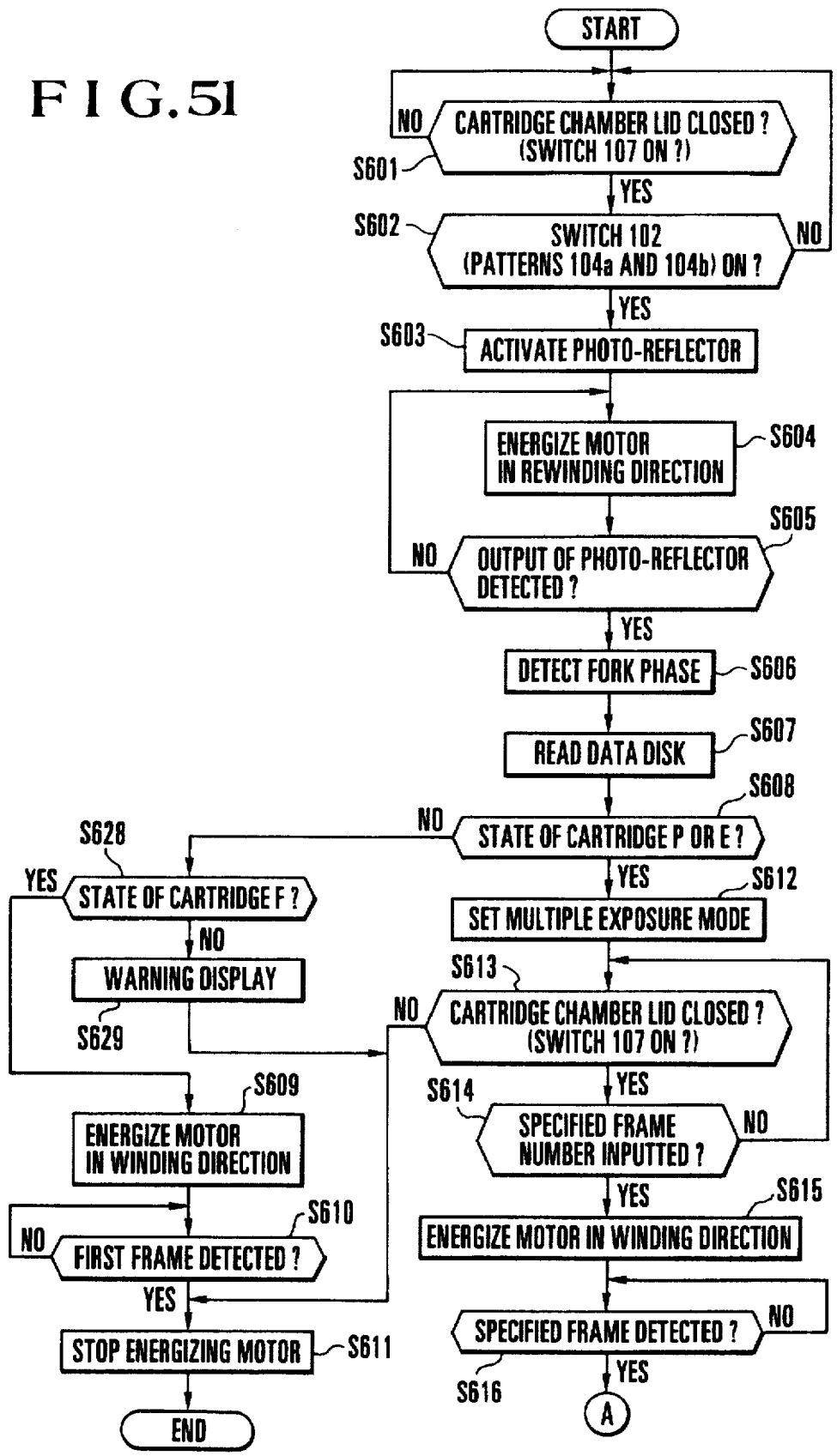
F I G. 51

CAMERA ADAPTED TO FILM CARTRIDGE WITH A DEVICE TO DETERMINE IF IMAGE RECORDING MEDIUM IN CARTRIDGE IS DEVELOPED AND A DEVICE ALLOWING RE-PHOTOGRAPHY OF PHOTOGRAPHED IMAGE

BACKGROUND OF THE INVENTION

1. Field of the Invention

The present invention relates to an improvement in an apparatus such as a camera adapted to use a film cartridge provided with means for displaying the state of film.

2. Description of the Related Art

Japanese Laid-Open Patent Application No. Hei 4-273240, etc., disclose a film cartridge which includes a data disk having a bar code indicative of various film information, such as the state of film (unexposed, partly exposed or fully exposed) and ISO information. The data disk is rotatable integrally with a film winding shaft of the film cartridge, and the various film information provided on the data disk can be read into a camera. The film cartridge further includes means which is rotatable integrally with the film winding shaft similarly to the data disk and which is arranged to visually display the state of the film (unexposed, partly exposed or fully exposed) toward a photographer according to a position (phase) in which the means is stopped. Since such film state displaying means (including the data disk) is driven by the film winding shaft, it can be driven by a film-winding-shaft driving mechanism provided in the camera. Accordingly, no special driving mechanism is needed and the state of the film can be automatically set by the camera.

However, the aforesaid film state displaying means does not at all display whether a film cartridge contains developed film, and the camera is incapable of appropriately coping with a developed-film cartridge.

SUMMARY OF THE INVENTION

It is, therefore, an object of the present invention to provide an arrangement which is capable of appropriately coping with an image recording medium cartridge in which a developed image recording medium is contained.

To achieve the above object, in accordance with one aspect of the present invention, there is provided a camera adapted to use an image recording medium cartridge in which an image recording medium is contained as well as an apparatus adapted for this kind of camera. Such camera includes a determination portion for determining whether the image recording medium contained in the image recording medium cartridge is already developed.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 51 is a flowchart showing a part of the operation of the camera according to the seventh embodiment of the present invention.

DETAILED DESCRIPTION OF THE PREFERRED EMBODIMENTS

Preferred embodiments of the present invention will be described below with reference to the accompanying drawings.

Figure 1:
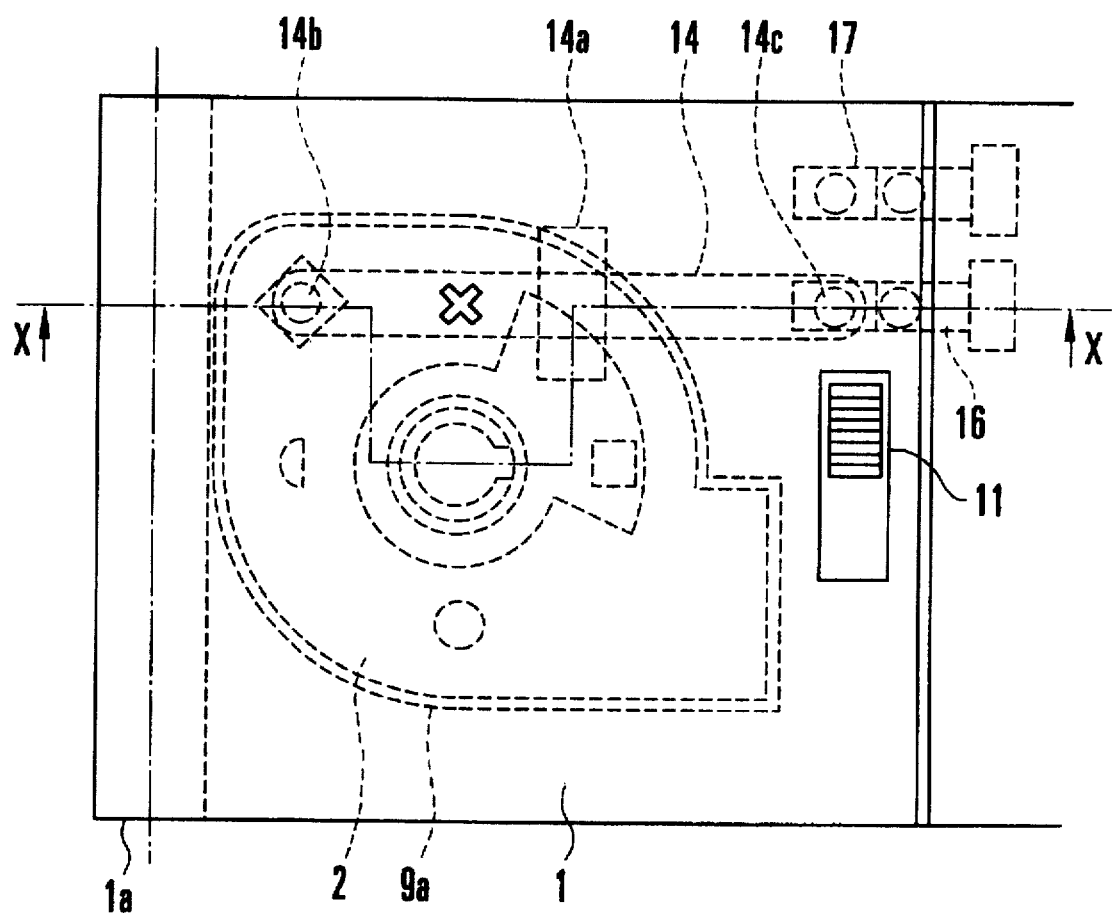
FIG. 1 is a schematic top plan view of a camera according to a first embodiment of the present invention, showing a state in which the cartridge chamber lid used in the camera is closed.
Figure 2:
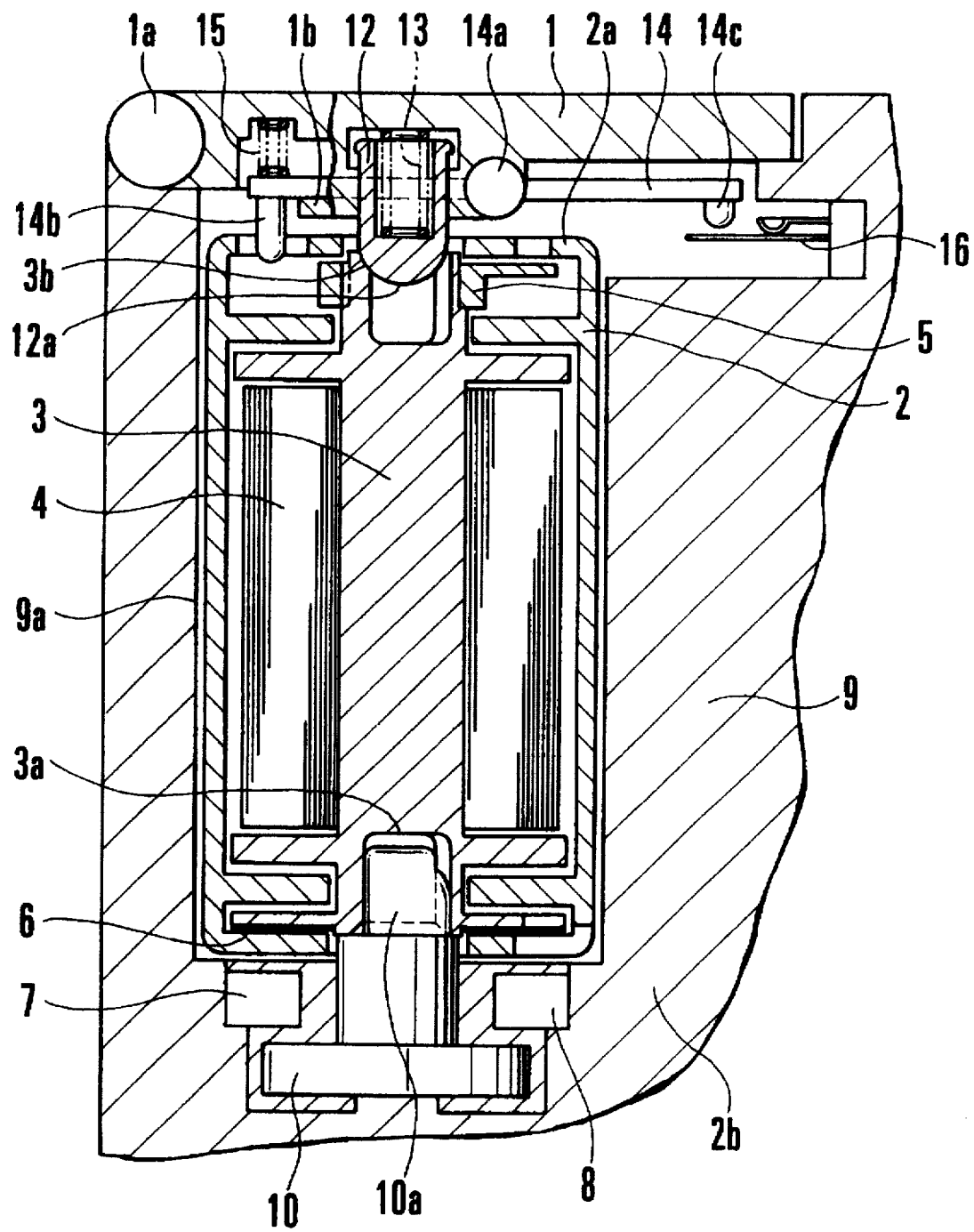
FIG. 2 is a sectional view taken along line X—X of FIG. 1, showing a state in which a film cartridge is loaded in the state D shown in FIG. 8.
Figure 3:
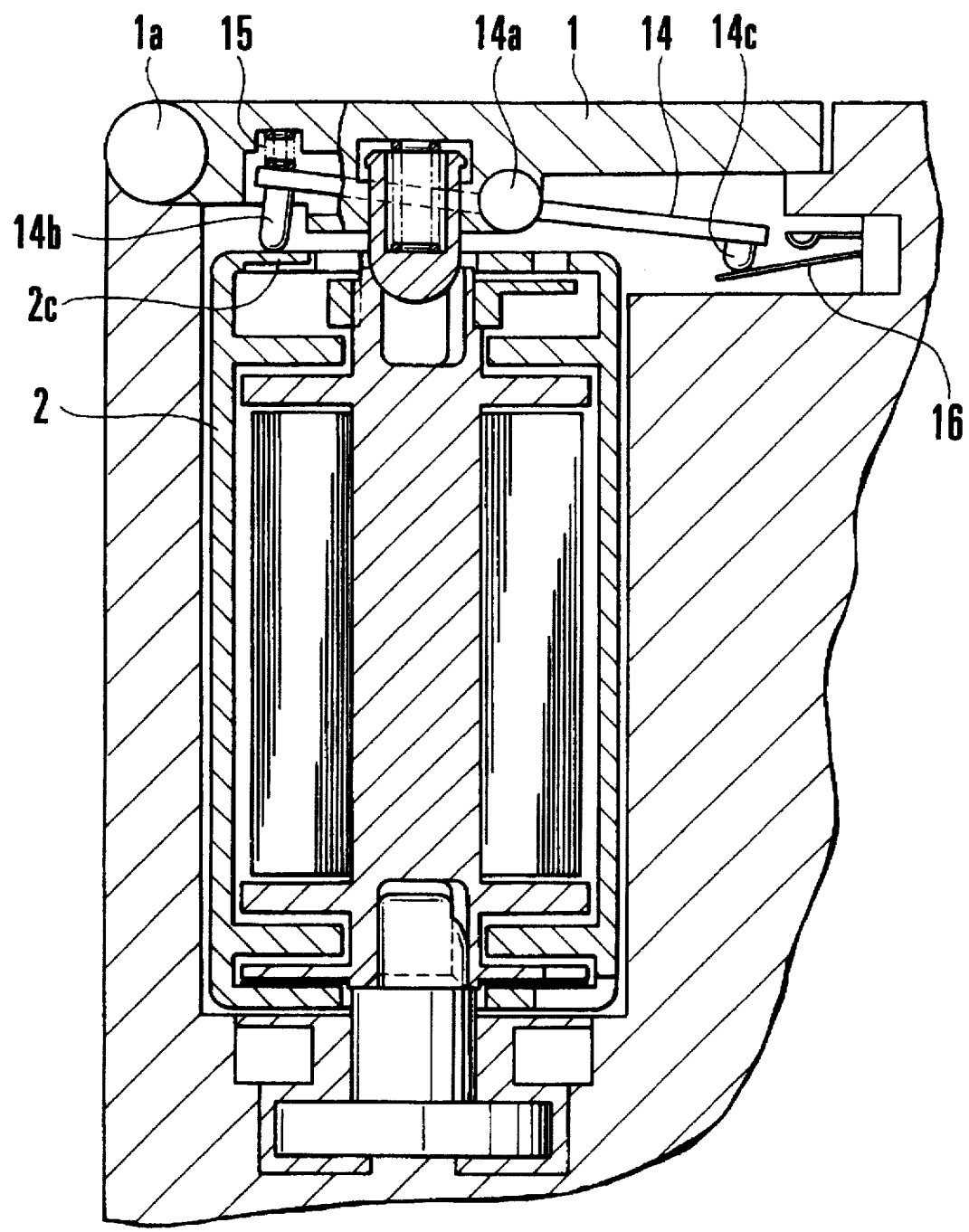
FIG. 3 is a sectional view taken along line X—X of FIG. 1, showing a state in which the film cartridge is loaded in each of the states A to C respectively shown in FIGS. 5 to 7.
Figure 4:
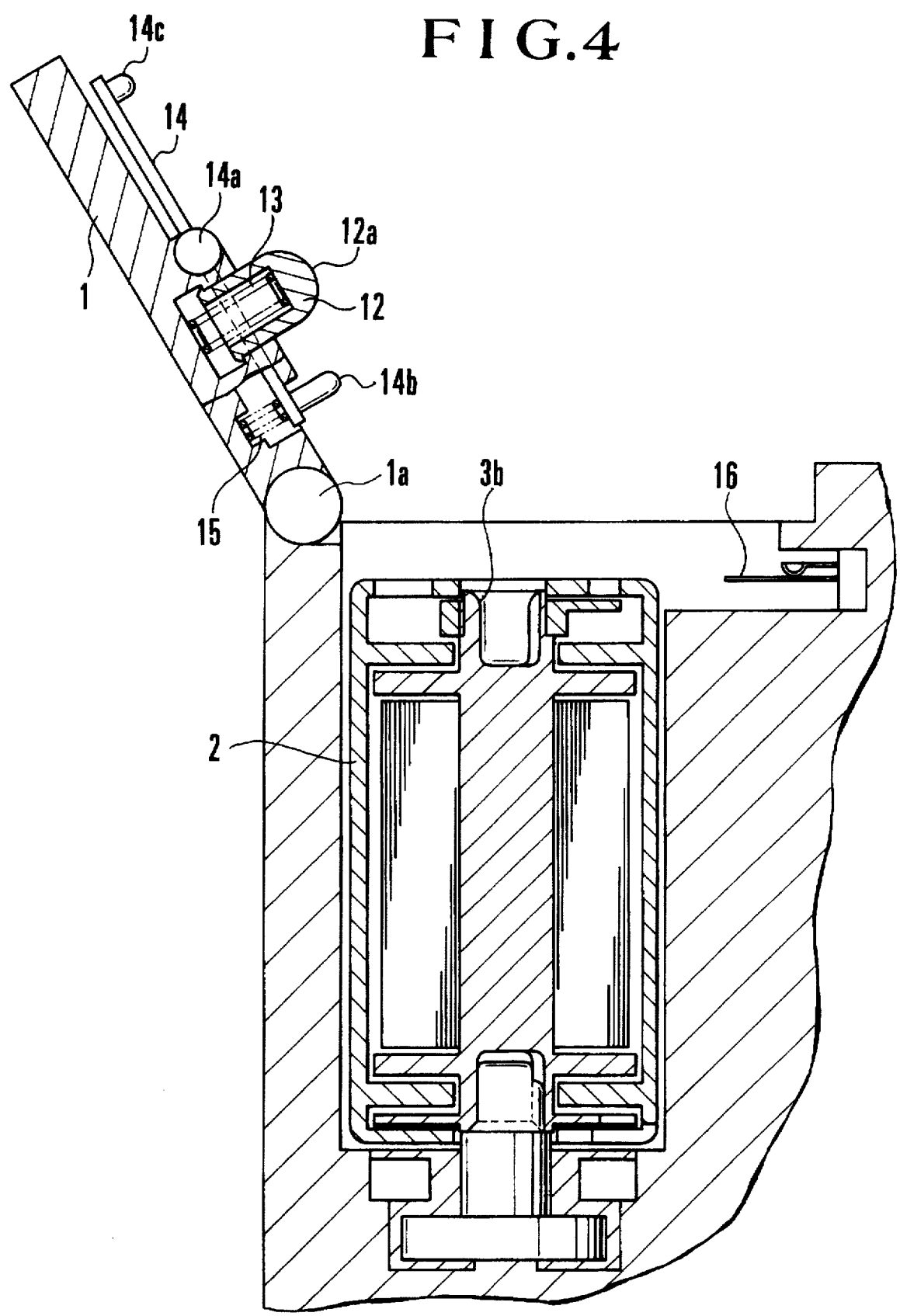
FIG. 4 is a sectional view taken along line X—X of FIG. 1, showing a state in which the cartridge chamber lid in the state of FIG. 2 is opened.
Figure 13:
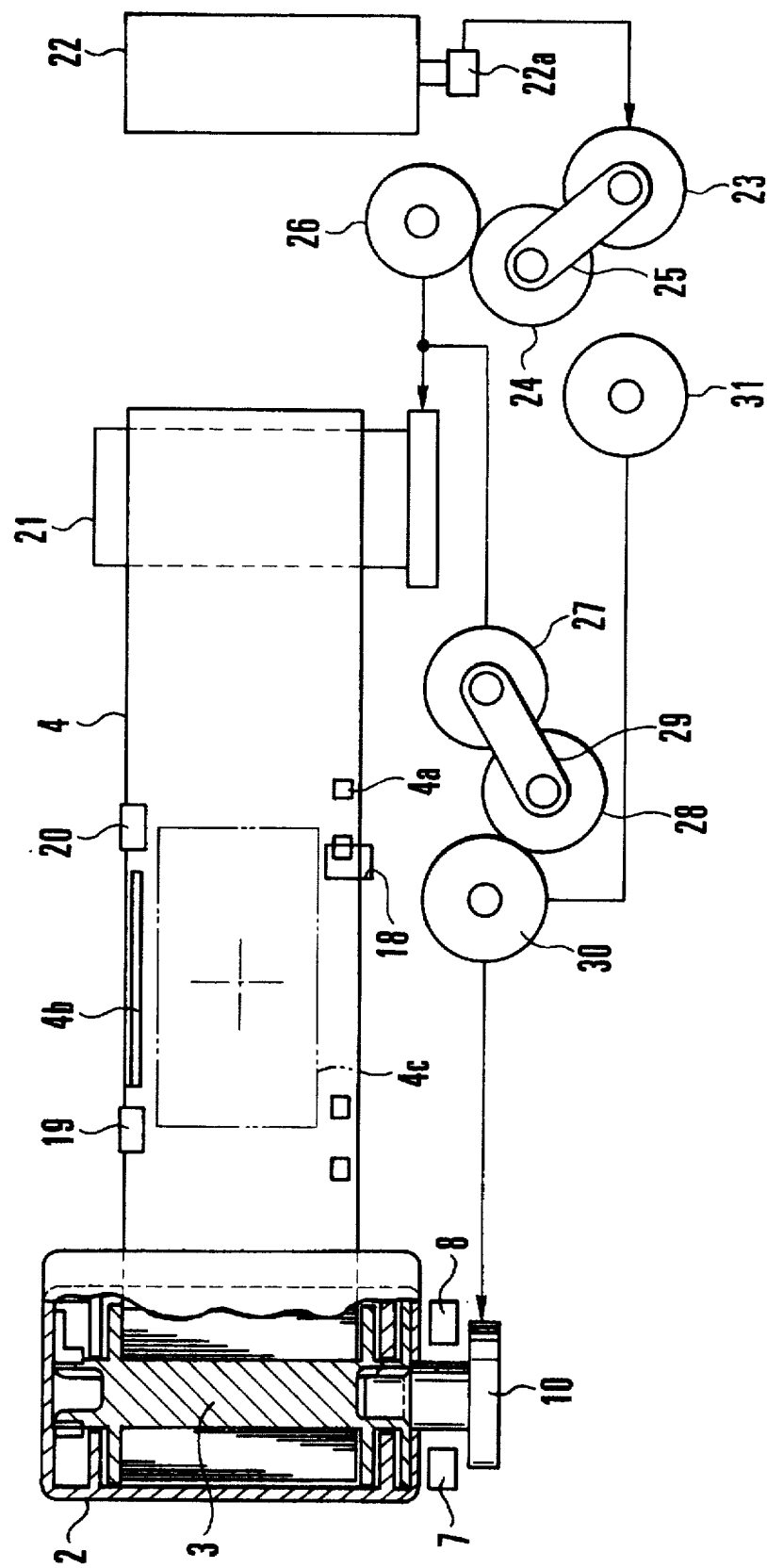
FIG. 13 is a schematic view showing a film transport mechanism provided in the camera according to the first embodiment of the present invention.
Figure 14:
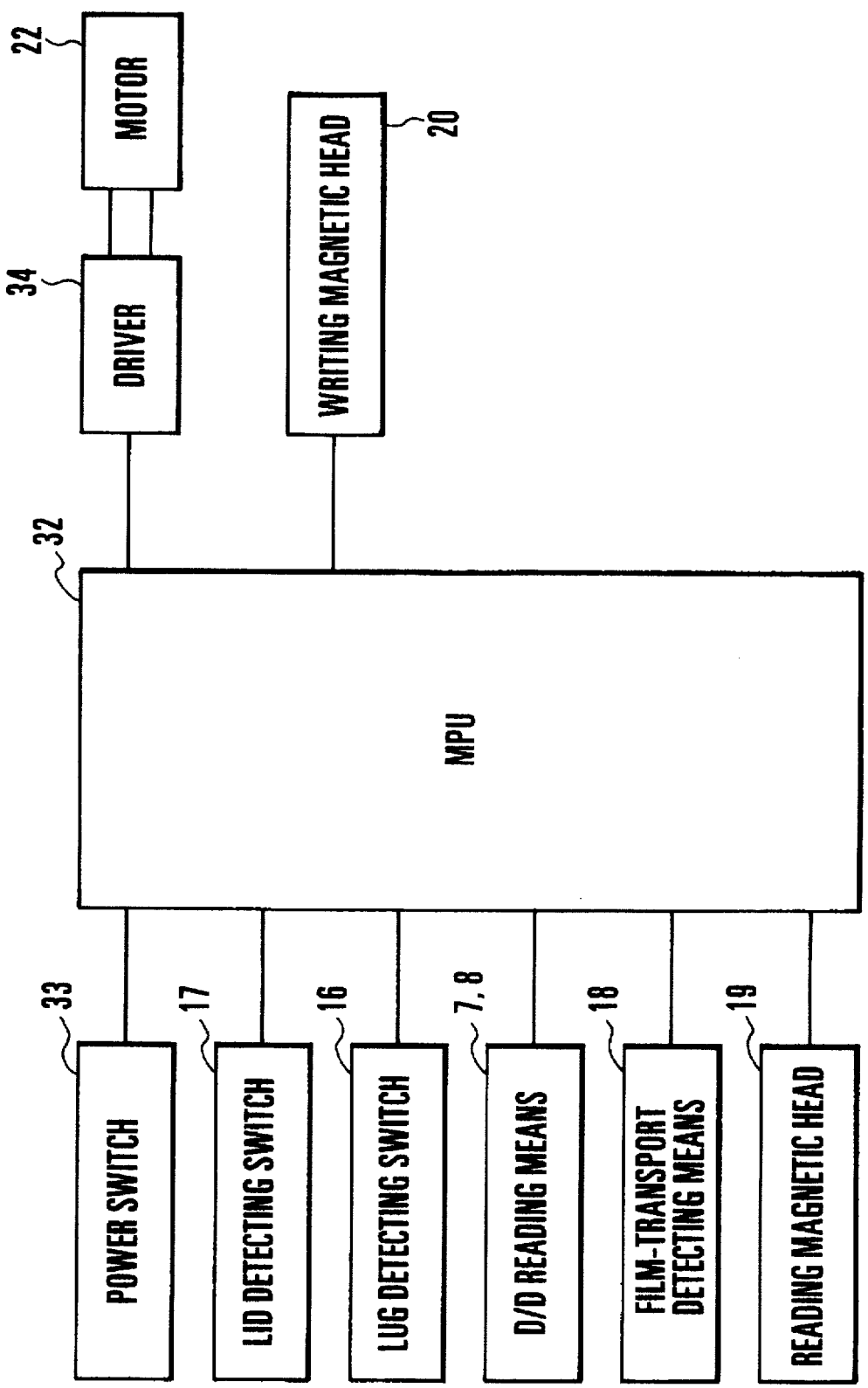
FIG. 14 is a block diagram showing the electrical arrangement of the camera according to the first embodiment of the present invention.
Figure 15:
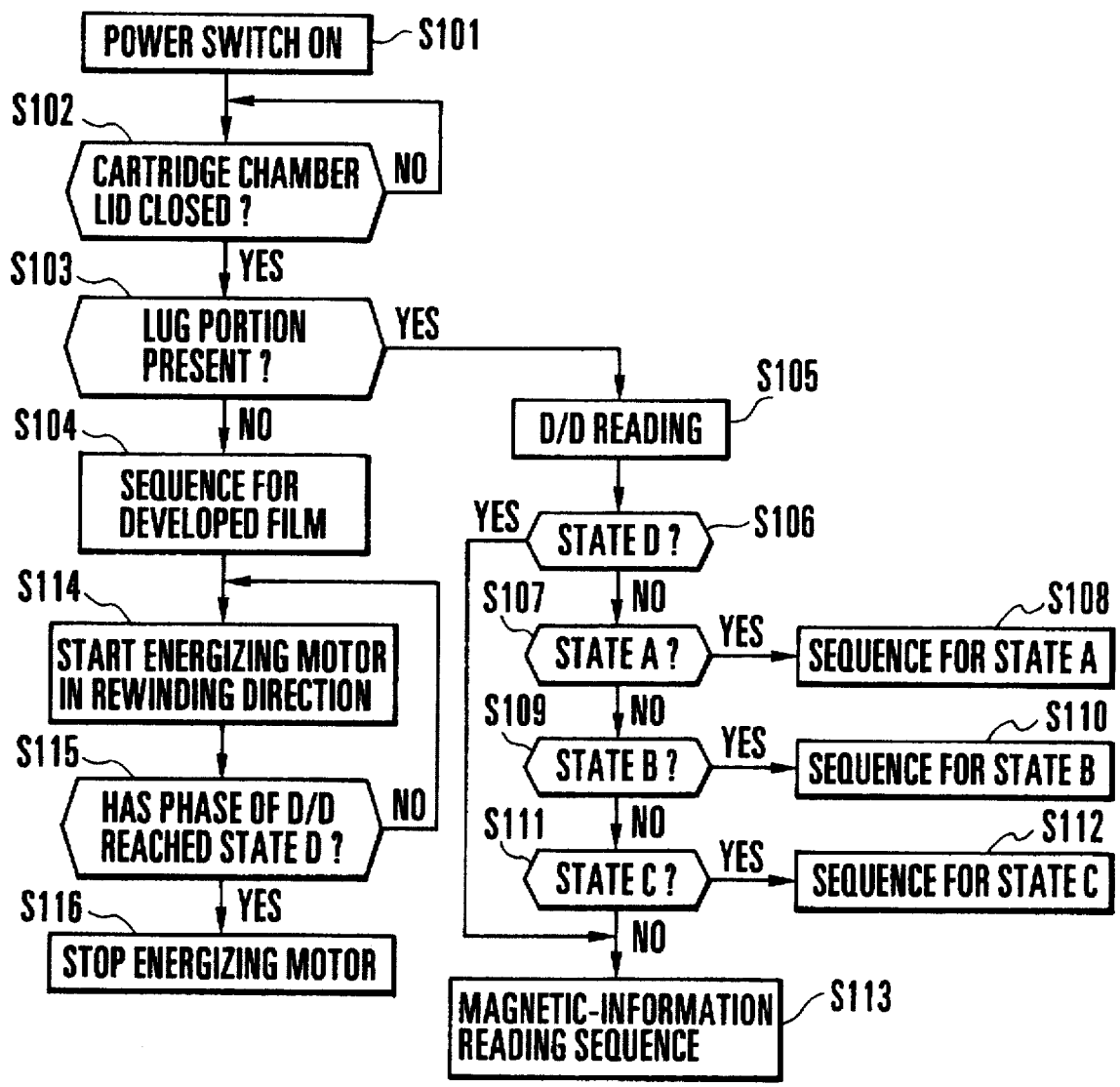
FIG. 15 is a flowchart of the MPU shown in FIG. 14.

FIGS. 1 to 15 are views showing a camera according to a first embodiment of the present invention. FIG. 1 is a schematic top plan view showing the camera with a cartridge chamber lid 1 closed, and FIGS. 2 to 4 are longitudinal sectional views showing the operation of the section of the camera taken along line X—X of FIG. 1. FIGS. 5 to 8 are views showing a top face 2a of the film cartridge 2, and FIGS. 9 to 12 are views showing a bottom face 2b of the film cartridge 2. FIG. 13 is a schematic view showing a film transport mechanism, FIG. 14 is a block diagram showing the electrical arrangement of the camera, and FIG. 15 is a flowchart of the MPU shown in FIG. 14.

The film cartridge 2 will be described below with reference to FIGS. 1, 2, 5 to 12 and others.

As shown in FIG. 2, a film winding shaft 3 is rotatably supported in the film cartridge 2 and a film 4 is wound around the film winding shaft 3. The film cartridge 2 also includes a color display member 5 which is rotatable integrally with the film winding shaft 3, and a data disk 6 having a bar-code pattern. The data disk 6 is attached to the film winding shaft 3 in such a manner as to be rotatable integrally therewith.

FIGS. 5 to 8 are views showing display means provided at the top face 2a of the film cartridge 2. The display means includes a lug portion 2c which is formed removably from the top face 2a, and display windows 2d, 2e, 2f and 2g are formed as cutouts in the top face 2a. The display windows 2d, 2e, 2f and 2g display a number of states of the film 4 according to the rotational phase in which the color display member 5 is stopped.

Figure 5:
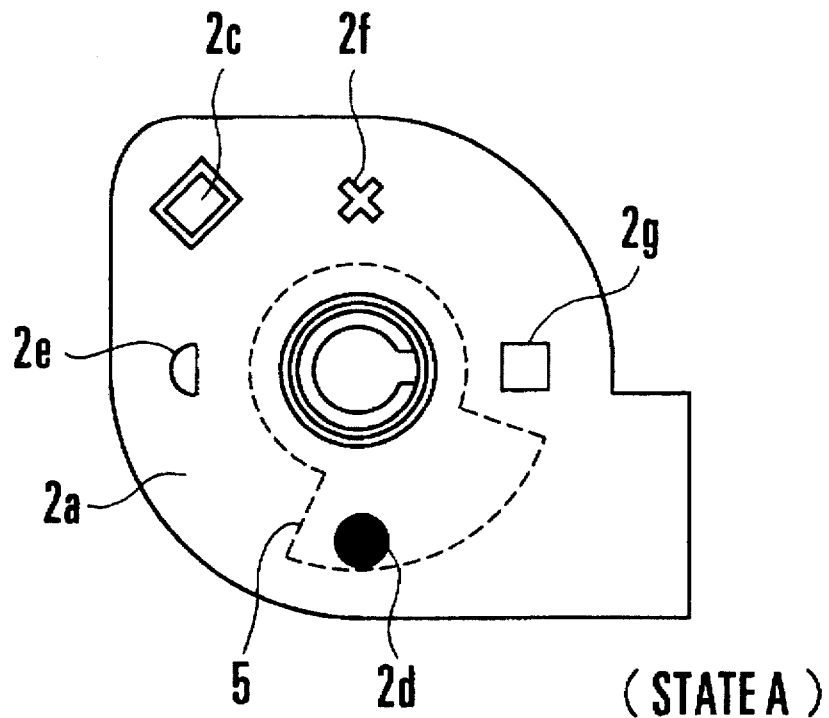
FIG. 5 is a top plan view of the film cartridge in the state A, which is used in the first embodiment of the present invention.
Figure 6:
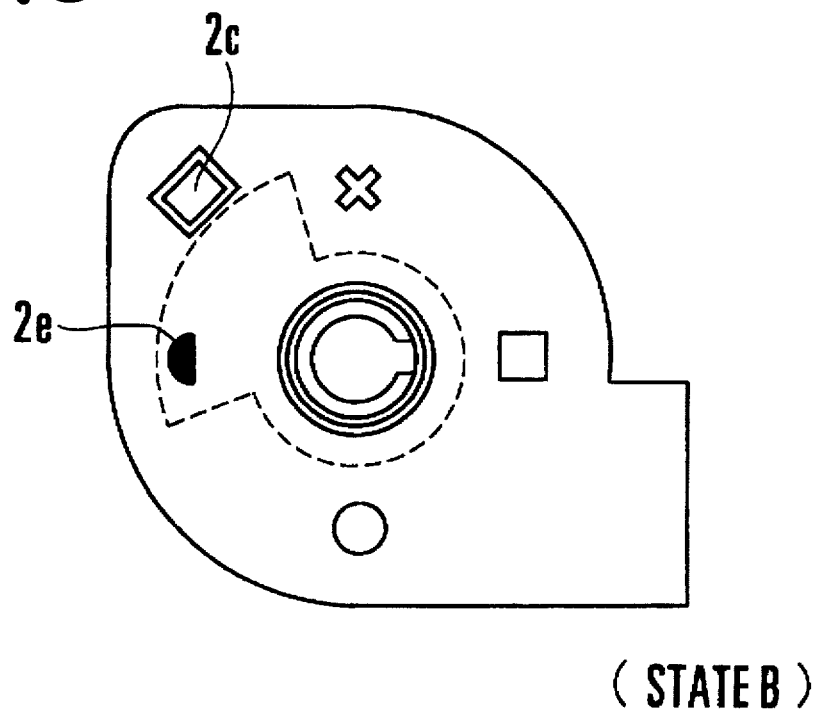
FIG. 6 is a top plan view of the film cartridge in the state B, which is used in the first embodiment of the present invention.
Figure 7:
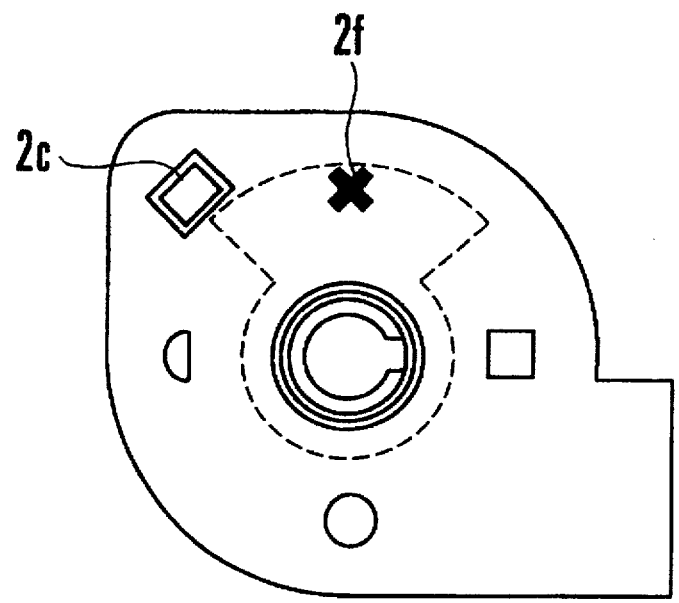
FIG. 7 is a top plan view of the film cartridge in the state C, which is used in the first embodiment of the present invention.
Figure 8:
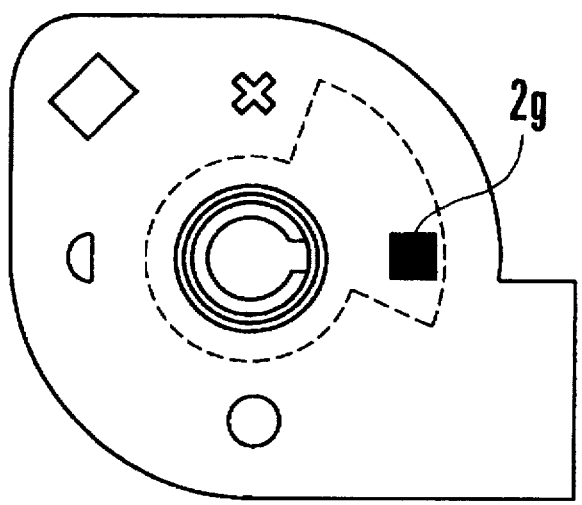
FIG. 8 is a top plan view of the film cartridge in the state D, which is used in the first embodiment of the present invention.

FIG. 5 shows the state in which the film 4 is unexposed, and the color display member 5 is stopped at a location where it is visible through the display window 2d, and the lug portion 2c is present. This state will be hereinafter referred to as the "state A". FIG. 6 shows the state in which the film 4 is exposed up to an intermediate frame. The color display member 5 is stopped at a location where it is visible through the display window 2e, and the lug portion 2c is still present. This state will be hereinafter referred to as the "state B". FIG. 7 shows the state in which the film 4 is exposed up to the last frame, and the color display member 5 is stopped at a location where it is visible through the display window 2f, and the lug portion 2c is still present. This state will be hereinafter referred to as the "state C". FIG. 8 shows the state in which the film 4 is developed, and the color display member 5 is stopped at a location where it is visible through the display window 2g. To clearly display the developed state of the film 4, the lug portion 2c is removed, i.e., absent. This state will be hereinafter referred to as the "state D".

FIGS. 9 to 12 are views showing display means provided at the bottom face 2b of the film cartridge 2. The display means includes display windows 2h and 2i through which the data disk 6 is exposed. The data disk 6 also has a cutout portion 6a, the function of which will be described later. Photo-reflectors 7 and 8 (shown as OPT in FIGS. 9 to 12) are provided as reading means for reading the data disk 6. To determine in which of the states A to D the film cartridge 2 is placed, the photo-reflectors 7 and 8 function to detect an initial phase in which the film cartridge 2 is placed when it is loaded into the camera and to detect a phase to which the data disk 6 is set when the film cartridge 2 is to be removed from the camera. Specifically, while the data disk 6 is being rotated, detection is performed of the cutout portion 6a, and when the cutout portion 6a is detected, the number of pulses starts to be counted and the state of the film cartridge 2 is detected on the basis of the counted number of pulses. The detailed description thereof is omitted.

FIGS. 9 to 12 respectively correspond to FIGS. 5 to 8 and show the states A, B, C and D.

As first state displaying means the display state of which is determined by the stop phase of the film winding shaft 3, the top face 2a and the bottom face 2b respectively have state displaying means to be used for visual check and state displaying means to be used for control, as described above. As second state displaying means, the top face 2a has the lug portion 2c which can be removed and which does not interlock with the film winding shaft 3. The film winding shaft 3 also has a safety mechanism which allows the film winding shaft 3 to rotate only when the film cartridge 2 is loaded into a cartridge chamber. The description of the safety mechanism is omitted herein for the sake of simplicity.

The arrangement and construction of the cartridge chamber into which to load the film cartridge 2 in its axial direction will be described below.

Referring to FIG. 2, a camera body 9 has a cartridge chamber 9a which is formed so that the film cartridge 2 can be inserted into it. A driving member 10 is rotatably supported by the camera body 9. The driving member 10 has an engaging portion 10a having the function of engaging with an engaging portion 3a of the film winding shaft 3 and transmitting a rotational force to the film winding shaft 3 as well as the function of positioning the film winding shaft 3 in both thrust and radial directions thereof. A method of driving the driving member 10 will be described later.

The cartridge chamber lid 1 is supported for swinging movement about a rotating shaft 1a with respect to the camera body 9. The cartridge chamber lid 1 can be opened by sliding the operating member 11 shown in FIG. 1 and releasing a lock mechanism (not shown). It will be readily anticipated by those skilled in the art that various kinds of prior art can be used as the lock mechanism for the cartridge chamber lid 1. The description of such prior art is, therefore, omitted herein. A pressure member 12 (refer to FIGS. 2 and 4) is secured to the cartridge chamber lid 1. The pressure member 12 is urged by a spring 13 to hold an abutment portion 12a in abutment with an abutment portion 3b of the film winding shaft 3 and force the film winding shaft 3 against the engaging portion 10a of the driving member 10 by the action of the urging force of the spring 13, thereby positioning the film winding shaft 3 in the thrust direction and the abutment portion 3b in the radial direction. A lug detecting lever 14 is supported for swinging movement about a rotating shaft 14a with respect to the cartridge chamber lid 1. The lug detecting lever 14 is urged in the counterclockwise direction (as viewed in FIG. 2) by a spring 15 and is held in abutment with a stopper 1b. A lug detecting part 14b detects the presence or absence of the lug portion 2c of the film cartridge 2 with the cartridge chamber lid 1 being closed. A lug detecting switch 16 is secured to the camera body 9 and is actuated by a switching projection 14c of the lug detecting lever 14.

The lid detecting switch 17 shown in FIG. 1 is provided for detecting whether the cartridge chamber lid 1 has been opened or closed. Although the description of its specific arrangement is omitted herein, the lid detecting switch 17 may be of a type which directly detects whether the cartridge chamber lid 1 has been opened or closed or of a type which interlocks with the looking operation of the lock mechanism which interlocks with the operating member 11.

The opening and closing operations of the cartridge chamber lid 1 will be described below.

FIG. 2 shows the state in which the film cartridge 2 in the state D shown in FIG. 8 is loaded and the cartridge chamber lid 1 is closed. FIG. 3 shows the state in which the film cartridge 2 in any of the states A, B and C shown in FIGS. 5, 6 and 7 is loaded and the cartridge chamber lid 1 is closed. FIG. 4 is a view showing the open state of the cartridge chamber lid 1.

When the cartridge chamber lid 1 is in the open state shown in FIG. 4, the lug detecting switch 16 is closed as shown. If the cartridge chamber lid 1 is closed with the film cartridge 2 being unloaded or with the film cartridge 2 being loaded in the state shown in FIG. 2, the lug detecting switch 16 remains closed. As can be seen from FIG. 2, if the film cartridge 2 is absent in the cartridge chamber 9a or the film cartridge 2 is loaded in the state D with the lug portion 2c removed, the lug detecting part 14b is not placed in abutment with anything so that the switching projection 14c is not brought into abutment with the lug detecting switch 16.

If the cartridge chamber lid 1 is closed in the state shown in FIG. 3, the lug detecting switch 16 is opened. As shown, the lug detecting part 14b is placed in abutment with the lug portion 2c of the film cartridge 2 and the lug detecting lever 14 is turned in the clockwise direction (as viewed in FIG. 3) against the urging force of the spring 15, whereby the lug detecting switch 16 is opened by being pressed by the switching projection 14c. When the lug detecting switch 16 is opened, the MPU (to be described later) of the camera detects the presence of the lug portion 2c. In other words, with the lug detecting switch 16, it is possible to realize means for detecting not only whether the film cartridge 2 has been loaded, but also whether the film cartridge 2 having the lug portion 2c (the film cartridge 2 in any state other than the state D) has been loaded.

The film transport mechanism will be described below with reference to FIG. 13.

Feeding and rewinding of the film 4 can be carried out by rotating the film winding shaft 3 in the film cartridge 2. If the film winding shaft 3 continues to be rotated in the direction of rewinding of the film 4, the film 4 is completely rolled in the film cartridge 2. However, if the film winding shaft 3 is rotated in the direction of feeding of the film 4 when it is completely rolled, the leader part of the film 4 is fed from the film cartridge 2. Accordingly, since the film cartridge 2 can be loaded into, or unloaded from, the cartridge chamber 9a with the leader part rolled therein, it is possible to realize excellent operability.

In the film transport mechanism shown in FIG. 13, film-transport detecting means 18, specifically a photo-reflector, is provided for detecting perforations 4a. A magnetic head 19 for information reading and a magnetic head 20 for information writing are provided for reading and writing magnetic information 4b from and to a magnetic coating formed on the film 4, respectively. Reference numeral 4c denotes a photographic picture area. A film winding spool 21 has the function of winding the film 4 toward the right as viewed in FIG. 13. A motor 22 can be driven to rotate in the forward and reverse directions. A pinion 22a is fixed to the output shaft of the motor 22 to transmit the output (power) of the motor 22 to a sun gear 23 via a speed reducing gear train (not shown). A planetary gear 24 is supported by a planetary arm 25 so that it can revolve around the sun gear 23 while meshing therewith. FIG. 13 shows a case where the sun gear 23 rotates in the clockwise direction (as viewed in FIG. 13). As shown, the planetary gear 24 meshes with a gear 26 and the rotation of the gear 26 is transmitted to the film winding spool 21, thereby winding the film 4 and, at the same time, rotating a sun gear 27 in the clockwise direction (as viewed in FIG. 13).

A planetary gear 28 meshes with a gear 30, and the sun gear 27 meshes with the planetary gear 28 via a planetary arm 29. As the sun gear 27 rotates in the clockwise direction, the planetary gear 28 rotates the gear 30 in the clockwise direction and the power acts as a force to rotate the driving member 10 in the direction of feeding of the film 4, via a transmission gear (not shown). In this case, the speed at which the film 4 is wound around the film winding spool 21 is selected to be faster than the speed at which the film 4 is fed by the driving member 10. Accordingly, during an initial film-feeding period, the film 4 is driven by the driving member 10, but when the film 4 is wrapped around the film winding spool 21, winding of the film 4 is performed by the film winding spool 21. The difference between the aforesaid speeds is absorbed by the planetary gear 28 moving away from the gear 30 (i.e., revolving in the counterclockwise direction). As such an absorbing mechanism, a known one-way clutch may also be used.

A case where the motor 22 is driven in the direction in which the sun gear 23 rotates in the counterclockwise direction will be described below in brief. In this case, the planetary arm 25 revolves in the counterclockwise direction and meshes with a gear 31 to rotate the gear 30 in the counterclockwise direction. The rotation of the gear 30 drives the film winding shaft 3 via the driving member 10 to drive the film 4 in the direction in which the film 4 is rewound.

FIG. 14 is a block diagram showing a control circuit system of the camera according to the first embodiment. Incidentally, FIG. 14 shows only constituent elements of the camera which are associated with the first embodiment.

In the control circuit system shown in FIG. 14, an MPU 32 is arranged to receive input signals from a power switch 33, the lid detecting switch 17, the lug detecting switch 16, the photo-reflectors (or D/D reading means) 7 and 8 for performing reading from the data disk 6, the film-transport detecting means 18, and the reading magnetic head 19.

The MPU 32 outputs a signal for causing a driver 34 to drive the motor 22 in the forward and reverse directions as well as a signal for controlling the writing magnetic head 20.

The operation of the camera according to the first embodiment will be described below with reference to the flowchart of the MPU 32, which is shown in FIG. 15.

If the power switch 33 is turned on in Step S101, it is determined in Step S102 whether the lid detecting switch 17 has detected the closed state of the cartridge chamber lid 1. If the lid detecting switch 17 detects the closed state of the cartridge chamber lid 1, the process proceeds to Step S103, in which a decision is made as to the state of the lug detecting switch 16. If the lug portion 2c has been removed from the film cartridge 2 as shown in FIG. 2 and the lug detecting switch 16 remains closed, it is determined that the film cartridge 2 is in the state D shown in FIG. 8. Then, the process proceeds to Step S104, in which the process starts a sequence for developed film. Specifically, this sequence includes a number of modes such as a mode for causing the reading magnetic head 19 to read the magnetic information 4b for display purposes, a mode for allowing the writing magnetic head 20 to rewrite the magnetic information 4b, and a mode for enabling a developed frame of the film 4 to be visually displayed.

If the predetermined sequence (mode) is completed in Step S104, the process proceeds to Step S114. Steps S114 to S116 constitute a sequence for setting the rotational phase of the data disk 6 to the state D (developed film). Specifically, in Step S114, energization of the motor 22 is started so that the motor 22 can rotate in the film rewinding direction (if the last of the sequence of Step S104 is film rewinding, the energization of the motor 22 may also be continued in Step S114). Then, the process proceeds to Step S115, in which the D/D reading means 7 and 8 are used to detect whether the rotational phase of the data disk 6 has reached the state D shown in FIG. 12. If it is not detected that the rotational phase of the data disk 6 has reached the state D, the process returns to Step S114 and a similar operation is repeated. If it is detected in Step S115 that the rotational phase of the data disk 6 has reached the state D shown in FIG. 12, the process proceeds to Step S116, in which the energization of the motor 22 is stopped to set the rotational phase of the data disk 6 to the state D, and the sequence is terminated. The aforesaid phase detection in Step S115 is performed while taking account of the amount overrun of the data disk 6 which is caused by, for example, the inertia of the motor 22, etc., at the time of stop of the energization in Step S116. The detailed description thereof is omitted herein.

Figure 12:
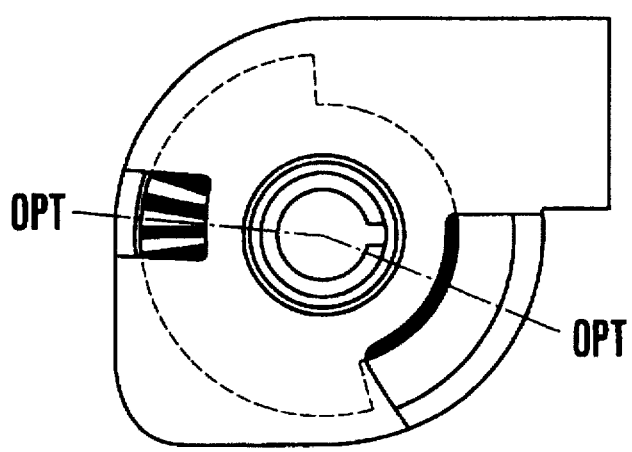
FIG. 12 is a bottom plan view of the film cartridge in the state D, which is used in the first embodiment of the present invention.

It is to be noted that if a developed-film cartridge is loaded with the first state displaying means displaying any state other than the state D shown in FIGS. 8 and 12, the above-described sequence corrects the state of the first state displaying means and comes to an end. Accordingly, it is possible to prevent an accident from occurring at a later time; for example, users can avoid mistakenly employing a developed-film cartridge during photography.

If it is determined in Step S103 that the lug detecting switch 16 has been opened via the lug detecting lever 14 because of the absence of the lug portion 2c of the film cartridge 2 as shown in FIG. 3, the process proceeds to Step S105, in which reading from the data disk 6 is performed. Specifically, the motor 22 is energized to cause the driving member 10 to rotate the film winding shaft 3 in the direction in which the film 4 is rewound, thereby rotating the data disk 6 in the counterclockwise direction as viewed in FIGS. 9 to 12. During this time, the photo-reflectors (D/D reading means) 7 and 8 read the bar code pattern of the data disk 6, thereby reading fixed information (the prescribed number of exposures of film, ISO information and the like) relative to various kinds of photography, indicated by the bar code. At the same time, a decision is made as to which of the states A to D shown in FIGS. 9 to 12 was the initial phase of the data disk 6. Of course, in this method, since it is impossible to again perform reading for determining the initial phase, it is necessary to increase the reliability of signal detection.

Then, the process proceeds to Step S106, in which it is determined whether the reading result provided by the D/D reading means 7 and 8 (D/D reading result) in Step S105 is the state D of FIG. 12. If the D/D reading result is the state D, the process proceeds to Step S113.

Figure 9:
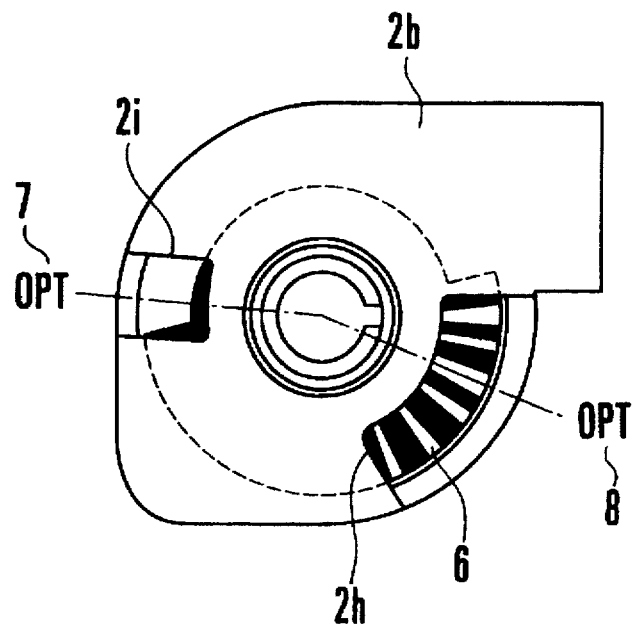
FIG. 9 is a bottom plan view of the film cartridge in the state A, which is used in the first embodiment of the present invention.

If the D/D reading result obtained in Step S105 is the state A shown in FIG. 9, the process proceeds through Steps S106 and S107 to Step S108 to start a sequence for the state A. Specifically, the sequence for the state A is a general photography sequence for unexposed film.

Figure 10:
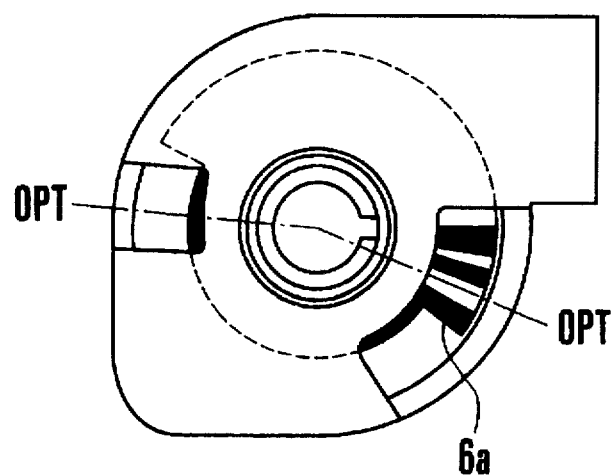
FIG. 10 is a bottom plan view of the film cartridge in the state B, which is used in the first embodiment of the present invention.

If the D/D reading result obtained in Step S105 is the state B shown in FIG. 10, the process proceeds through Steps S106, S107 and S109 to Step S110 to start a sequence for the state B. Specifically, the sequence for the state B is a sequence for film exposed up to an intermediate frame. In this sequence, the magnetic information 4b on the film 4 is read by the reading magnetic head 19 and it is determined that a frame for which the magnetic information 4b is present has been exposed, and the film 4 is continuously fed to a frame for which the magnetic information 4b is absent. After a starting frame has been located in this manner, the process proceeds to the general photography sequence.

Figure 11:
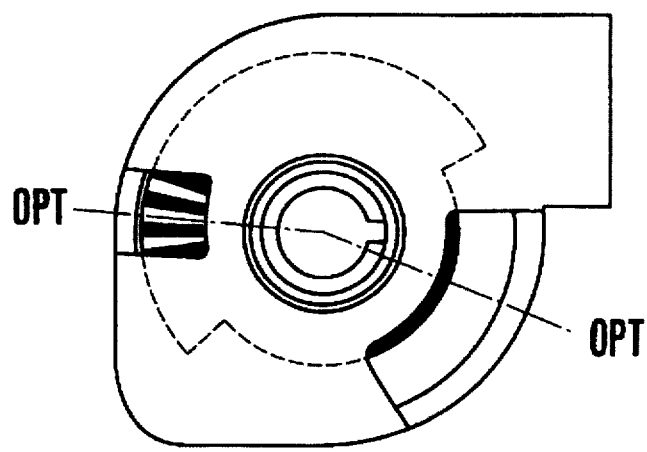
FIG. 11 is a bottom plan view of the film cartridge in the state C, which is used in the first embodiment of the present invention.

If the D/D reading result obtained in Step S105 is the state C shown in FIG. 11, the process proceeds to Step S112 through Steps S106, S107, S109 and S111. In Step S112, a sequence for the state C is started. Specifically, the sequence for the state C is a sequence for exposed film, which allows only reading and rewriting of the magnetic information 4b and inhibits photography.

If it is impossible to make a decision as to the A to D states from the D/D reading result obtained in Step S105, the process proceeds to Step S113.

Step S113 serves as the last means for making a decision as to the states A to D and is provided for reading the magnetic information 4b through the reading magnetic head 19 and making a decision as to a history of photography. Specifically, since it has been determined in Step S103 that the film cartridge 2 is in the state D, by the second state detecting means (the lug detecting switch 16) for detecting the second state displaying means (the lug portion 2c), the film cartridge 2 ought to be in any of the states A, B and C in Step S105. Accordingly, no contradiction occurs if it is determined in Steps S107, S109 and S111 that the film cartridge 2 is in any of the states A, B and C, as described above, through the first state detecting means (the photo-reflectors 7 and 8) for the first state displaying means. Thus, the process can proceed to the next sequence.

However, if it is determined in Step S106 that the film cartridge 2 is in the state D, this indicates that a contradiction has occurred, whereas if no decision has yet been made as to the states A to D, an abnormality may have occurred. In such a case, the process proceeds to Step S113, in which the magnetic information 4b is read from the film 4. If the magnetic information 4b is not at all detected, it is determined that the film cartridge 2 is in the state A (unexposed film). If the magnetic information 4b is detected up to an intermediate frame, it is determined that the film cartridge 2 is in the state B (film exposed up to an intermediate frame). If the magnetic information 4b is detected from all frames, it is determined that the film cartridge 2 is in the state C (exposed film).

As is apparent from the above description, it is possible to realize a secure backup system even if the reliability of the first state detecting means is imperfect.

Figure 16:
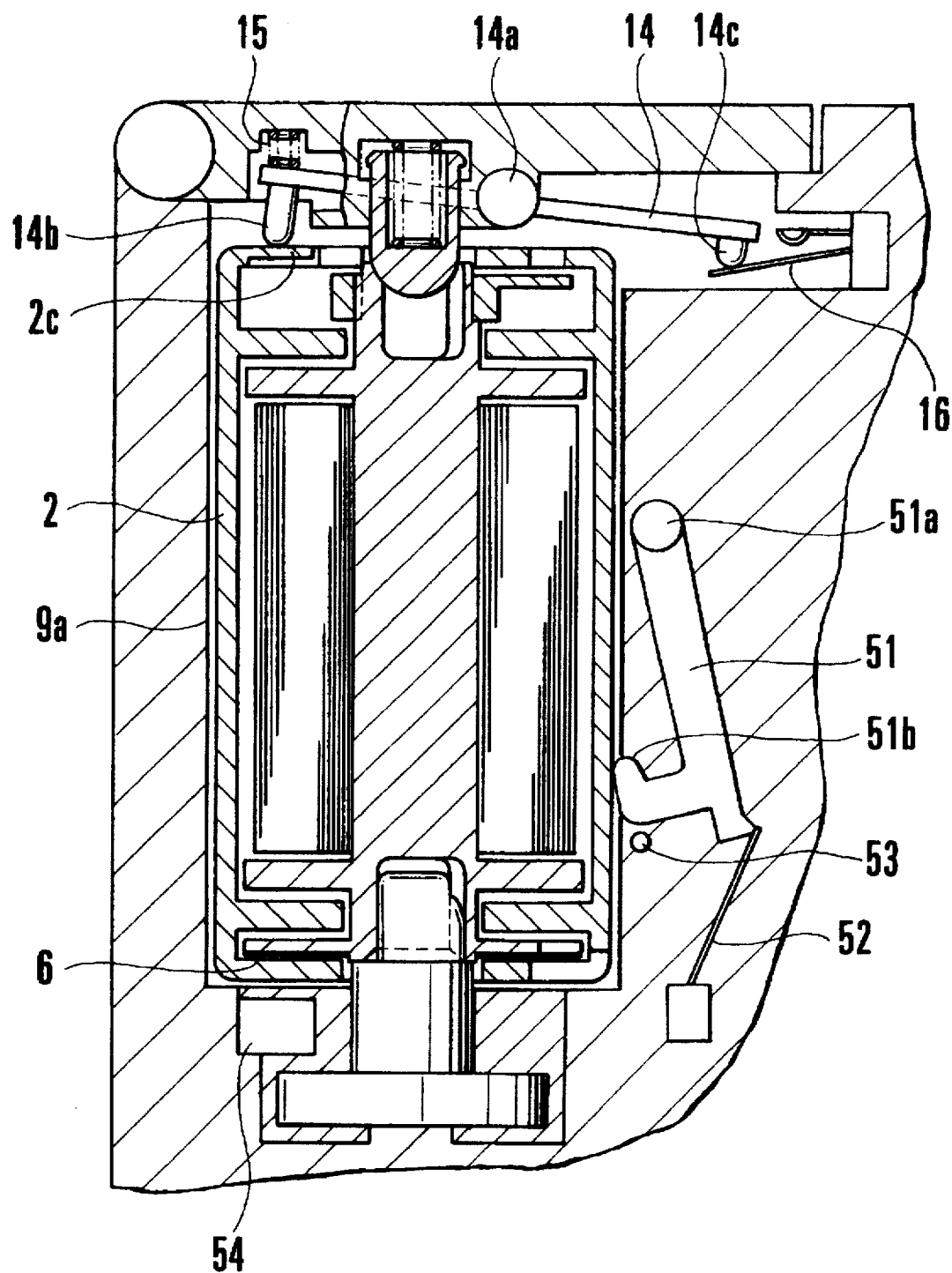
FIG. 16 is a cross-sectional view showing a state in which the film cartridge is loaded in a camera according to a second embodiment of the present invention.
Figure 17:
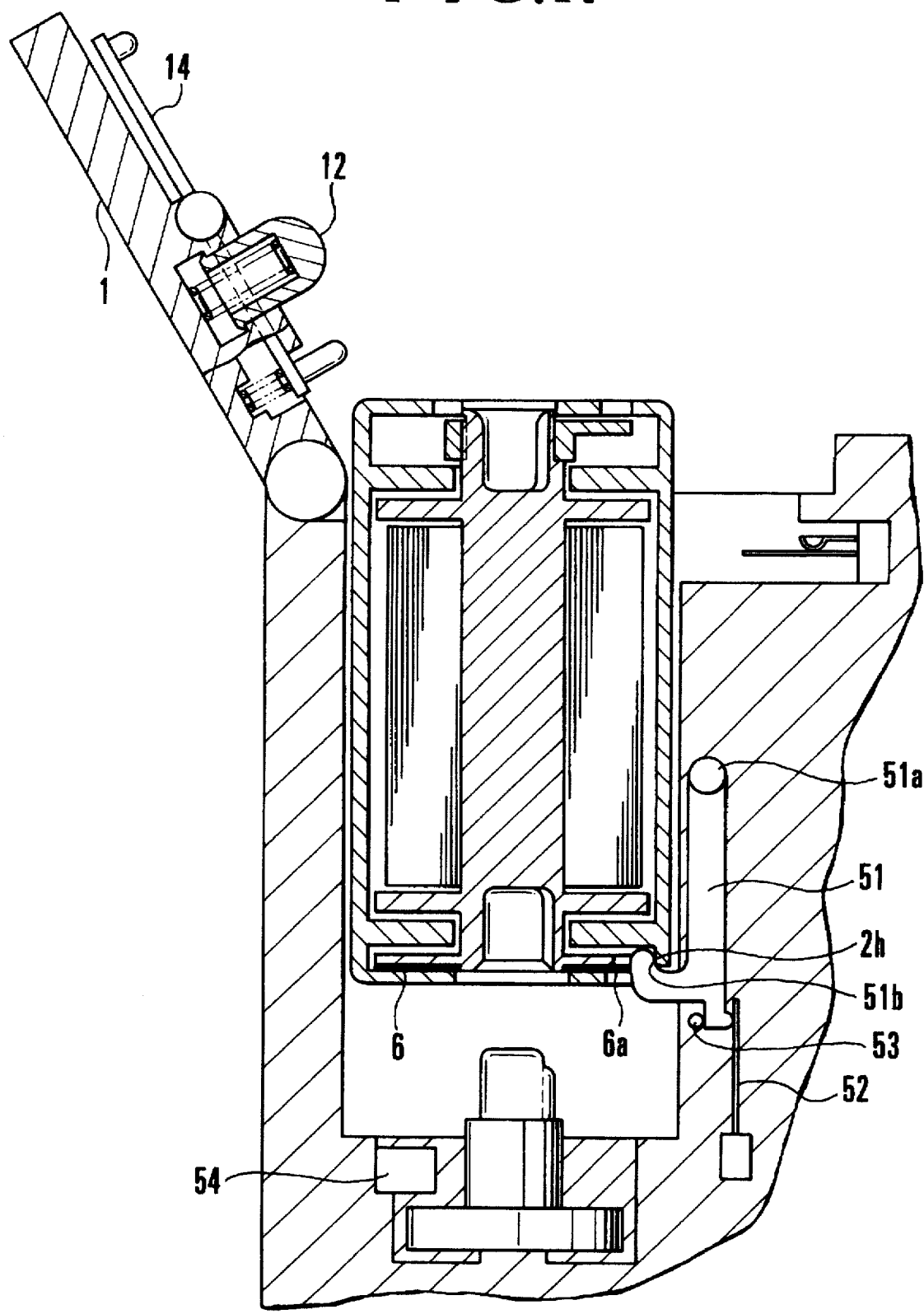
FIG. 17 is a cross-sectional view showing a state in which the film cartridge cannot be completely loaded in the camera according to the second embodiment of the present invention.
Figure 20:
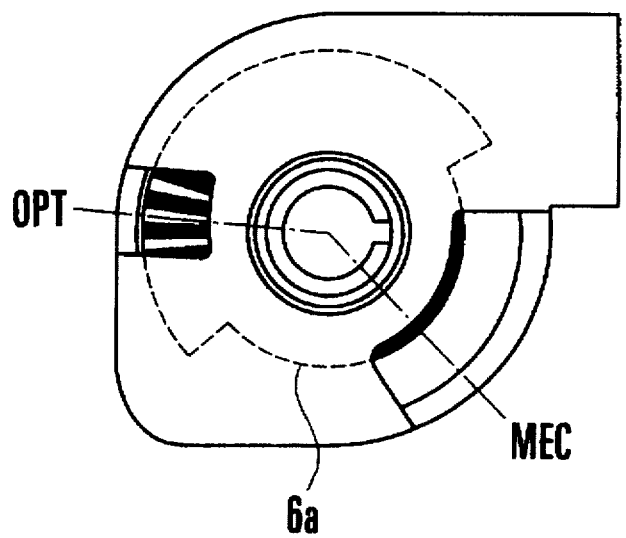
FIG. 20 is a bottom plan view of the film cartridge in the state C, which is used in the second embodiment of the present invention.
Figure 21:
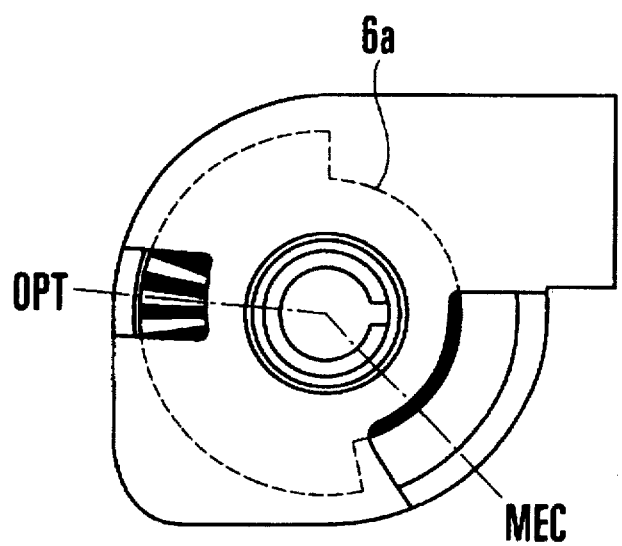
FIG. 21 is a bottom plan view of the film cartridge in state D, which is used in the second embodiment of the present invention.
Figure 22:
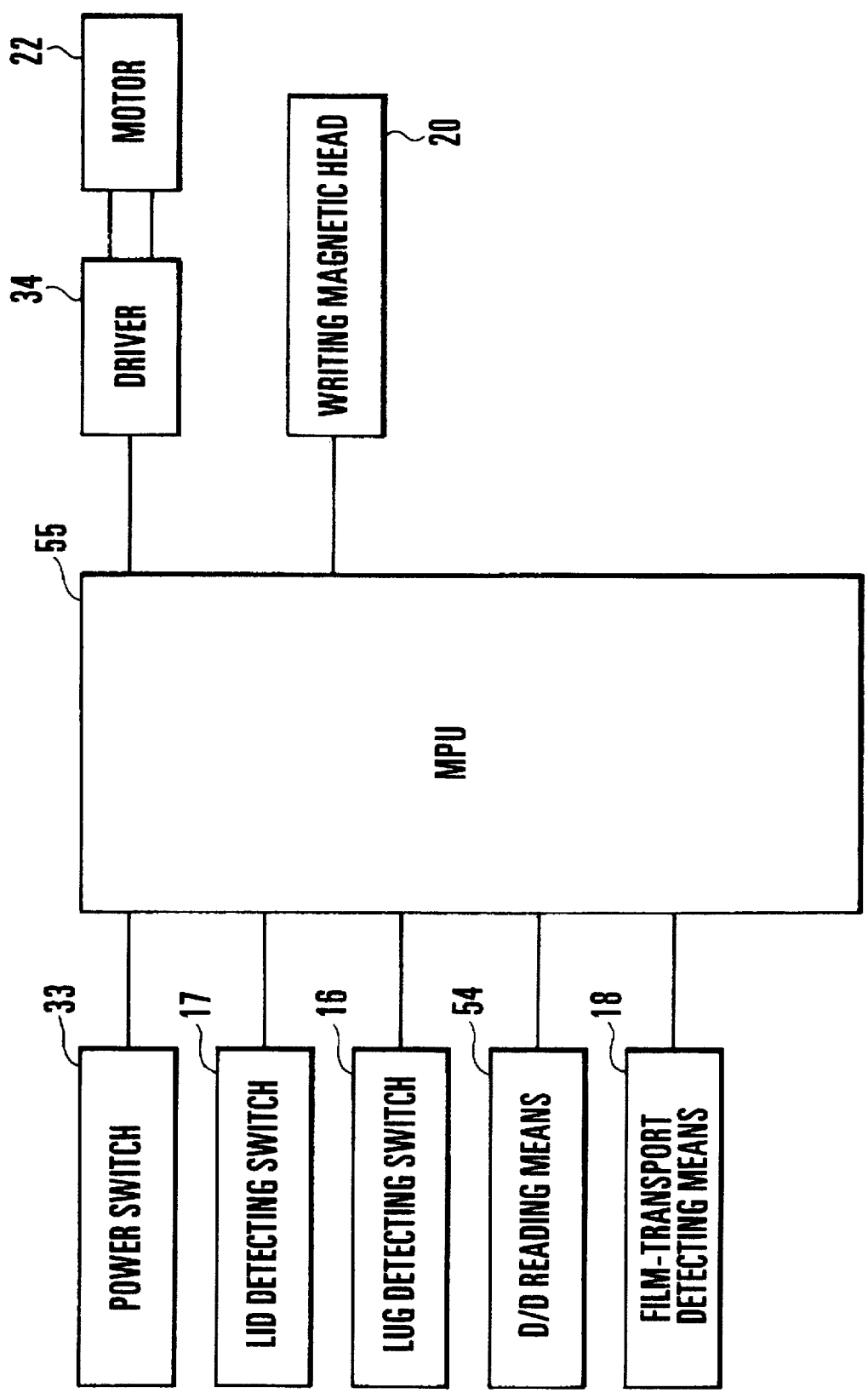
FIG. 22 is a block diagram showing the electrical arrangement of the camera according to the second embodiment of the present invention.
Figure 23:
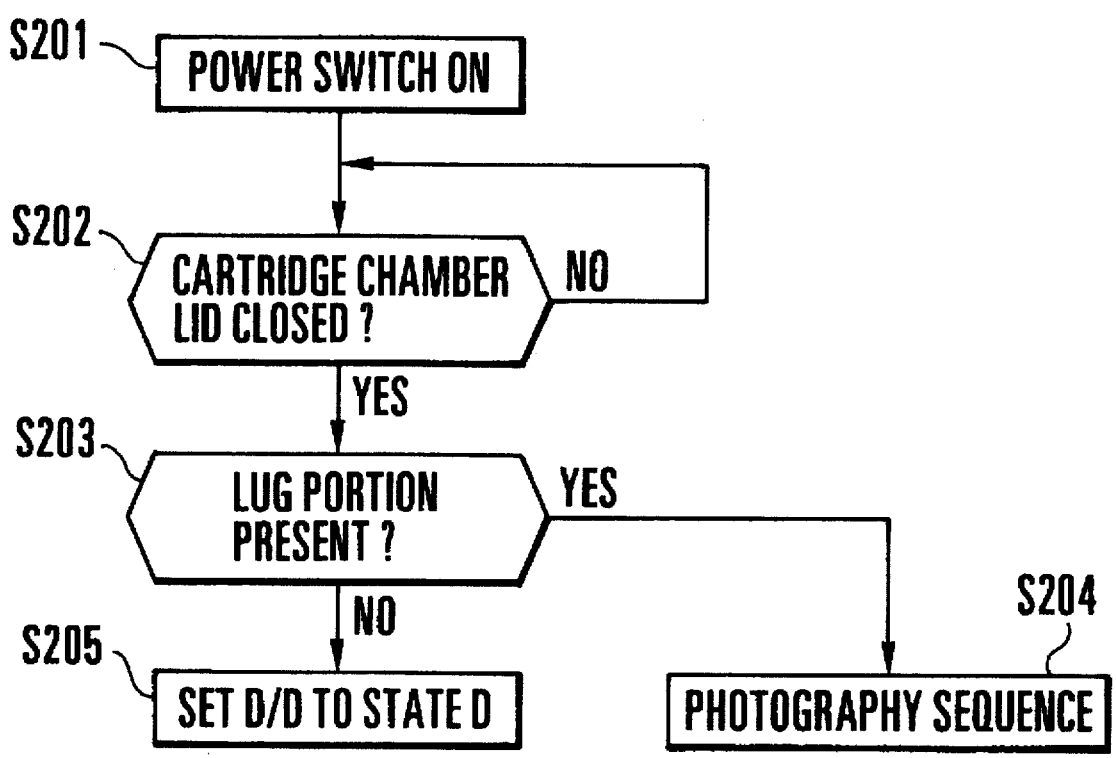
FIG. 23 is a flowchart of the MPU shown in FIG. 22.

FIGS. 16 to 23 are views showing a camera according to a second embodiment of the present invention. FIG. 16 is a view showing the state in which a film cartridge can be loaded, and FIG. 17 is a view showing the state in which no film cartridge can be loaded. FIGS. 18 to 21 are views similar to FIGS. 9 to 12 referred to in the description of the first embodiment, and show the respective phases of the first state detecting means. FIG. 22 is a block diagram showing an electrical arrangement according to the second embodiment, and FIG. 23 is a flowchart of the MPU shown in FIG. 22.

Although in the first embodiment the first state detecting means is arranged to perform optical reading through the two photo-reflectors (D/D reading means) 7 and 8, the first state detecting means in the second embodiment is arranged to mechanically determine whether loading of the film cartridge 2 is possible.

Referring to FIGS. 16 and 17, a state detecting lever 51 is swingable about a rotating shaft 51a and is urged in the clockwise direction (as viewed in these figures) by a spring 52. The initial position of the state detecting lever 51 is determined by a stopper 53 (refer to FIG. 17), and the state detecting lever 51 has a state detecting part 51b. Since the other constituent elements are similar to those of the first embodiment, they are denoted by reference numerals identical to those used in FIGS. 1 to 14, and the description thereof is omitted herein.

FIGS. 18 to 21 show the relationship between the state detecting part 51b of the state detecting lever (shown as MEC) 51 and the phase of the data disk 6.

Figure 18:
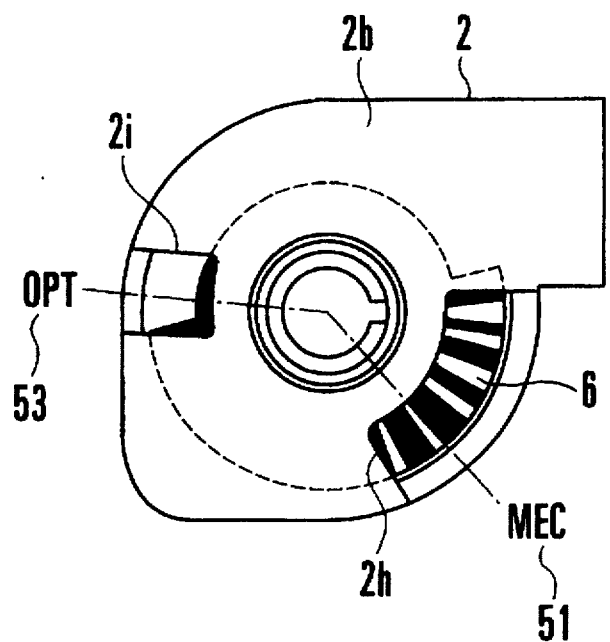
FIG. 18 is a bottom plan view of the film cartridge in the state A, which is used in the second embodiment of the present invention.

If the film cartridge 2 is in the state A shown in FIG. 18, the state detecting part 51b and a pattern portion of the data disk 6 are placed in abutment with each other. When the film cartridge 2 is inserted into the cartridge chamber 9a, the state detecting lever 51 is turned against the urging force of the spring 52 in the counterclockwise direction, whereby the film cartridge 2 can be loaded as shown in FIG. 16.

Figure 19:
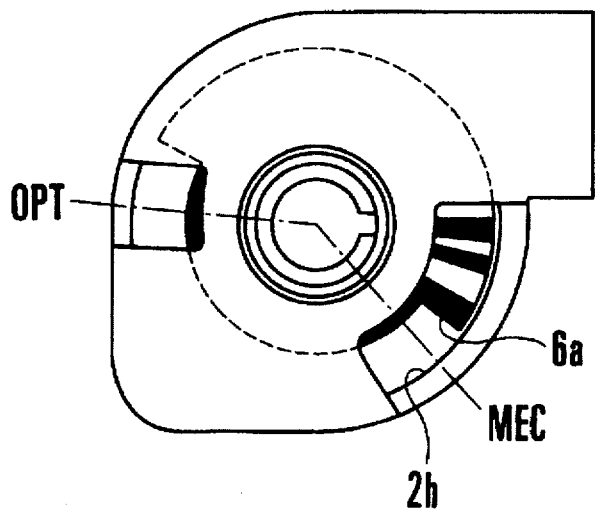
FIG. 19 is a bottom plan view of the film cartridge in the state B, which is used in the second embodiment of the present invention.

If the film cartridge 2 is in any of the states B, C and D shown in FIGS. 19, 20 and 21, the state detecting part 51b coincides with the phase of the cutout portion 6a of the data disk 6. Accordingly, the state detecting part 51b engages with an engaging portion 2h of the film cartridge 2, as shown in FIG. 17, thereby mechanically blocking the film cartridge 2 from being inserted. In other words, only a film cartridge having unexposed film (state A) can be loaded, whereas loading of a film cartridge in any other state is impossible.

However, if developed (negative) film in the state D is drawn from the film cartridge 2 by any method and is again rolled therein, for example after the visual check of the developed (negative) film, the phase of the data disk 6 of the film cartridge 2 may change from the state D to another state. If such film cartridge 2 is used, the state detecting lever 51 does not function and an accident, such as erroneous photography, will occur. To cope with this problem, it is effective to provide this type of camera with state detecting means similar to those used in the first embodiment. Since the lug detecting lever 14 for detecting the lug portion 2c and the lug detecting switch 16 are identical to those used in the first embodiment, the description thereof is omitted.

FIG. 22 is a block diagram showing a control circuit system according to the second embodiment of the present invention. The control circuit system shown in FIG. 22 includes an MPU 55.

The second embodiment differs from the first embodiment in that the reading magnetic head 19 is omitted from the signal inputting constituent elements used in the first embodiment and one photo-reflector is used as D/D reading means 54 which is used not for reading the initial state (phase) of the data disk 6 but for the purpose of only stop control. The reason why a single photo-reflector is used as the D/D reading means 54 is that only two phases, i.e., the state C of FIG. 20 and the state D of FIG. 21, are used for performing stop control and no phase which corresponds to the cutout portion 6a is employed.

The operation of the second embodiment will be described below with reference to the flowchart of FIG. 23.

If it is determined in Step S201 that the power switch 33 (not shown) has been turned on, the process proceeds to Step S202, in which it is determined whether the cartridge chamber lid 1 has been opened or closed, similarly to the first embodiment. If the cartridge chamber lid 1 has been closed, the process proceeds to Step S203, in which the state of the lug portion 2c of the film cartridge 2 is detected. Normally, the lug portion 2c is detected since the film cartridge 2 in only the state A usually can be loaded as described previously. Accordingly, the process proceeds to Step S204, in which the general photography sequence is executed. In this case, even if the film 4 is rewound before or after all the frames have been exposed, the phase of the data disk 6 is set to the state C and the sequence is brought to an end.

If it is determined in Step S203 that the lug portion 2c is not detected, it is determined that the phase of the data disk 6 of the film cartridge 2 in the state D does not correspond to a proper position, and the process proceeds to Step S205. In Step S205, the data disk 6 is set to the state D and the sequence is brought to an end. Specifically, processing identical to Steps S114 to S116 in the first embodiment is executed. If the film cartridge 2 having developed film is loaded with the first state displaying means displaying any state other than the state D shown in FIG. 21, the state of the first state displaying means is corrected and the sequence is brought to an end. Accordingly, it is possible to prevent an accident from occurring at a later time; for example, users can avoid mistakenly employing a developed-film cartridge during photography.

Figure 24:
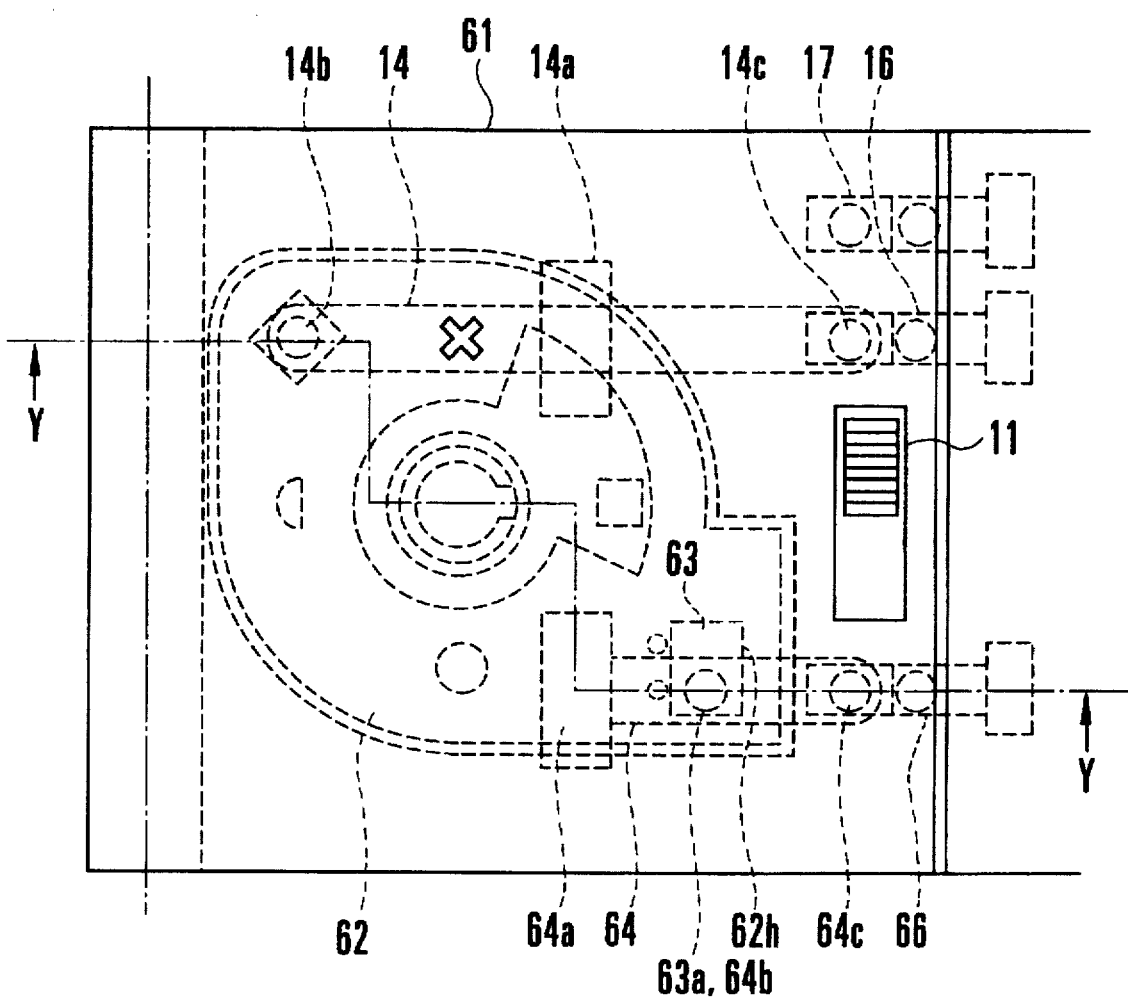
FIG. 24 is a schematic top plan view of a camera according to a third embodiment of the present invention, showing a state in which the cartridge chamber lid used in the camera is closed.
Figure 25:
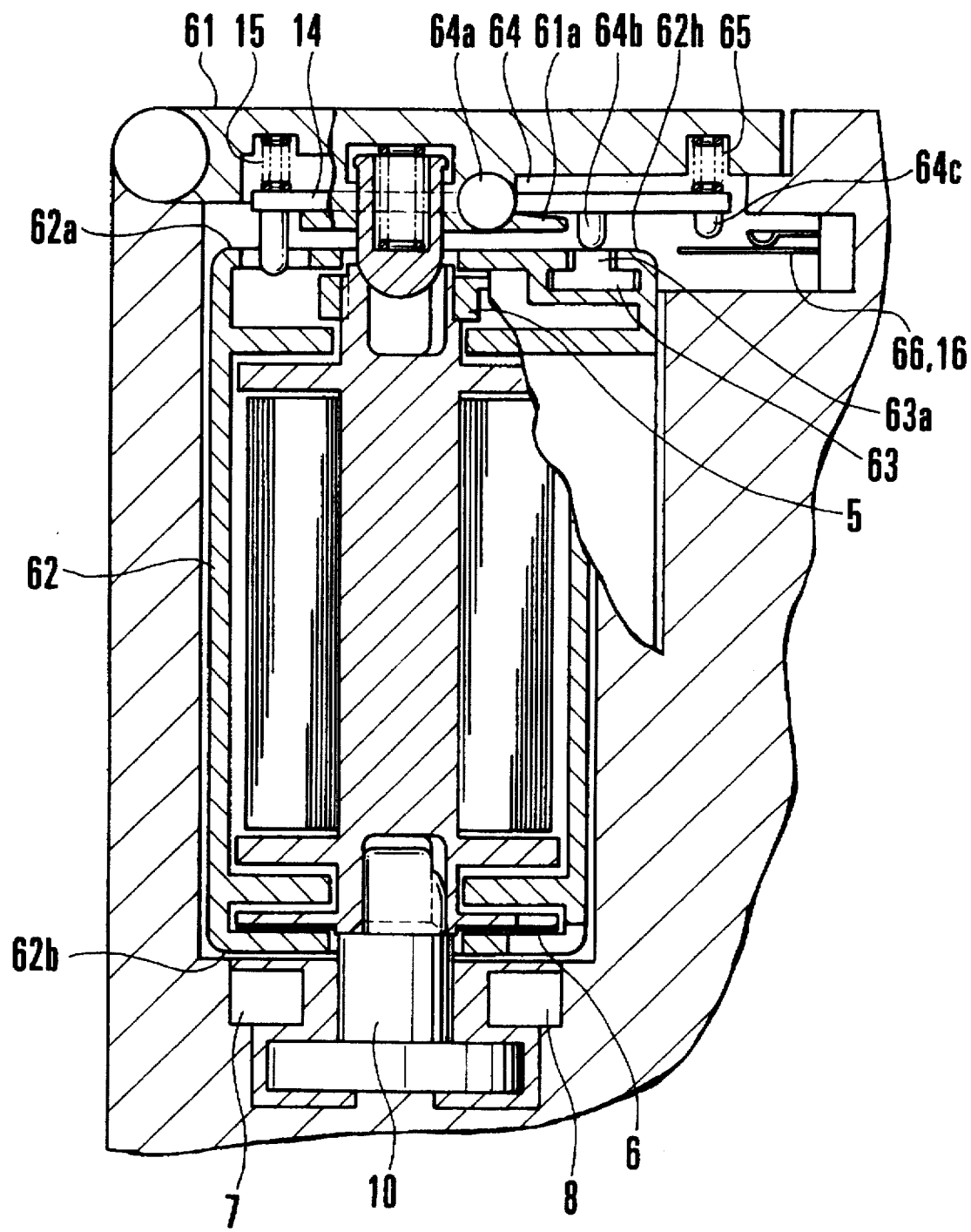
FIG. 25 is a sectional view taken along line Y—Y of FIG. 24, showing a state in which a switching member is located in an automatic position.
Figure 26:
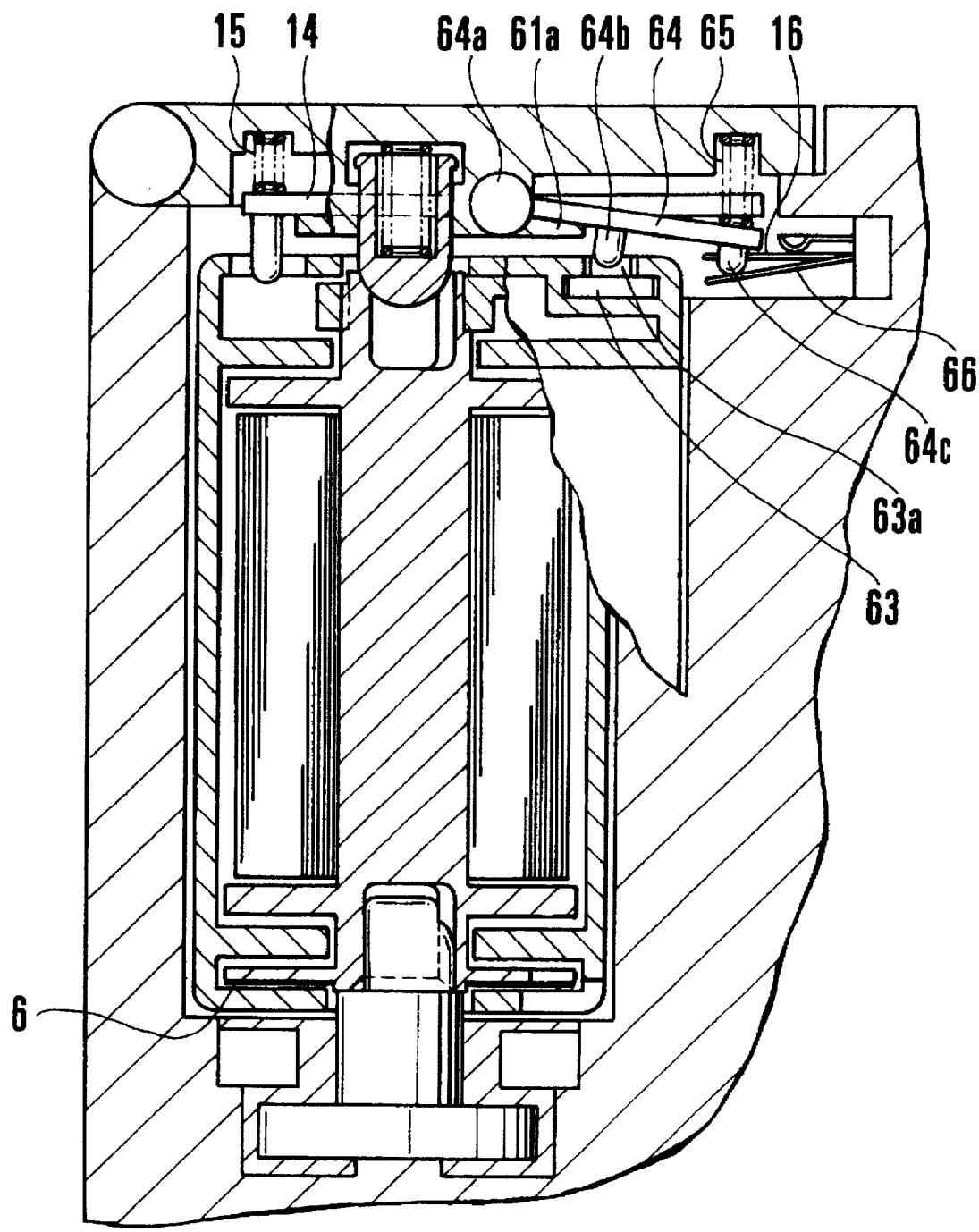
FIG. 26 is a sectional view taken along line Y—Y of FIG. 24, showing a state in which the switching member is located in an inhibition releasing position.
Figure 27:
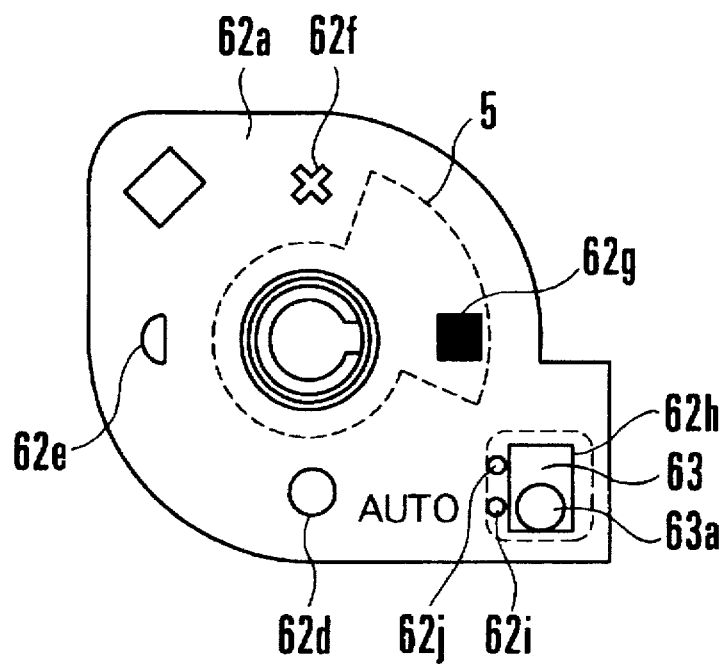
FIG. 27 is a top plan view showing the film cartridge with the switching member located in the automatic position.
Figure 28:
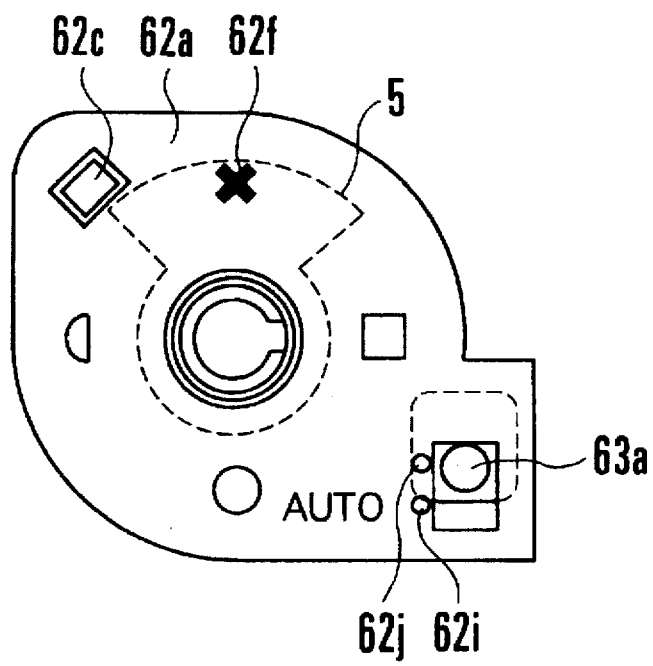
FIG. 28 is a top plan view showing the film cartridge with the switching member located in the inhibition releasing position.
Figure 29:
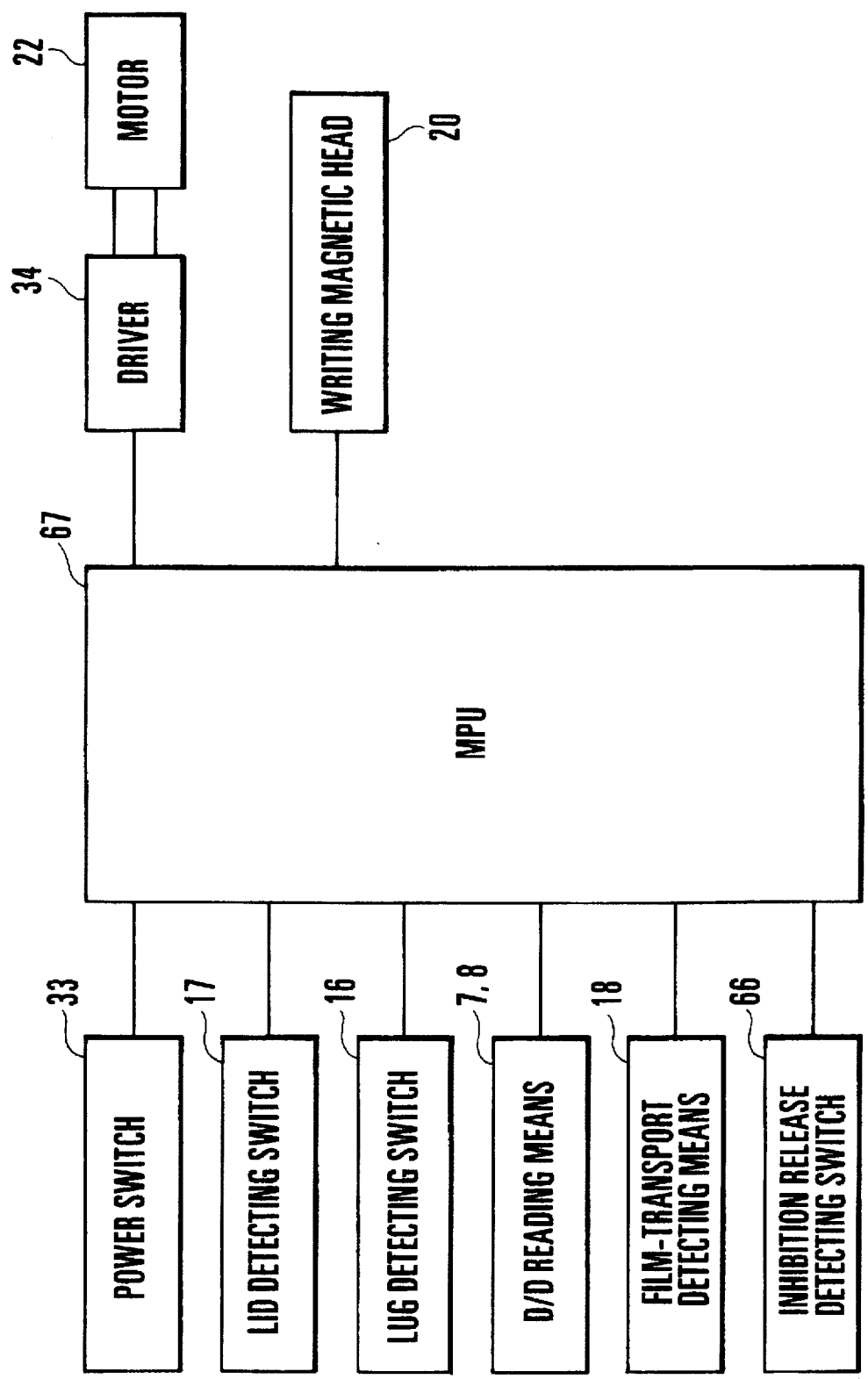
FIG. 29 is a block diagram showing the electrical arrangement of the camera according to the third embodiment of the present invention.
Figure 30:
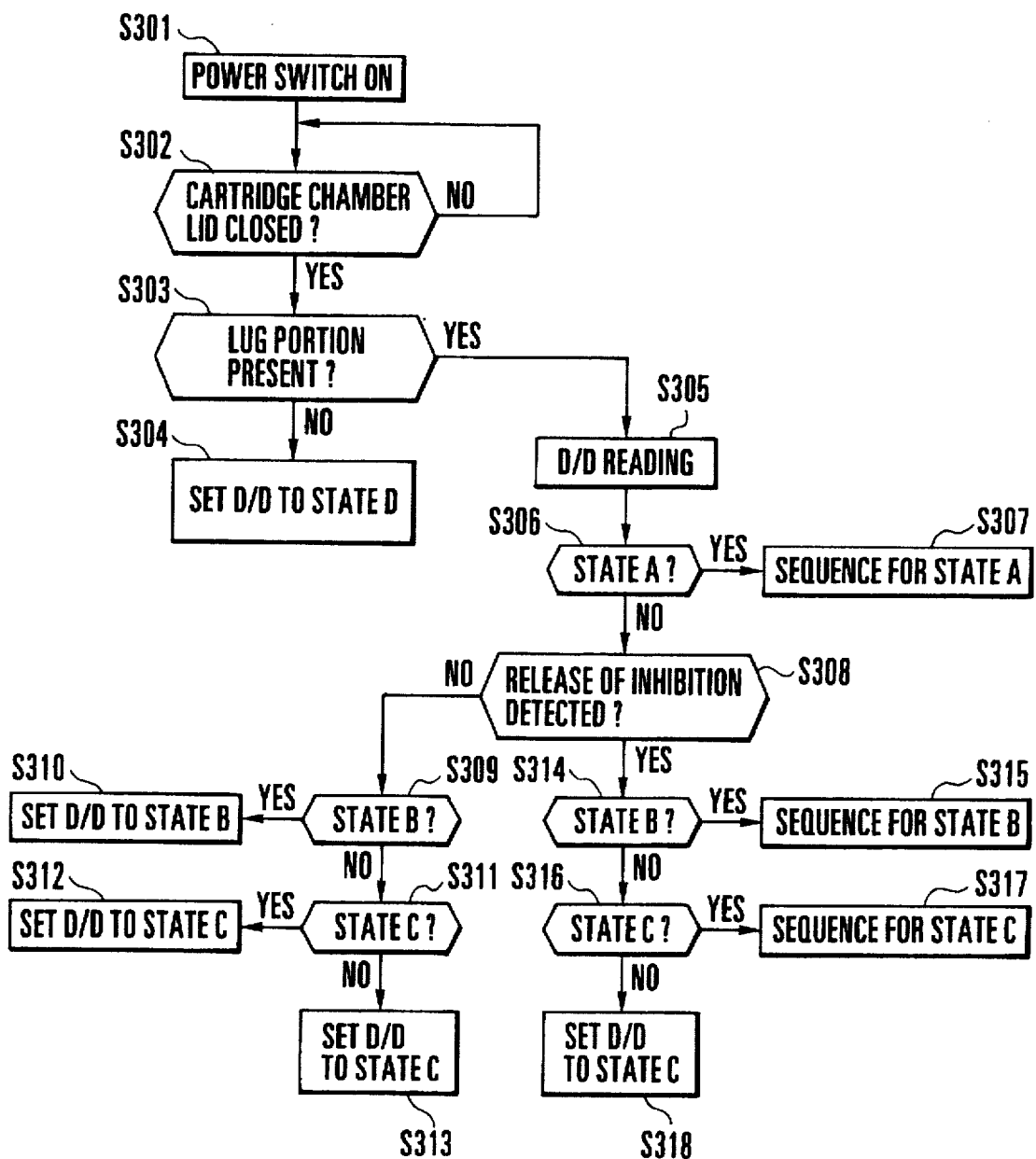
FIG. 30 is a flowchart of the MPU shown in FIG. 29.

FIGS. 24 to 30 are views showing a camera according to a third embodiment of the present invention. FIG. 24 is a top plan view showing the state in which a cartridge chamber lid 61 is closed. FIGS. 25 and 26 are cross-sectional views taken along line Y—Y. FIGS. 27 and 28 are top plan views showing a film cartridge. FIG. 29 is a block diagram showing the electrical arrangement of the camera according to the third embodiment. FIG. 30 is a flowchart of the MPU shown in FIG. 29.

In the third embodiment, constituent elements are newly added to the second state detecting means provided in the first embodiment for detecting the state of the lug portion 2c.

As shown in, for example, FIG. 25, a film cartridge 62 is identical in basic construction to the film cartridge 2 used in the first embodiment, and has a top face 62a and a bottom face 62b.

The bottom face 62b is completely identical to the bottom face 2b described previously in connection with the first embodiment with reference to FIGS. 9 to 12. The photo-reflectors 7 and 8 and the driving member 10 are also completely identical in function to the previously-described ones. However, the construction of the top face 62a is partly different from that of the top face 2a of the film cartridge 2. The construction of the top face 62a will be described below with reference to FIGS. 27 and 28.

Referring to FIGS. 27 and 28, the film cartridge 62 has a lug portion 62c similar to the lug portion 2c used in the first embodiment. The film cartridge 62 also has display windows 62d, 62e, 62f and 62g which are formed as cutouts in the top face 62a and display the states A, B, C and D according to the rotational phase in which the color display member 5 is stopped. The display windows 62d, 62e, 62f and 62g are identical to the display windows 2d, 2e, 2f and 2g used in the first embodiment. The film cartridge 62 has an opening 62h and a switching member 63 is disposed in the opening 62h. The switching member 63 has a projection 63a which can be switched between the position indicated by an index 62i and that indicated by an index 62j, by sliding the switching member 63. The lug portion 62c is permanently removed after the completion of development, whereas the switching member 63 can be arbitrarily switched by a user. The switching member 63 functions as a part for allowing a user to intentionally input a signal for forcedly releasing inhibition of photography. When the projection 63a is shifted to the index 62i as shown in FIG. 27, an automatic position is selected. When the projection 63a is shifted to the index 62j as shown in FIG. 28, an inhibition releasing position is selected. The switching member 63 can be operated independently of the states A to D.

Since the cartridge chamber lid 61 has a basic construction identical to that of the cartridge chamber lid 1 used in the first embodiment, the description thereof is omitted. The state of the lug portion 62c of the film cartridge 62 is detected through the lug detecting lever 14 and the lug detecting switch 16 in a manner similar to that described previously in connection with the first embodiment. The lid detecting switch 17 is also identical to that used in the first embodiment.

An inhibition release detecting lever 64 (refer to, for example, FIG. 25) is supported for swinging movement about a rotating shaft 64a and is urged in the clockwise direction by a spring 65 and positionally restricted by a stopper 61a. In FIG. 25, reference numeral 66 denotes an inhibition release detecting switch.

FIGS. 24 and 25 show the state in which the switching member 63 is located at the automatic position. As shown, a state detecting part 64b is placed in abutment with the projection 63a, the inhibition release detecting lever 64 is forced against the spring 65 in the counterclockwise direction, a projection 64c is out of contact with the inhibition release detecting switch 66, and the inhibition release detecting switch 66 is closed.

FIG. 26 shows the state in which the switching member 63 is located at the inhibition releasing position. The state detecting part 64b of the inhibition release detecting lever 64 is not placed in abutment with the projection 63a of the switching member 63, so that the spring 65 is urged against the stopper 61a and the projection 64c holds the inhibition release detecting switch 66 in an open state.

As can be seen from FIGS. 25 and 26, the spring 65 has a spring force materially stronger than that of the inhibition release detecting switch 66.

FIG. 29 is a block diagram showing a control circuit system of the camera according to the third embodiment. The shown control circuit system includes an MPU 67. The third embodiment differs from the first embodiment shown in FIG. 14 in that the reading magnetic head 19 is absent and the inhibition release detecting switch 66 is newly added. Since the other constituent elements are identical to those used in the first embodiment, identical reference numerals are used to denote them and the description thereof is omitted.

The operation of the third embodiment will be described below with reference to the flowchart of FIG. 30.

Steps S301 to S303 are respectively identical to Steps S101 to S103 used in the flowchart according to the first embodiment, and the description thereof is omitted. If it is detected in Step S303 through the lug detecting switch 16 that the lug portion 62c has been removed, the process proceeds to Step S304. In Step S304, it is determined that the film cartridge 62 is in the state D, and since the camera according to the third embodiment does not have a function for handling developed film, the data disk 6 is set to the state D similarly to the second embodiment and the sequence is brought to an end. In the aforesaid sequence, similarly to the second embodiment, if the data disk 6 of the film cartridge 62 is not stopped in a proper phase, the rotational phase of the data disk 6 is automatically corrected. Accordingly, even if the film cartridge 62 is accidentally loaded into another camera having no function available in the third embodiment, erroneous photography is prevented, whereby it is possible to effectively prevent occurrence of an accident during photography; for example, users can avoid mistakenly employing a developed-film cartridge during photography.

If the presence of the lug portion 62c is detected in Step S303, the process proceeds to Step S305, in which the initial phase of the data disk 6 is detected by the photo-reflectors (D/D reading means) 7 and 8. In Step S306, it is determined in which of the states A to D the film cartridge 62 is placed. If the film cartridge 62 is in the state A, the process proceeds from Step S306 to Step S307, in which the sequence for the state A is started. Specifically, the sequence for the state A is the general photography sequence for unexposed film.

If the film cartridge 62 is in any state other than the state A, the process proceeds to Step S308, in which the position in which the switching member 63 is placed is detected from the state of the inhibition release detecting switch 66. If the inhibition release detecting switch 66 remains opened and it is detected that the switching member 63 is placed in the automatic position, the process proceeds from Step S308 to Step S309. If it is determined in Step S309 that the D/D reading result obtained in Step S305 is the state B, the process proceeds from Step S309 to Step S310, in which the data disk 6 is set to the state B and the sequence is brought to an end. This is because the camera according to the third embodiment does not have the reading magnetic head 19 used in the first embodiment and is unable to specify a frame with which to start photography.

If it is determined in Step S309 that the film cartridge 62 is in the state B, the process proceeds to Step S311, in which it is determined whether the film cartridge 62 is in the state C. If the film cartridge 62 is in the state C, the process proceeds from Step S311 to Step S312, in which the data disk 6 is set to the state C. Then, the sequence is brought to an end.

If it is determined in Step S311 that the film cartridge 62 is in any state other than the states A, B and C, the process proceeds from Step S311 to Step S313, in which the data disk 6 is set to the state C. Then, the sequence is brought to an end. This portion of the flowchart is a final decision portion which serves to give the decision result obtained in Step S303 the highest priority and also to add a safety measure to the processing of the flowchart.

If it is determined in Step S308 that the inhibition release detecting switch 66 is opened and the switching member 63 is placed in the inhibition releasing position, the process proceeds Step S308 to Step S314. If the D/D reading result obtained in Step S305 is the state B, the process proceeds to Step S315, in which the sequence for the state B is started. Specifically, Step S315 is executed for meeting the user's intention to take a photograph by using a camera having no reading magnetic head 19 with the switching member 63 being intentionally switched to the inhibition releasing position. In Step S315, the user is allowed to manually specify a frame with which to start photography, and the photography sequence is executed from the starting frame manually specified.

If the D/D reading result obtained in Step S305 is the state C, the process proceeds from Step S316 to Step S317, in which the sequence for the state C is started. For the aforesaid reason, this sequence also requires that the user manually specify a particular frame. Specifically, since the state C indicates that all frames of film have already been exposed, the user is only allowed to perform multiple exposure, and each time the user manually specifies a particular frame, a photography sequence for multiple exposure is started.

If the D/D reading result obtained in Step S305 is none of the states A, B and C, the process proceeds to Step S318, in which the data disk 6 is set to the state C. Then, the sequence is brought to an end.

FIGS. 31 to 44 are views showing a camera according to a fourth embodiment of the present invention. First of all, the mechanical construction of each part of the camera will be described below with reference to FIGS. 31 to 35.

Figure 31:
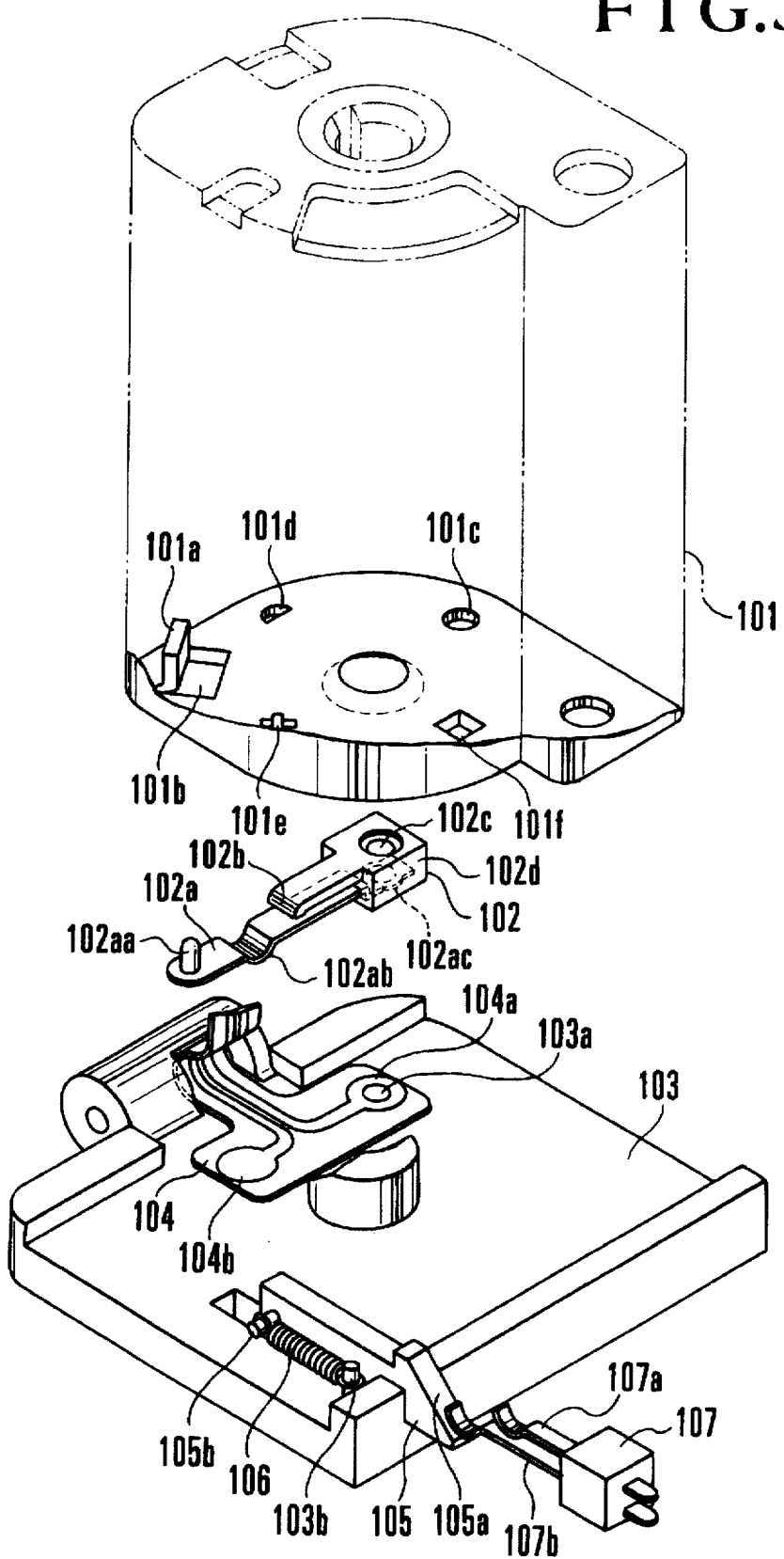
FIG. 31 is a schematic perspective view showing a film cartridge for use in a camera according to a fourth embodiment and the structure of the camera which neighbors a cartridge chamber lid.
Figure 32:
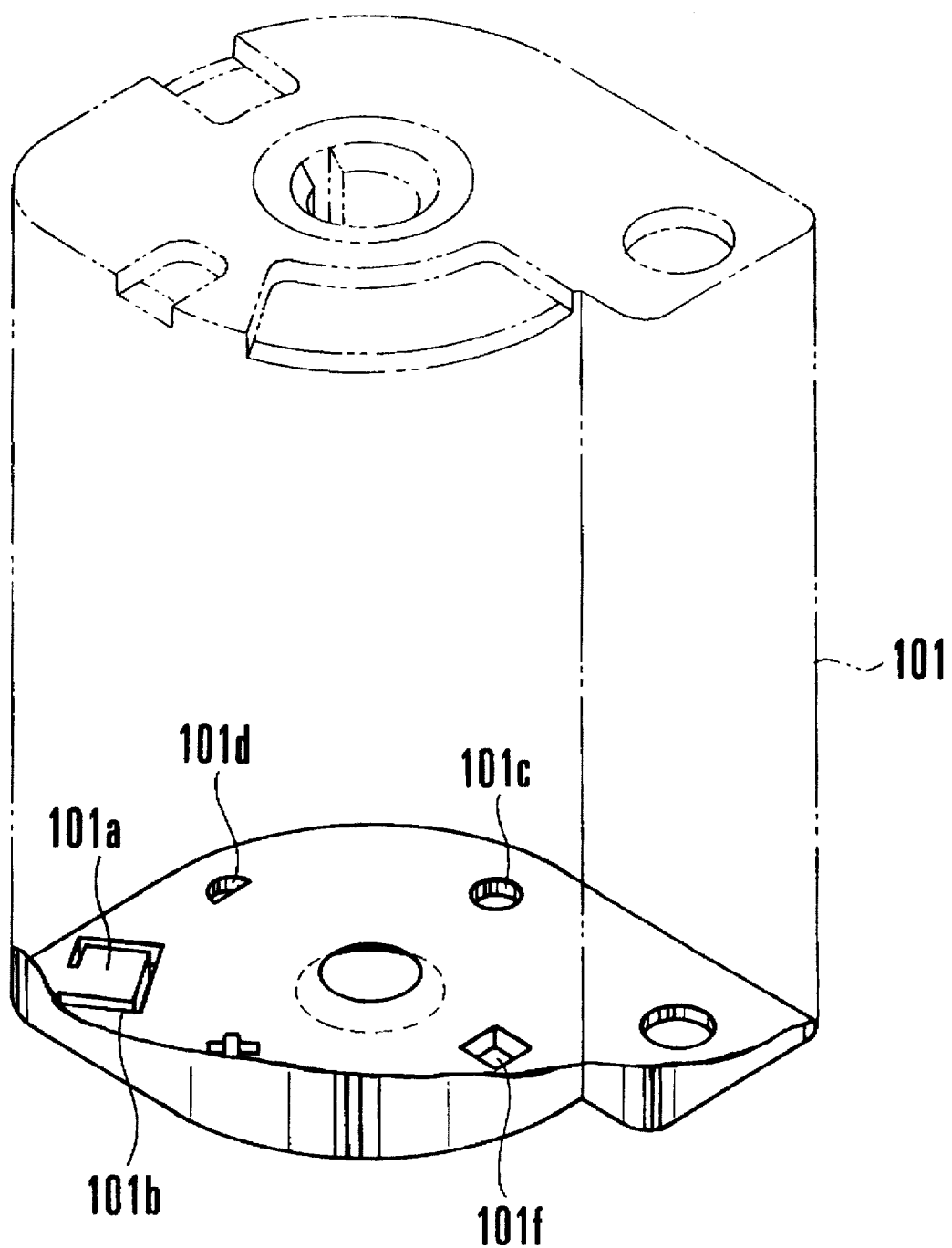
FIG. 32 is a schematic perspective view showing the film cartridge of FIG. 31 which contains unexposed film.
Figure 33:
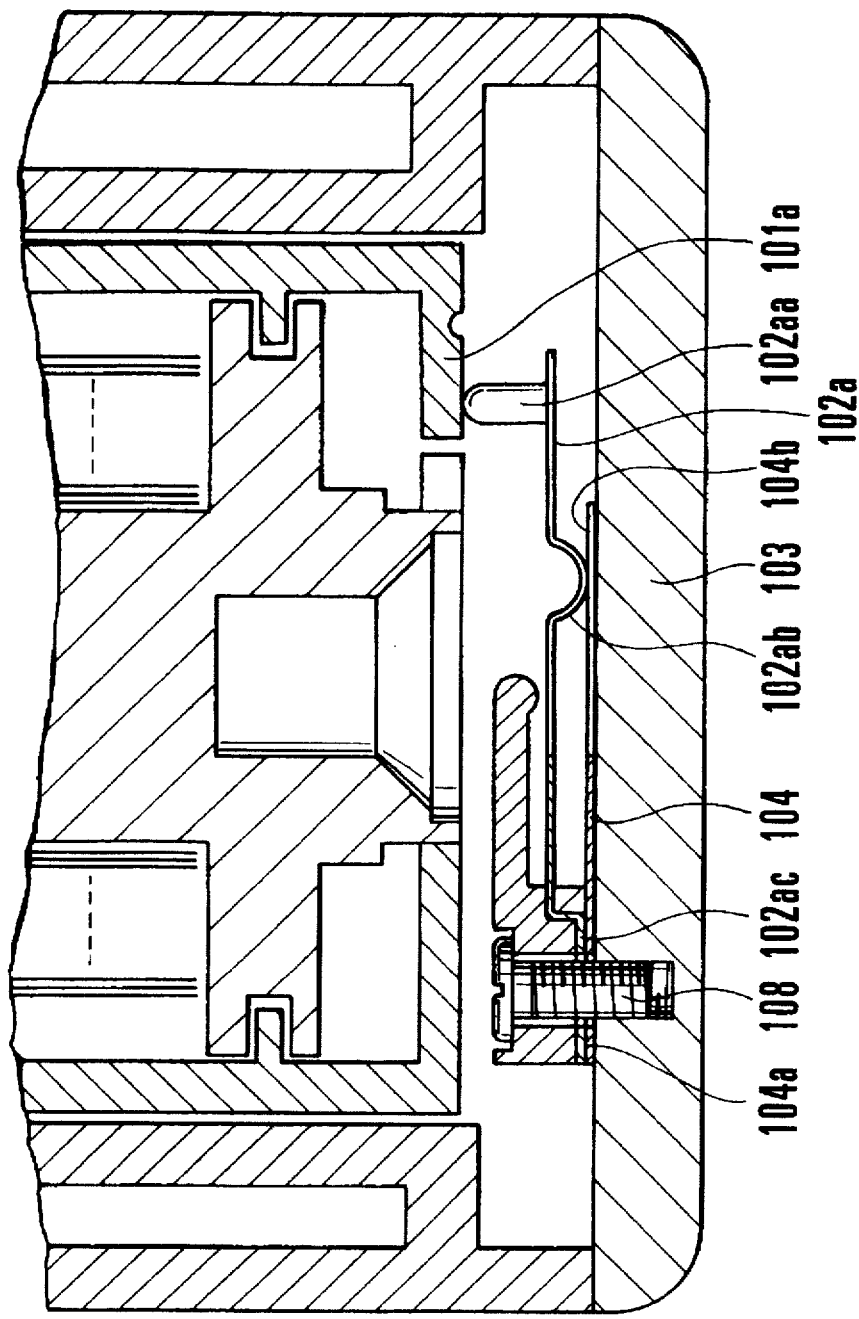
FIG. 33 is a cross-sectional view showing the state of the vicinity of the cartridge chamber lid when the film cartridge of FIG. 32 is loaded in the camera according to the fourth embodiment of the present invention.
Figure 34:
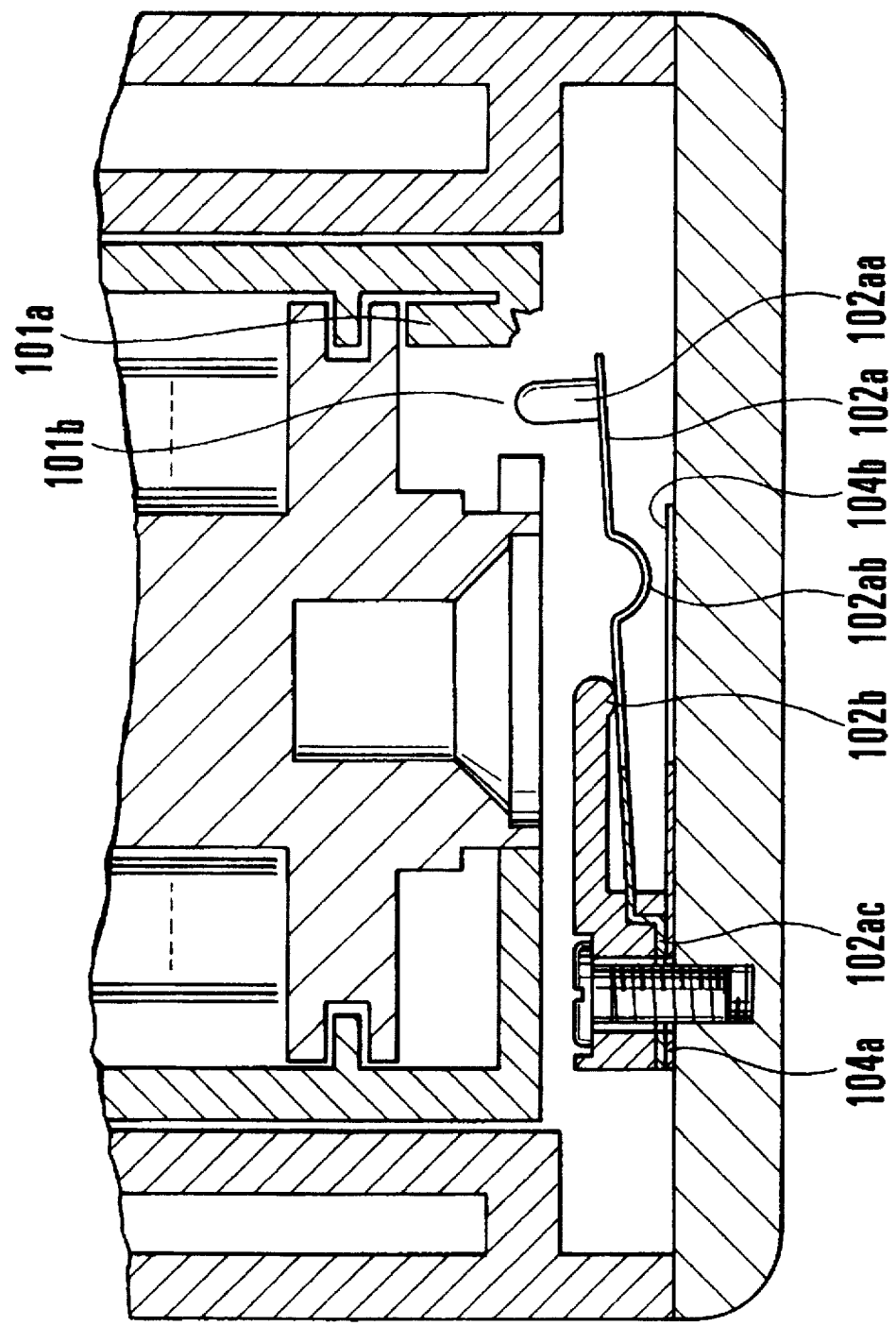
FIG. 34 is a cross-sectional view showing the state of the vicinity of the cartridge chamber lid when the film cartridge of FIG. 31 is loaded in the camera according to the fourth embodiment of the present invention.
Figure 35:
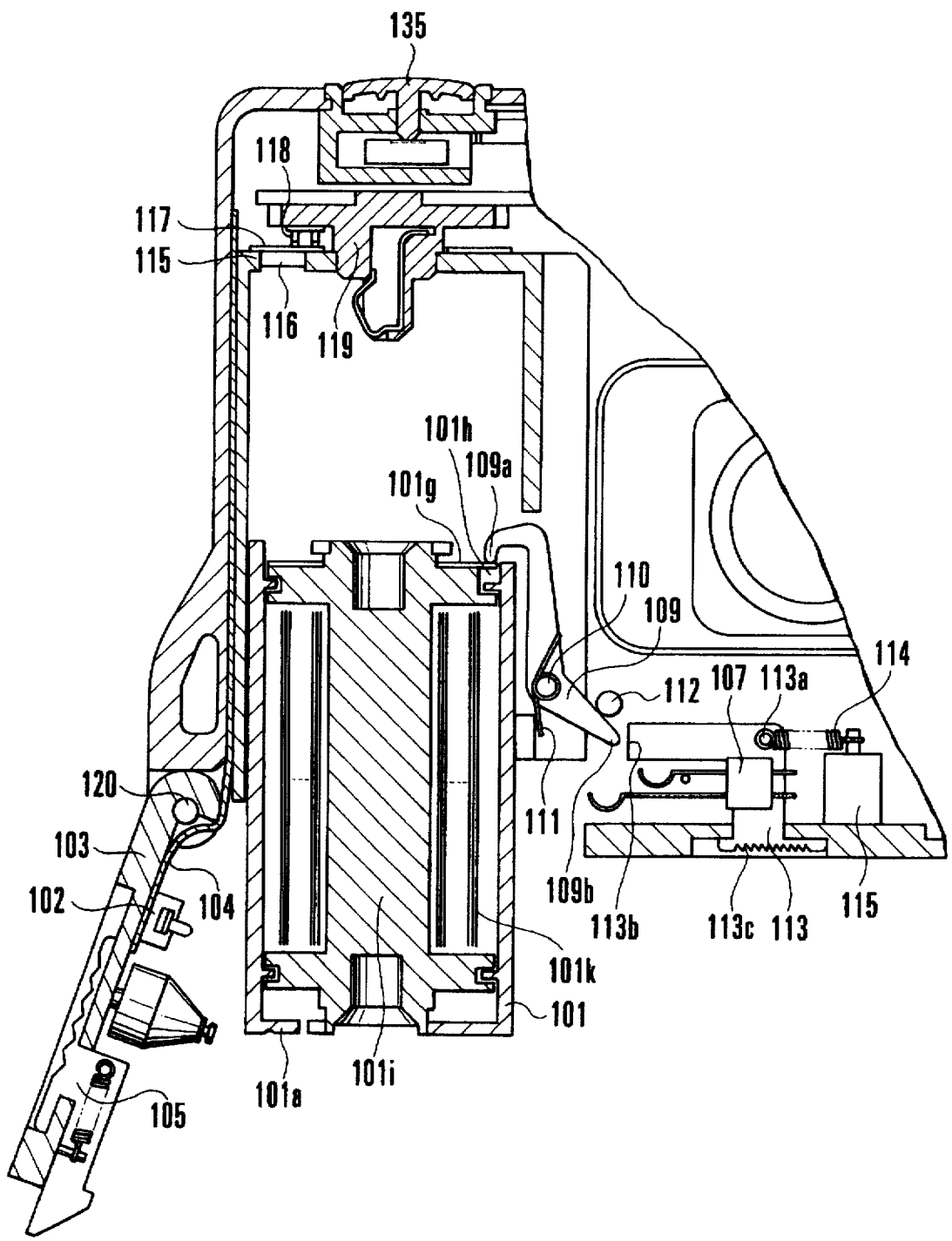
FIG. 35 is a cross-sectional view showing the essential portion of the mechanical construction of the camera according to the fourth embodiment of the present invention.

FIG. 31 is a schematic perspective view showing a film cartridge for use in the camera according to the fourth embodiment and the structure of the camera which neighbors a cartridge chamber lid. FIG. 32 is a schematic perspective view showing a film cartridge having unexposed film. FIG. 33 is a cross-sectional view showing the state of the vicinity of the cartridge chamber lid when a film cartridge having unexposed film is loaded. FIG. 34 is a cross-sectional view showing the state of the vicinity of the cartridge chamber lid when a film cartridge having developed film is loaded. FIG. 35 is a cross-sectional view showing the essential portion of the camera into which a film cartridge having unexposed film is being loaded.

As shown in these figures, a film cartridge 101 has a bendable lug portion 101a. If a film 101k which is accommodated in the film cartridge 101 is already developed, the bendable lug portion 101a is bent inward of the film cartridge 101 as shown in FIG. 31 and a hole 101b is opened. Otherwise (the film 101k is unexposed, partly exposed or fully exposed), the bendable lug portion 101a is placed in the state of closing the hole 101b as shown in FIG. 32. A hole 101c is provided for displaying unexposed film (F), a hole 101d is provided for displaying partly exposed film (P), a hole 101e is provided for displaying fully exposed film (E), and a hole 101f is provided for displaying developed film (D). The film cartridge 101 has a structure which is capable of indicating the state of the film 101k accommodated in the film cartridge 101 by making a white plate (not shown) visible from the outside through any one of the holes 101c to 101f according to the rotational phase of the white plate which rotates integrally with a spool (film winding shaft)

101b (refer to FIG. 35) provided in the film cartridge 101. To adjust the position of the white plate, there are a number of known arrangements, such as an arrangement using manual operation or an arrangement in which the rotational phase of the spool 101i (a data disk which will be described later) is electrically controlled.

Figure 40:
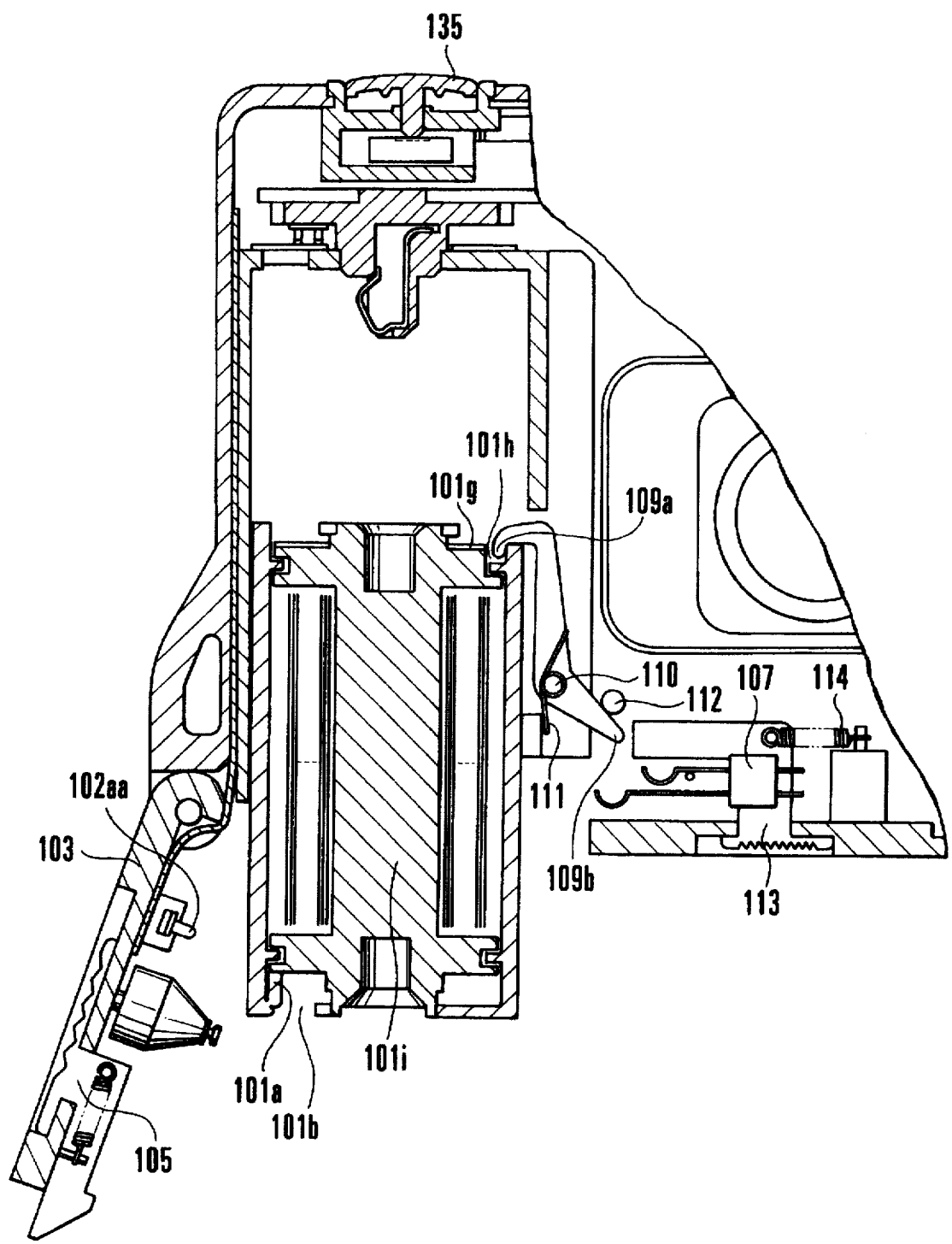
FIG. 40 is a cross-sectional view showing a state in which a developed-film cartridge is inserted in the camera according to the fourth embodiment of the present invention.
Figure 41:
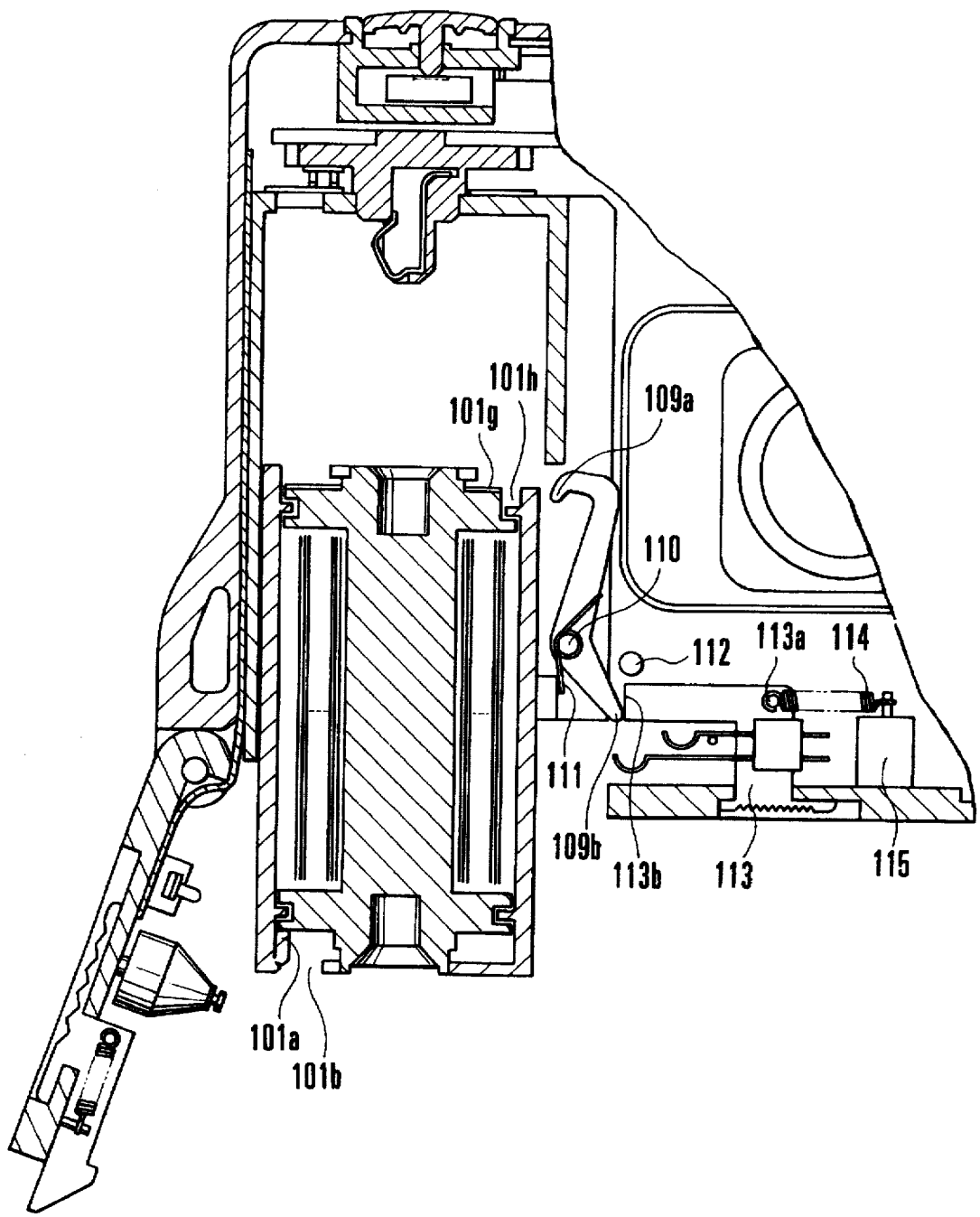
FIG. 41 is a cross-sectional view showing a state in which a multiple-exposure knob is manipulated during the state shown in FIG. 40.
Figure 42:
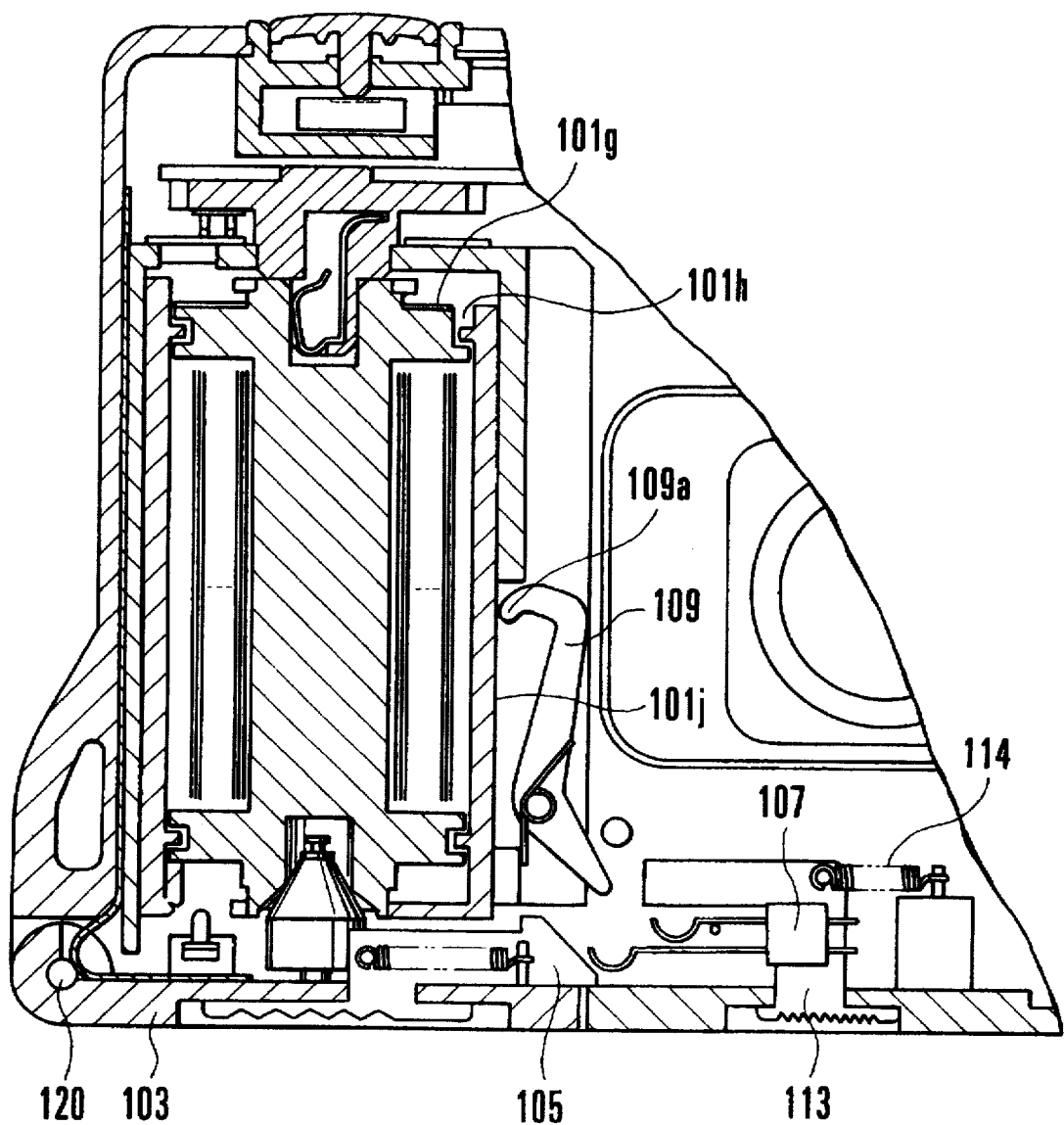
FIG. 42 is a cross-sectional view showing a state in which the loading of the film cartridge in the state of FIG. 41 is completed.

A data disk 101g is provided at the top end of the spool 101i (refer to FIG. 35). Film information (such as the prescribed number of exposures and film speed) is recorded on the data disk 101g as a bar code, and this film information is read by a photo-reflector 116 which will be described later. Further, information indicating whether the film 101k is unexposed can be read by detecting the rotational phase of the data disk 101g. The data disk 101g has a shape which covers a recess 101h as shown in FIG. 35 if the film cartridge 101 contains unexposed film, and also has a cutout which opens the recess 101h as shown in FIGS. 40 to 42 if the film cartridge 101 contains exposed film.

A state-of-lug detecting switch 102 is fixed to a cartridge chamber lid by a screw 108 (refer to FIG. 33). The state-of-lug detecting switch 102 has a contact piece 102a which is inserted into a resin portion 102d at one end and has a lug detecting part 102aa at the other end at a position opposite to the bendable lug portion 101a. Further, the state-of-lug detecting switch 102 has a contact portion 102ab which is in contact with a pattern 104b of a flexible printed circuit board 104 if the bendable lug portion 101a is not bent (refer to FIG. 33). The state-of-lug detecting switch 102 also has a contact portion 102ac which is pressed in contact with a pattern 104a of the flexible printed circuit board 104 by the state-of-lug detecting switch 102 being fixed to a cartridge chamber lid 103 by the screw 108 via a hole 102c (refer to FIG. 32) as shown in FIGS. 33 and 34. The resin portion 102d has an extended portion 102b which plays the role of a stopper for limiting the set position of the contact piece 102a to the height shown in FIG. 34.

As shown in FIG. 35, the cartridge chamber lid 103 is arranged rotatably about a hinge 120, and the flexible printed circuit board 104 for transmission of a state signal outputted from the state-of-lug detecting switch 102 is curved in the vicinity of the hinge 120 and connected to a microcomputer (to be described later) or the like of a camera body. A lid locking member 105 which also serves as a lid opening/closing member is slidably secured to the cartridge chamber lid 103. A spring 106 is disposed between a shaft 105b of the lid locking member 105 and a shaft 103b of the cartridge chamber lid 103 so that the lid locking member 105 is urged in the direction in which the cartridge chamber lid 103 is locked (toward the right as viewed in FIG. 31). A lid-locking completion switch 107 has contact pieces 107a and 107b. When the operation of closing the cartridge chamber lid 103 by the lid locking member 105 is completed, the contact piece 107b is pressed into contact with the contact piece 107a by an inclined face 105a of the lid locking member 105 and the patterns 104a and 104b are electrically connected to each other by the state-of-lug detecting switch 102 (as will be described later with reference to FIG. 36). Thus, a lid-locking completion signal is generated by the lid-locking completion switch 107.

As shown in FIG. 35, a hook lever 109 is supported rotatably about a shaft 110. The hook lever 109 is urged in the counterclockwise direction by a spring 111 and the rotation of the hook lever 109 is limited by a stopper pin 112. The hook lever 109 has a hook portion 109a to be inserted into the recess 101h of the film cartridge 101 to block the film cartridge 101 from being loaded and a projecting portion 109b to be pressed by an end face 113b of a multiple-exposure knob 113 which will be described later. The multiple-exposure knob 113 is manipulated for the purpose of effecting multiple exposure (photography effected by exposing a single frame by a plurality of times). The multiple-exposure knob 113 is urged by a spring 114 toward the right as viewed in FIG. 35. If the multiple-exposure knob 113 is slid toward the left, the end face 113b presses the projecting portion 109b, whereby the hook lever 109 can be rotated in the clockwise direction as described previously. Accordingly, by manipulating the multiple-exposure knob 113, it is possible to arbitrarily load even a film cartridge other than an unexposed-film cartridge.

A photo-reflector 116 is provided for reading the bar code on the data disk 101g of the film cartridge 101 to detect the state of use of the film cartridge 101, the prescribed number of exposures of the accommodated film 101k and the like. A printed circuit board 117 is a double-sided printed circuit board having printed patterns on both sides. The photo-reflector 116 is soldered to the bottom face of the printed circuit board 117, and the top face of the printed circuit board 117 has a phase pattern which enables the phase of a fork gear 119 to be detected by a contact piece 118 secured to the fork gear 119 sliding on the phase pattern. A release button is denoted by reference numeral 135.

Figure 36:
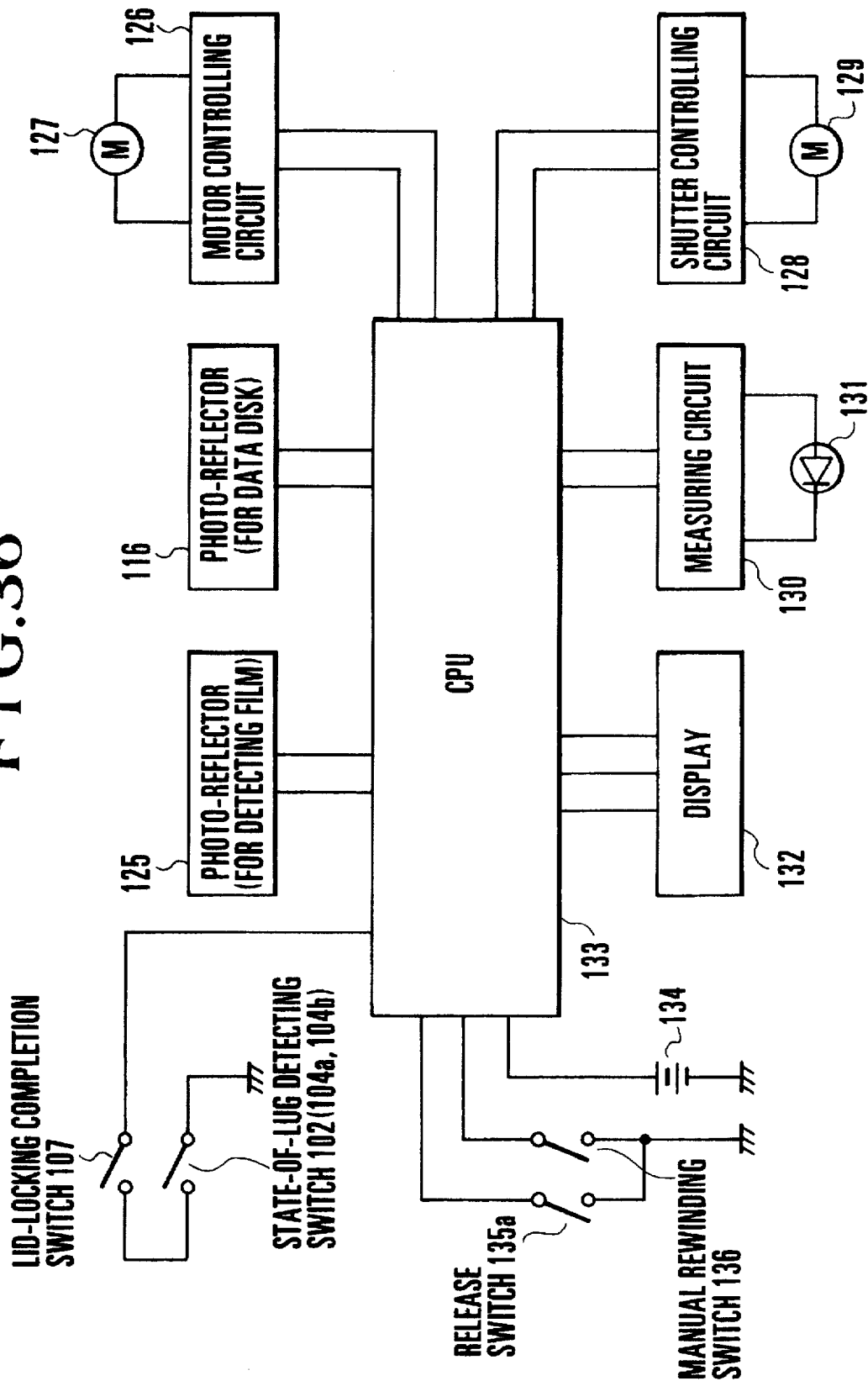
FIG. 36 is a block diagram showing the electrical arrangement of the camera according to the fourth embodiment of the present invention.

FIG. 36 is a block diagram showing the essential portion of the camera having the above-described mechanism. In FIG. 36, identical reference numerals are used to denote constituent elements identical to those shown in FIGS. 31 to 35.

The arrangement shown in FIG. 36 includes a photo-reflector 125 for detecting the state of transport of film, a motor controlling circuit 126 for controlling the driving of a motor 127 for film transport, a shutter controlling circuit 128 for controlling the opening and closing of a shutter by driving a motor 129, a light measuring circuit 130 for measuring a subject luminance on the basis of the output of a light measuring sensor 131, a display 132 such as an LCD for displaying various kinds of information, a CPU 133 for controlling various kinds of operations, a source battery 134, a manual rewinding switch 136, and a release switch 135a to be turned on when the release button 135 shown in FIG. 35 is pressed.

As can be seen from FIG. 35, the state-of-lug detecting switch 102 (and the patterns 104a and 104b) for generating a state signal indicating whether the film cartridge 101 contains a developed film (the CPU 133 makes a decision according to whether the bendable lug portion 101a is bent) and the lid-locking completion switch 107 are connected in series. So far as both switches 102 and 107 are not turned on, the lid-locking completion signal is not generated, so that the CPU 133 does not execute a sequence for a photography preparing operation, as will be described later with reference to FIG. 44.

The operation of the above-described arrangement will be described below. First of all, the operation of loading the film cartridge 101 placed in the unexposed (F) state will be described below with reference to FIGS. 35 to 39 and 44.

FIG. 35 is a partly cross-sectional view showing a case in which the film cartridge 101 in the unexposed (F) state is being inserted with the cartridge chamber lid 103 opened.

Figure 37:
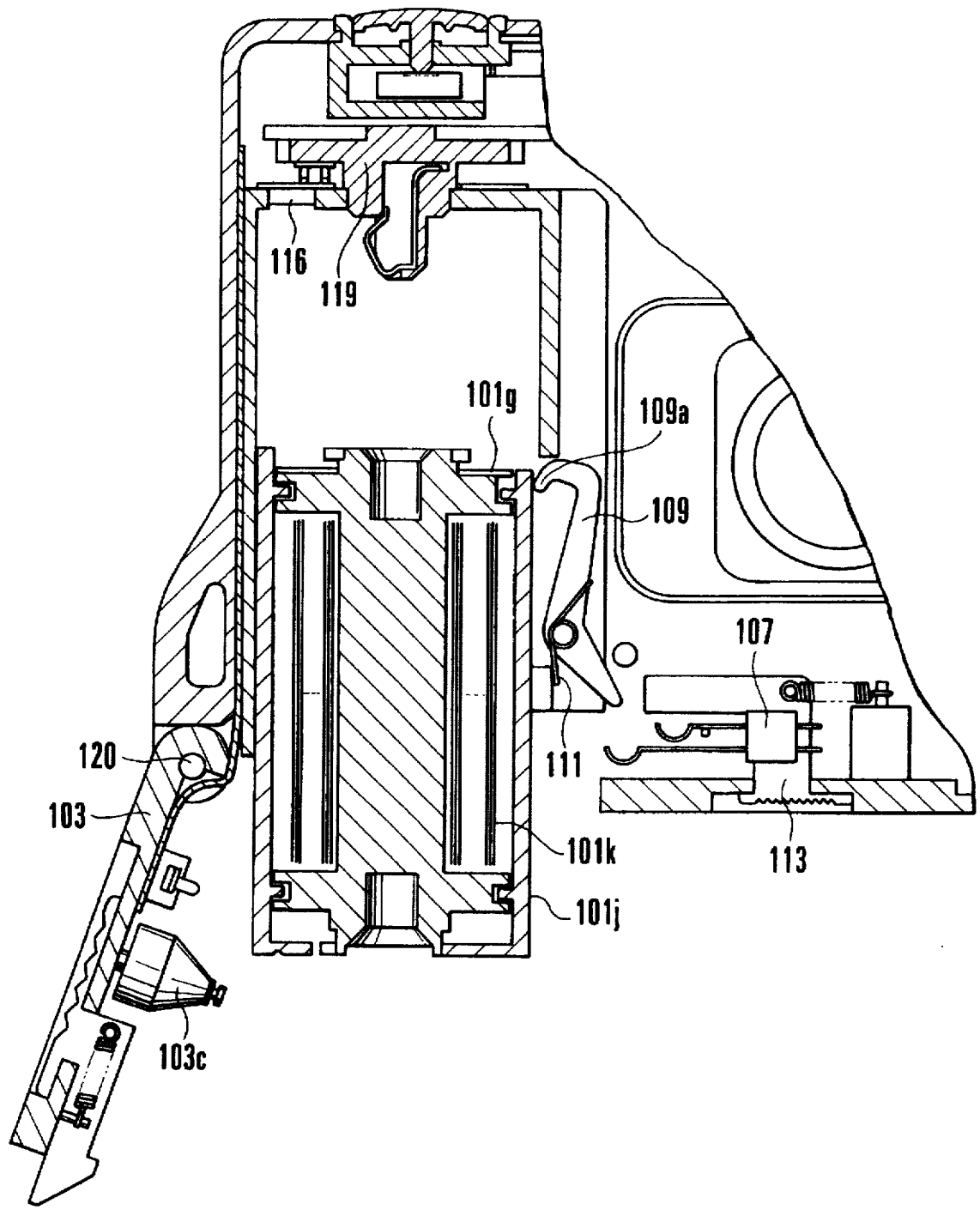
FIG. 37 is a cross-sectional view showing a state in which the film cartridge is inserted to a further extent from the state of FIG. 35.

In this case, since the film cartridge 101 is in the unexposed (F) state, the bendable lug portion 101a indicative of developed film is not bent. In addition, since the data disk 101g is stopped in such a phase that it covers the recess 101h, the hook portion 109a of the hook lever 109 is not inserted into the recess 101h, as shown in FIG. 35, whereby if the film cartridge 101 is forced inwardly, the hook portion 109a is pressed by the data disk 101g and rotated about the shaft 110 in the clockwise direction against the spring 111. As the film cartridge 101 is forced inwardly, the hook portion 109a is rotated until it comes into abutment with an external periphery 101j of the film cartridge 101 as shown in FIG. 37. After that, the film cartridge 101 can easily move up to a position where it engages with an engaging portion of the fork gear 119. Thus, the loading of the film cartridge 101 is completed.

Figure 38:
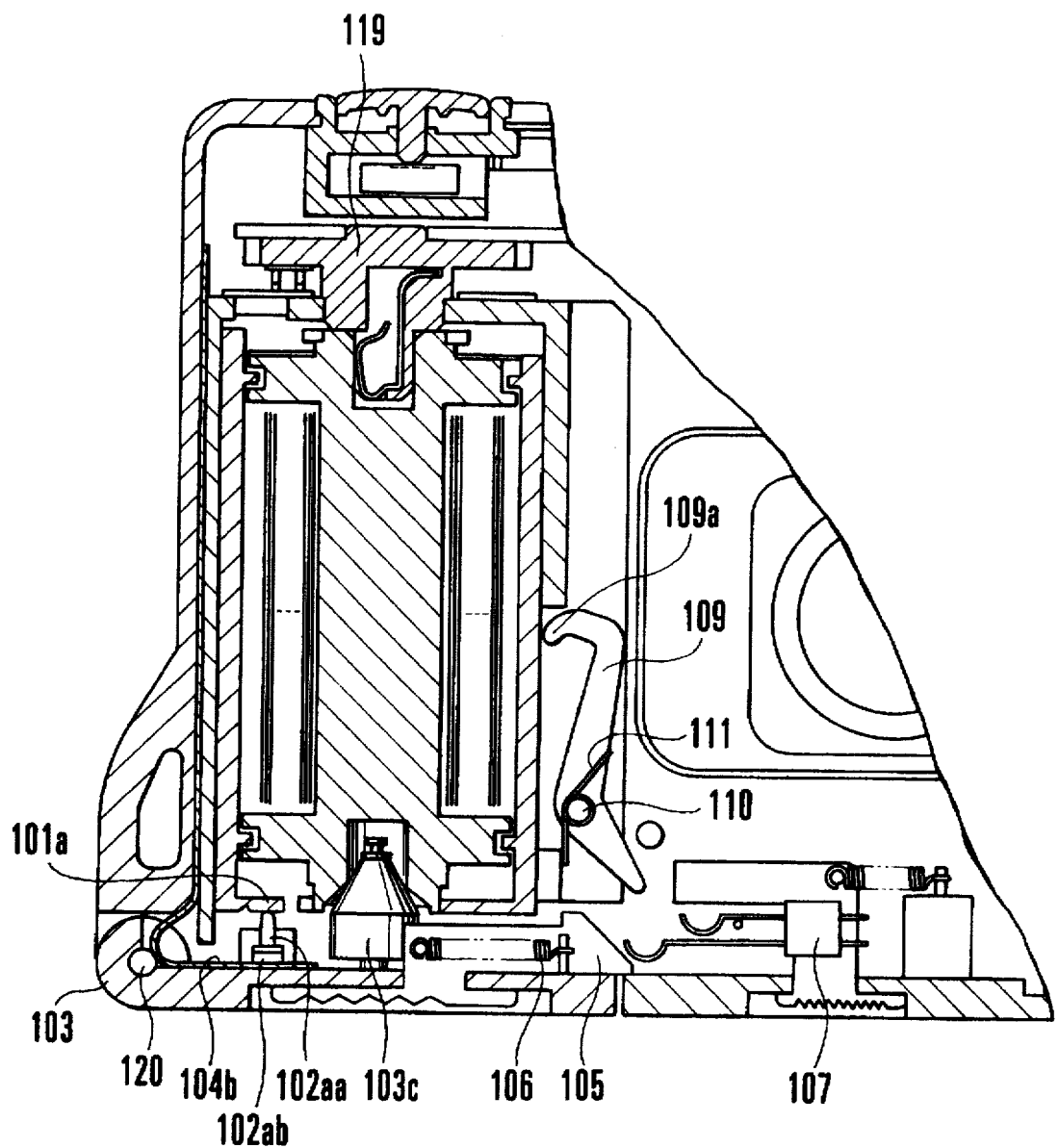
FIG. 38 is a cross-sectional view showing a state in which the loading of the film cartridge in the state of FIG. 37 is completed.

In this case, even if the loading of the film cartridge 101 is not perfect, the cartridge chamber lid 103 is rotated about the hinge 120 to be closed as shown in FIG. 38, whereby a spool pressing part 103c provided on the cartridge chamber lid 103 presses the film cartridge 101 to set the film cartridge 101 into engagement with the engaging portion of the fork gear 119.

In the state shown in FIG. 38, the cartridge chamber lid 103 is completely closed and the lid locking member 105 is slid toward the right by the urging of the spring 106. Therefore, the locking of the cartridge chamber lid 103 is being completed and the lid-locking completion switch 107 has not yet been turned on. Meanwhile, since the lug detecting part 102aa of the state-of-lug detecting switch 102 is pressed by the bendable lug portion 101a, the contact portion 102ab is electrically connected to the pattern 104b of the flexible printed circuit board 104. Specifically, as shown in FIG. 33, since the contact portion 102ac and the pattern 104a are pressed in contact with each other by the screw 108, the lug detecting part 102aa is pressed by the bendable lug portion 101a so that the contact portion 102ab and the pattern 104b are brought into contact with each other. Accordingly, the pattern 104a and the pattern 104b are shorted by the state-of-lug detecting switch 102. Thus, in the circuit shown in FIG. 36, the state-of-lug detecting switch 102 is turned on.

Figure 39:
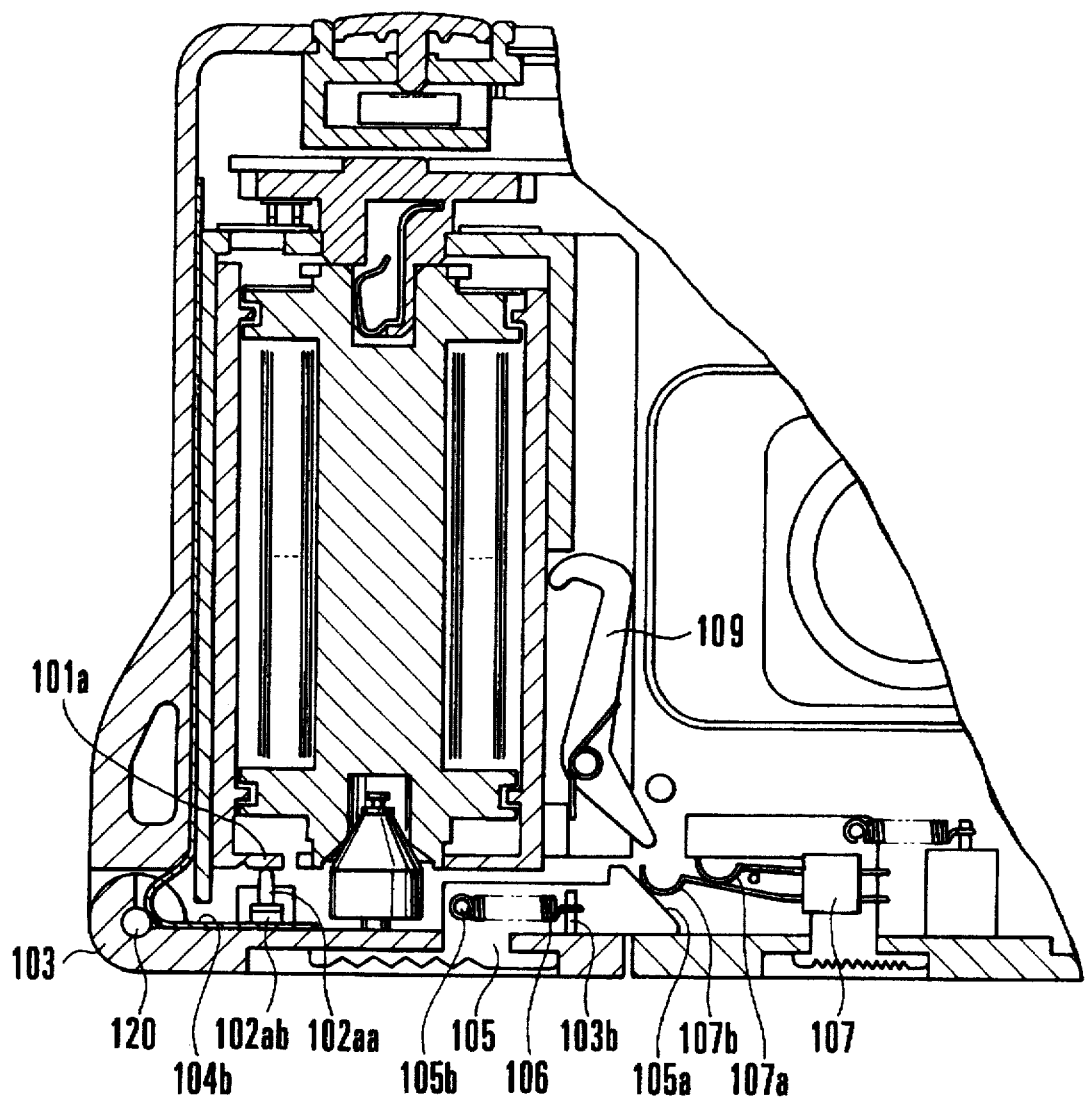
FIG. 39 is a cross-sectional view showing a state in which the locking of the cartridge chamber lid in the state of FIG. 38 is completed.

Then, as shown in FIG. 39, the lid locking member 105 is moved toward the right to a further extent by the spring 106. When the locking of the cartridge chamber lid 103 is completed, the extending end of the contact piece 107b of the lid-locking completion switch 107 is pressed upwardly by the inclined face 105a of the lid locking member 105, the contact pieces 107a and 107b come into contact with each other. Thus, in the circuit shown in FIG. 36, the lid-locking completion switch 107 is on and a lid-locking completion signal is inputted to the CPU 133, whereby the CPU 133 can determine that the film cartridge 101 having unexposed film has been loaded. The above-described operations correspond to decision-making operations performed in Steps S401 and S402 of FIG. 44. The operation of the CPU 133 will be described below with reference to the flowchart of FIG. 44.

If it is determined in Step S401 that the lid-locking completion switch 107 is on and it is determined in Step S402 that the state-of-lug detecting switch 102 (and the patterns 104a and 104b) is on, the process proceeds from Step S402 to Step S403, i.e., a photography preparing operation is started. At this time, since the film cartridge 101 and the camera are placed in the state shown in FIG. 39, the CPU 133 activates the photo-reflector 116 in Step S403 and rotates the motor 127 in a film rewinding direction via the motor controlling circuit 126 in Step S404. Thus, the fork gear 119 starts to rotate in the film rewinding direction. Then, in Step S405, the CPU 133 determines whether the output of the photo-reflector 116 has been detected. If the output of the photo-reflector 116 is detected in Step S405, the process proceeds to Step S406, in which the CPU 133 detects the phase of the spool 101i of the film cartridge 101 interlocked with the rotation of the fork gear 119 (from the position of the data disk 101g). Then, in Step S407, the CPU 133 stores this detected phase in its internal RAM, i.e., stores the state of use of the film 101k contained in the film cartridge 101.

In Step S408, the CPU 133 starts to read the film information from the data disk 101g via the photo-reflector 116. If the CPU 133 detects the completion of the reading of the film information in Step S409, the process proceeds from Step S409 to Step S410, in which the direction of rotation of the motor 127 is switched to a film winding direction. In Step S411, the CPU 133 detects whether the first frame of the film has reached an aperture position, from the output of the photo-reflector 125 for detecting the state of film transport. If it is detected that the first frame has reached the aperture position, the process proceeds to Step S412, in which the energization of the motor 127 is stopped. Thus, the photography preparing operation for the first frame is completed and the sequence is brought to an end.

The above description has referred to the operation performed by the CPU 133 when the film cartridge 101 containing unexposed film as shown in FIG. 32 is loaded. Then, the operation performed by the CPU 133 when the film cartridge 101 containing developed film, i.e., the film cartridge 101 having the bendable lug portion 101a bent as shown in FIG. 31, is loaded will be described below with reference to FIGS. 40 to 44.

As shown in FIG. 41, in the case of the film cartridge 101 containing developed film, the bendable lug portion 101a is bent to expose the recess 101h, and the rotational phase of the data disk 101g is such that the hook portion 109a of the hook lever 109 can be inserted into the recess 101h as shown in FIG. 40. Accordingly, as shown in FIG. 40, when the film cartridge 101 is to be loaded, the hook portion 109a of the hook lever 109 engages with the recess 101h and becomes unable to be inserted any more. Of course, the cartridge chamber lid 103 is not closed.

If the multiple-exposure knob 113 is slid toward the left as viewed in FIG. 40 against the spring 114, the end face 113b of the multiple-exposure knob 113 comes into abutment with the projecting portion 109b of the hook lever 109 to rotate the hook lever 109 in the clockwise direction until the hook lever 109 reaches the state shown in FIG. 41. If the film cartridge 101 is inserted to a further extent while manipulating the multiple-exposure knob 113 to maintain the state of FIG. 41, the film cartridge 101 can be forced inwardly up to the position where it engages with the fork gear 119, as described previously. After that, if the cartridge chamber lid 103 is closed, the state shown in FIG. 42 is obtained. In the case of the state of FIG. 42, since the manipulation of the multiple-exposure knob 113 is cancelled, the multiple-exposure knob 113 is moved toward the right as viewed in FIG. 42 by the spring 114, so that the hook lever 109 is slightly rotated up to and stopped at the position where the hook portion 109a comes into abutment with the external periphery 101j of the film cartridge 101.

After that, when the cartridge chamber lid 103 is closed, the lid locking member 105 is fully moved to the right by the spring 106 and locks the cartridge chamber lid 103. At the same time, the inclined face 105a of the lid locking member 105 presses the contact piece 107b of the lid-locking completion switch 107 upwardly to bring the contact pieces 107b and 107a into contact with each other, thereby turning on the lid-locking completion switch 107.

Figure 43:
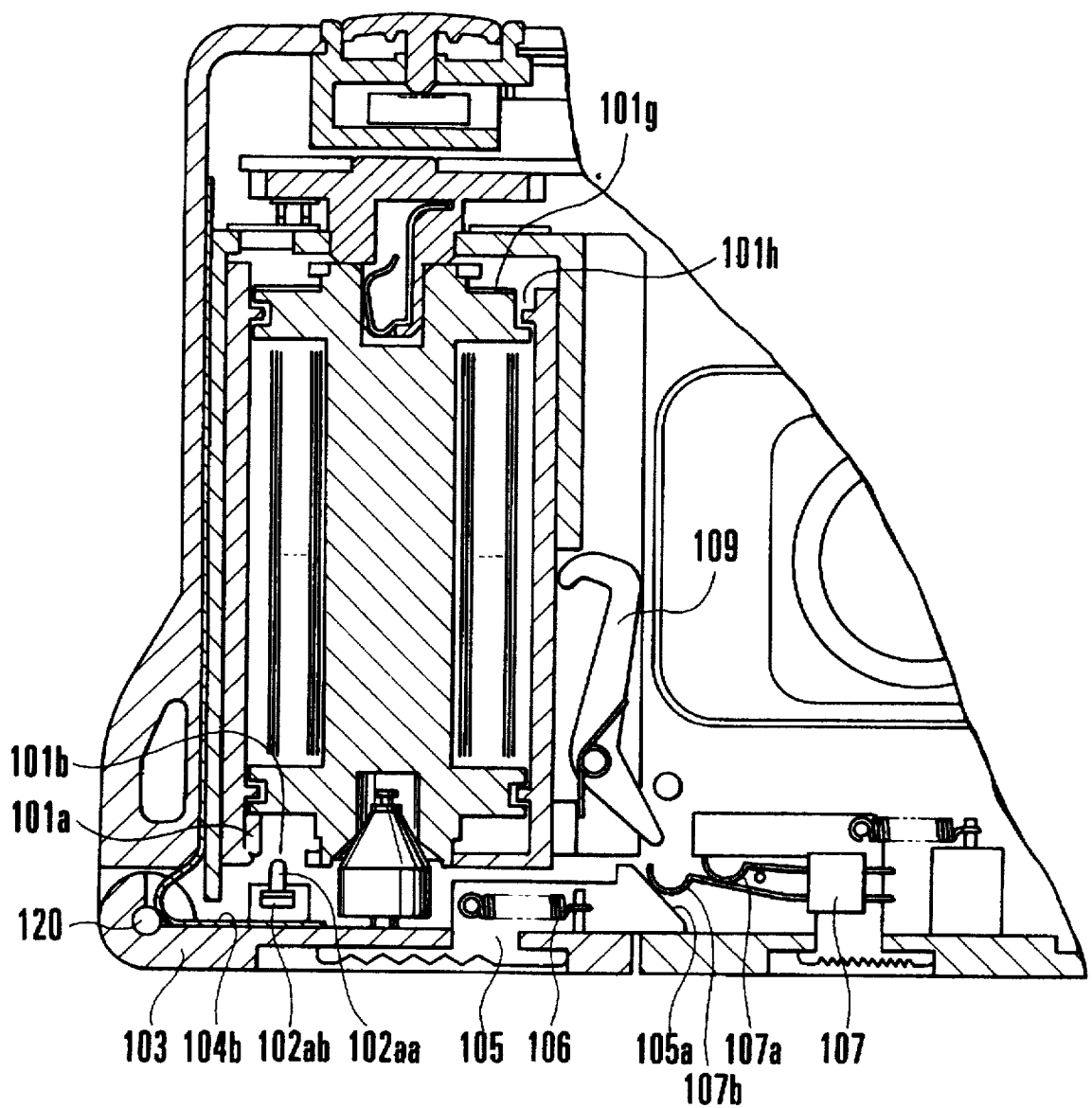
FIG. 43 is a cross-sectional view showing a state in which the locking of the film cartridge in the state of FIG. 42 is completed.

However, since the film cartridge 101 accommodated at this time contains developed film, the bendable lug portion 101a of the film cartridge 101 is bent as shown in FIG. 43, so that the lug detecting part 102aa is not pressed by the bendable lug portion 101a. Accordingly, the contact portion 102ab and the pattern 104b remain open and the state-of-lug detecting switch 102 remains off.

In the circuit shown in FIG. 36, although the lid-locking completion switch 107 is turned on, the state-of-lug detecting switch 102 remains off. Accordingly, no lid-locking completion signal is inputted to the CPU 133 and the CPU 133 determines that the cartridge chamber lid 103 has not yet been closed. The CPU 133, therefore, does not execute the photography preparing operation sequence. Accordingly, even if the film cartridge 101 containing developed film is loaded by means of the multiple-exposure knob 113, the multiple-exposure knob 113 can detect that fact without performing any detecting operation. The display 132 warns the user that the camera does not proceed to the photography preparing operation.

The above-described operation will be described below with reference to the flowchart of FIG. 44. If it is determined in Step S401 that the lid-locking completion switch 107 is on, the process proceeds to Step S402. If the state-of-lug detecting switch 102 (and the patterns 104a and 104b) is not turned on in Step S402, the process returns from Step S402 to Step S401 without proceeding to Step S403. The processing of Steps S401 and S402 is equivalent to the operation of detecting the presence or absence of the film cartridge 101 from the state of the lug detecting part 102aa. In other words, even if a film cartridge such as a developed-film cartridge which is not available to the camera is loaded, it can be equivalently determined that no film cartridge is present in the camera. Accordingly, it is possible to eliminate an unnecessary operation from the camera.

Figure 44:
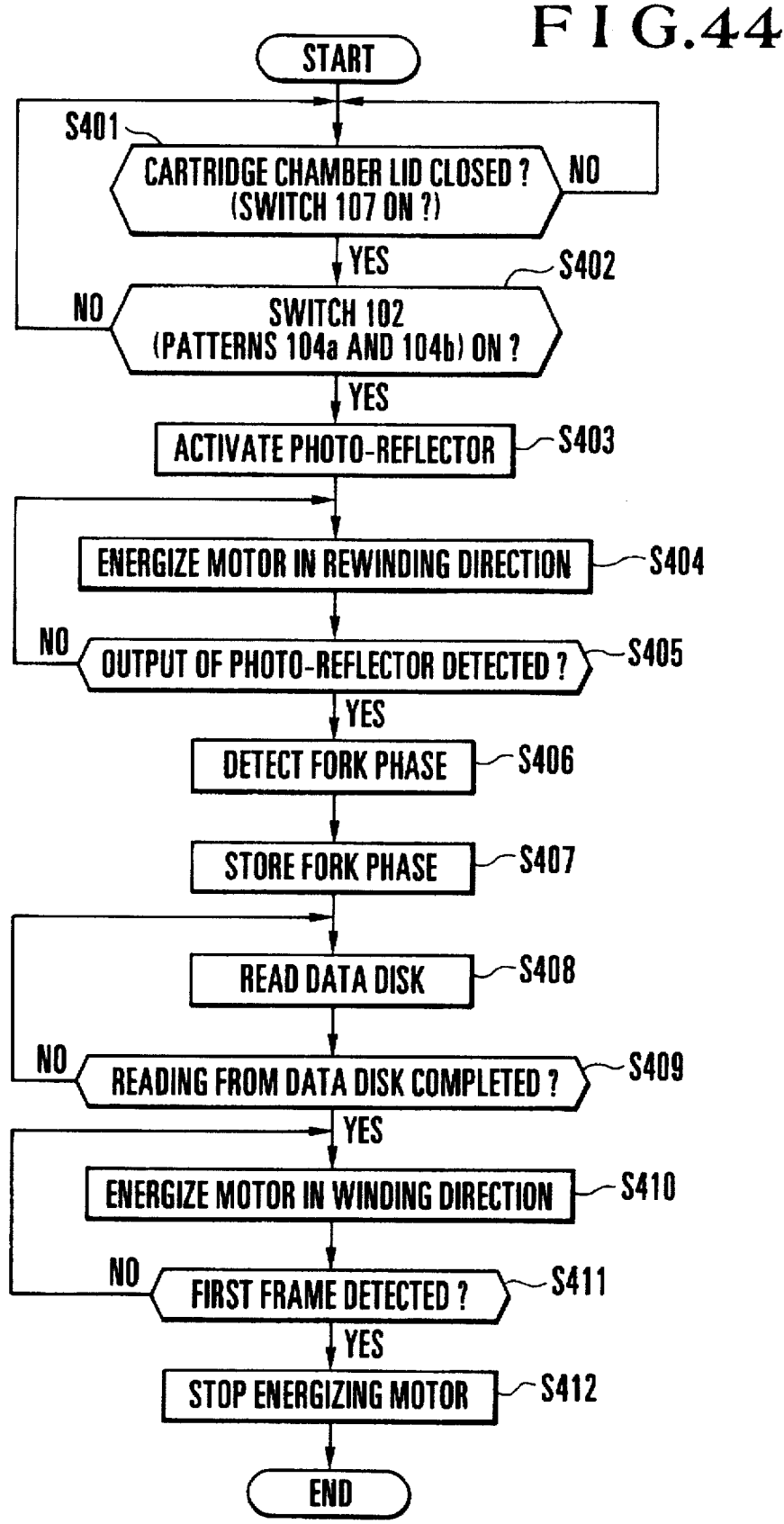
FIG. 44 is a flowchart showing the operation of the essential portion of the camera according to the fourth embodiment of the present invention.
Figure 46:
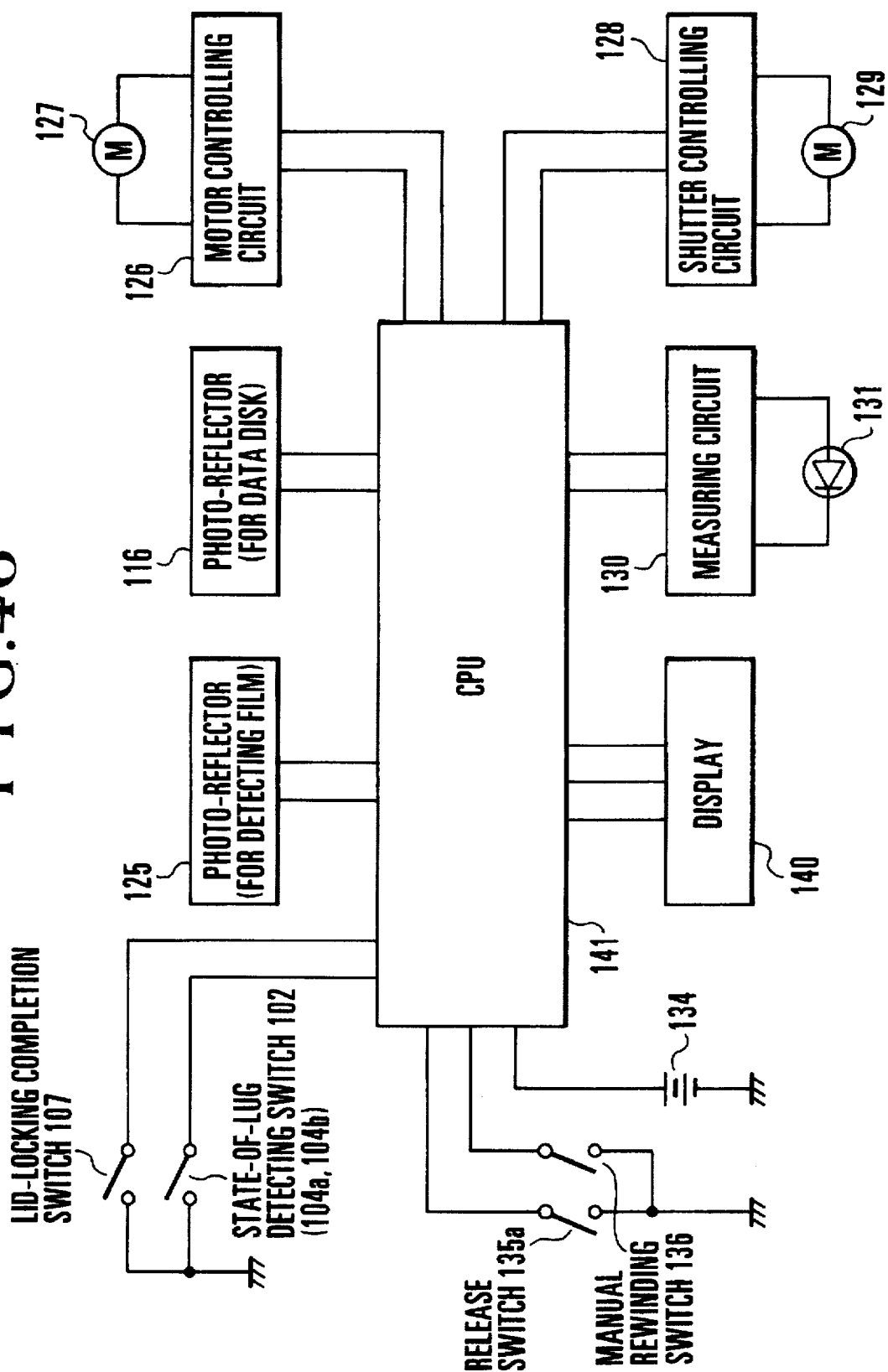
FIG. 46 is a block diagram showing the electrical arrangement of a camera according to a sixth embodiment of the present invention.

In the arrangement shown in FIG. 36, the lid-locking completion switch 107 and the state-of-lug detecting switch 102 are connected in series, so that it is impossible to separately detect the states of the switches 107 and 104 and the flow (Steps S401 and S402) shown in FIG. 44 is not realized. However, for the convenience of explanation, the above description assumes that the states of the respective switches 107 and 102 can be separately detected. Specifically, it is assumed that the lid-locking completion switch 107 and the state-of-lug detecting switch 102 are connected in parallel, as shown in FIG. 46 which shows a sixth embodiment to be described later, and the CPU 133 carries out the logical AND between the states of the respective switches 107 and 102 and executes processing.

To adapt the flow of FIG. 44 for the arrangement shown in FIG. 36, Steps S401 and S402 may be prepared as a single step in which it is determined whether the process proceeds to Step S403, according to whether the lid-locking completion signal has been generated.

Figure 45:
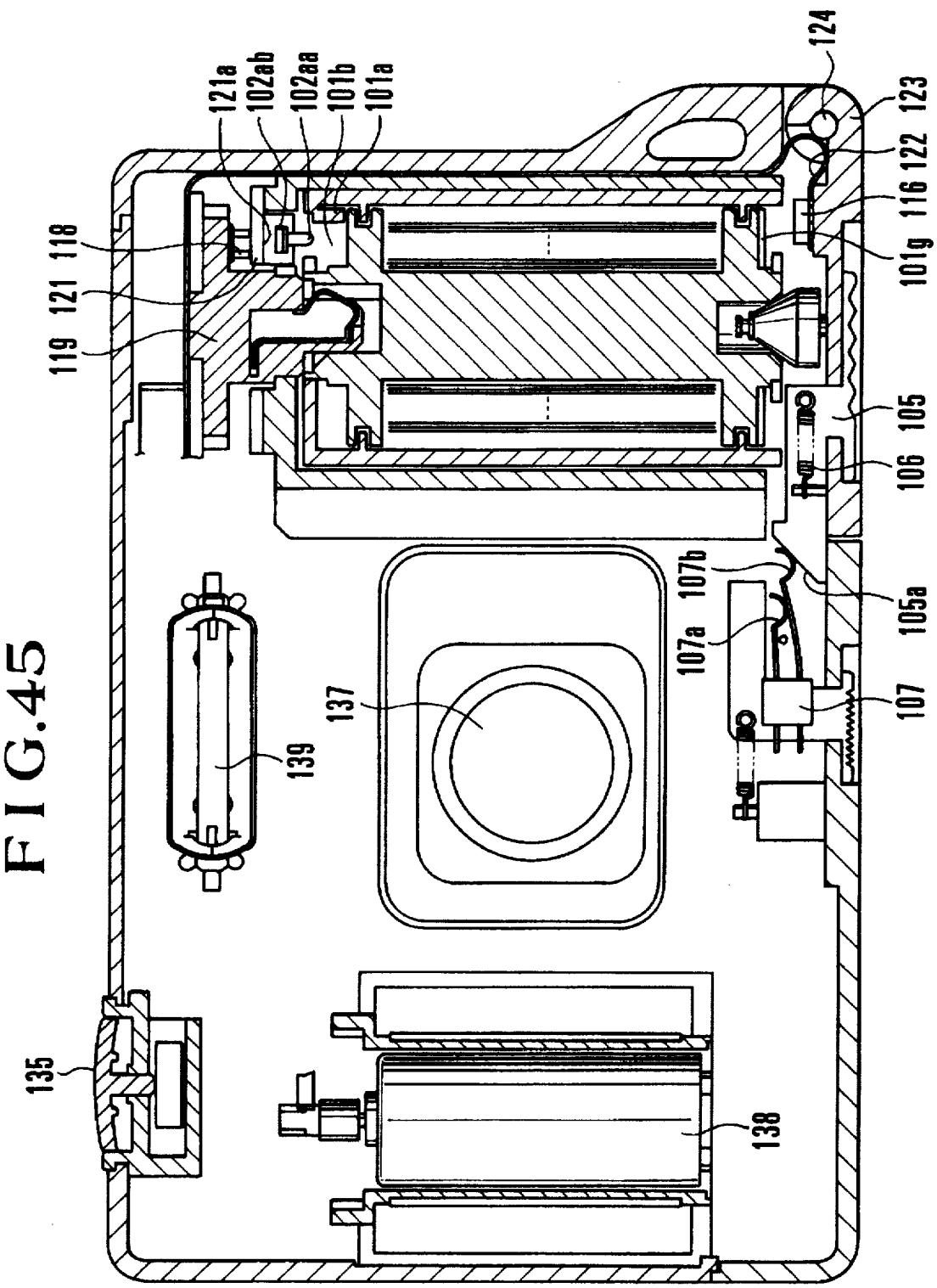
FIG. 45 is a partly cross-sectional view of the mechanical arrangement of a camera according to the fifth embodiment of the present invention.

FIG. 45 is a partly cross-sectional view of a camera according to a fifth embodiment of the present invention. In FIG. 45, identical reference numerals are used to denote constituent elements having functions identical to those of the constituent elements used in the fourth embodiment.

According to the fifth embodiment, the state-of-lug detecting switch 102 having the lug detecting part 102aa and the like which are to come into abutment with the bendable lug portion 101a of the film cartridge 101 (in the case of unexposed film) are provided not on a cartridge chamber lid 123 but in the camera body. The bendable lug portion 101a is provided on the film cartridge 101 at the position shown in FIG. 45.

In this arrangement as well, similarly to the fourth embodiment, the state of the bendable lug portion 101a can be detected by the lug detecting part 102aa provided at the extending end of the state-of-lug detecting switch 102. If the bendable lug portion 101a is bent as shown in FIG. 45, the contact portion 102ab is not in contact with a pattern (not shown) provided on a bottom face 121a of a printed circuit board 121, which pattern is similar to the patterns 104a and 104b of the flexible printed circuit board 104. Accordingly, even if the cartridge chamber lid 123 is locked and the contact pieces 107a and 107b of the lid-locking completion switch 107 are in contact with each other, no lid-locking completion signal is generated and the process does not proceed to Step S403 shown in FIG. 44. Incidentally, the photo-reflector 116 for reading the data disk 101g is provided on a flexible printed circuit board 122 of the cartridge chamber lid 123. The cartridge chamber lid 123 is rotatable about a shaft 124 and can be locked by the lid locking member 105 in a manner similar to that described previously in connection with the fourth embodiment.

The camera shown in FIG. 45 also includes a photographic lens 137, a film transport motor 137 (corresponding to the motor 127 shown in FIG. 36) disposed within a film winding spool, and a flash unit 139 incorporated in the camera.

Figure 47:
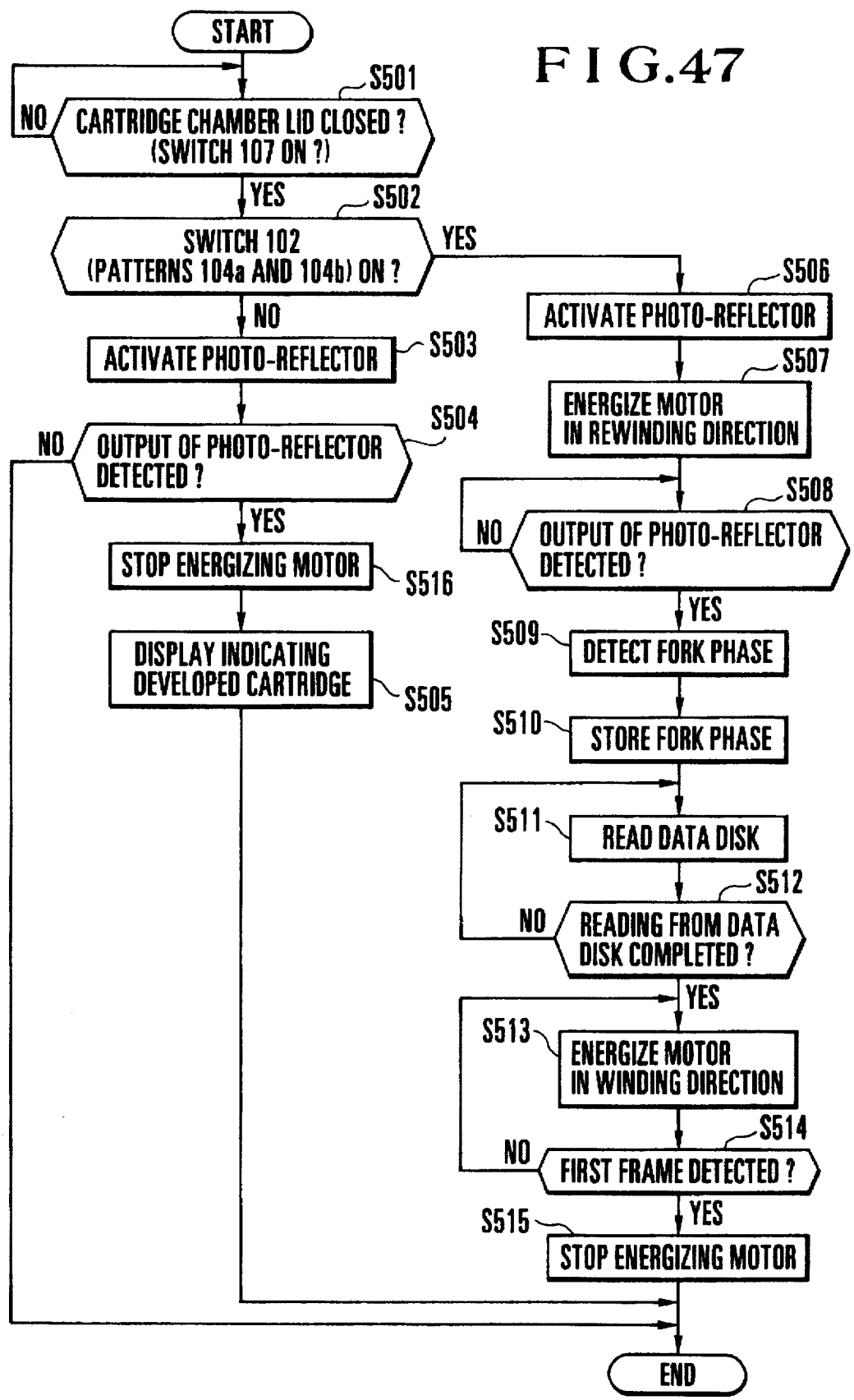
FIG. 47 is a flowchart showing the operation of the essential portion of the camera according to the sixth embodiment of the present invention.

FIGS. 46 and 47 are views showing a sixth embodiment of the present invention, and FIG. 46 is a block diagram showing the electrical arrangement of the sixth embodiment. In FIG. 46, identical reference numerals are used to denote constituent elements identical to those shown in FIG. 36.

Referring to FIG. 46, the lid-locking completion switch 107 and the state-of-lug detecting switch 102 are separately connected to a CPU 141, so that state signals from the respective switches 107 and 102 can be separately inputted to the CPU 141.

In this arrangement, when the lid-locking completion switch 107 is on, a display 140 can provide different visual displays according to whether the state-of-lug detecting switch 102 (and the patterns 104a and 104b) is on or off.

The operation of the third embodiment will be described below with reference to the flowchart for the CPU 141, which is shown in FIG. 47.

If it is determined in Step S501 that the lid-locking completion switch 107 is on, it is determined in Step S502 whether the state-of-lug detecting switch 102 (and the patterns 104a and 104b) is on. If it is not on, the process proceeds to Step S503, in which the motor 127 is energized in the rewinding direction. Then, in Step S504, the photo-reflector 116 is activated and it is determined whether the bar code on the data disk 101g can be detected. If no bar code can be detected, the CPU 141 determines that no film cartridge is loaded in the camera, and brings the sequence to an end.

If the bar code on the data disk 101g is detected in Step S504, the process proceeds to Step S516, in which the energization of the motor 127 is stopped. In Step S505, the CPU 141 determines that the loaded film cartridge contains developed film, and causes the display 140 to provide visual display to that effect. Then, the CPU 141 brings the sequence to an end.

The other operations are similar to those of the fourth embodiment described previously (refer to FIG. 44), and the description thereof is omitted.

According to the above-described sixth embodiment, users can be informed that since the film cartridge 101 containing developed film is loaded in the camera, the camera is unable to perform a photographing operation. Accordingly, it is possible to prevent the problem that a user mistakenly loads a developed-film cartridge into the camera and fails to photograph any scene.

Figure 48:
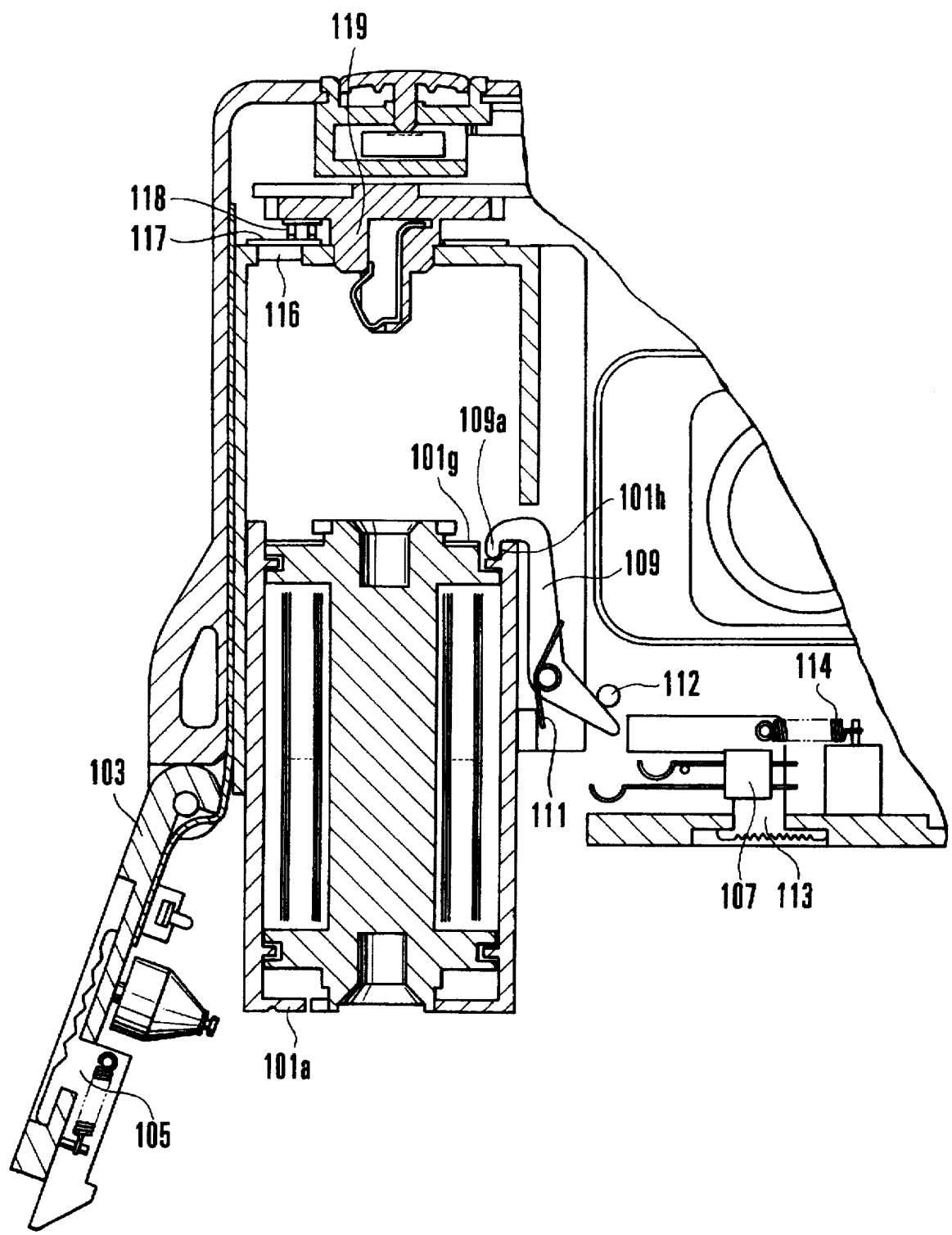
FIG. 48 is a cross-sectional view showing the essential portion of the mechanical arrangement of a camera according to a seventh embodiment of the present invention.
Figure 49:
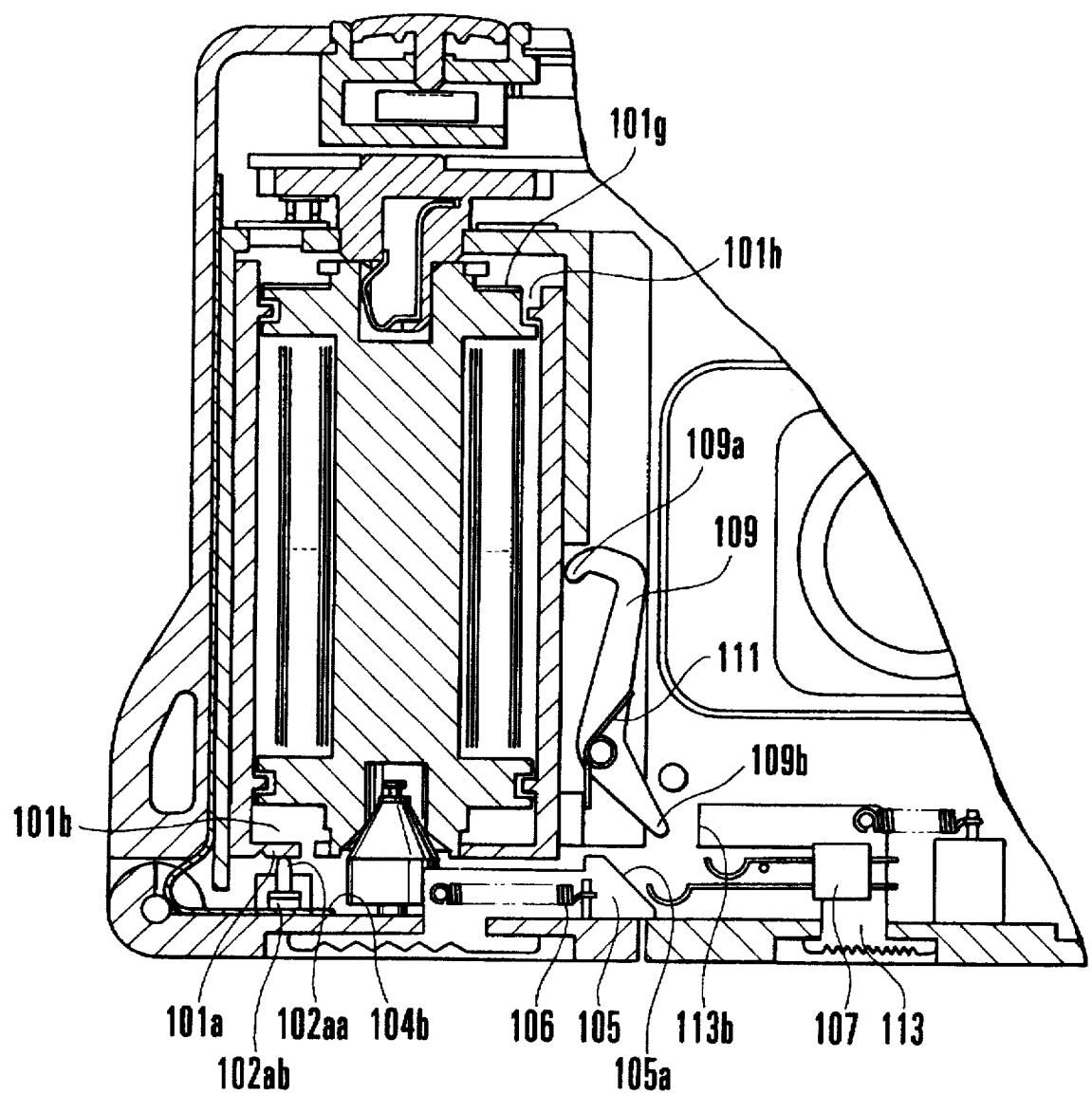
FIG. 49 is a cross-sectional view showing a state in which the loading of a film cartridge in the state of FIG. 48 is completed.
Figure 50:
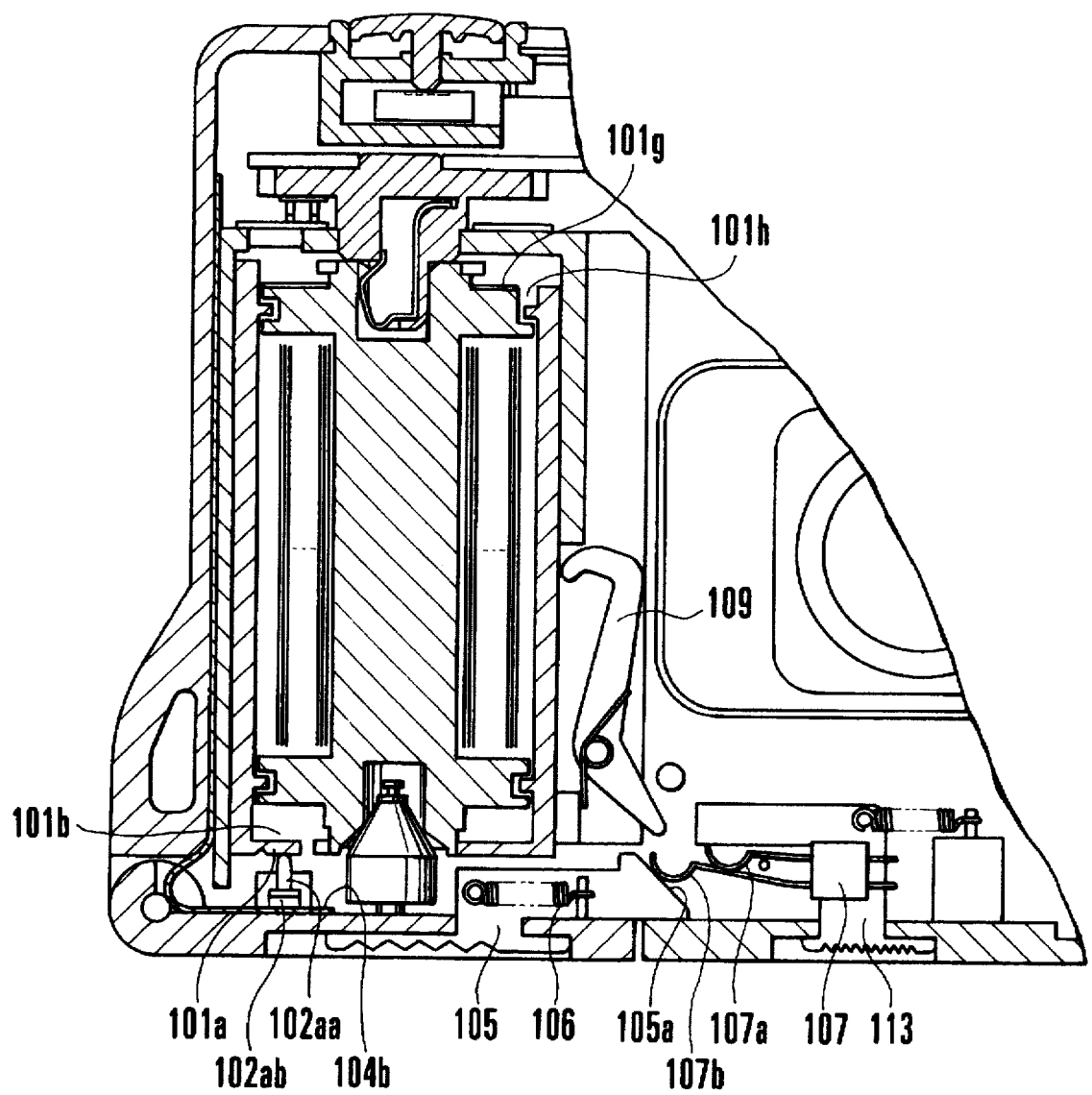
FIG. 50 is a cross-sectional view showing a state in which the locking of the film cartridge in the state of FIG. 49 is completed.
Figure 52:
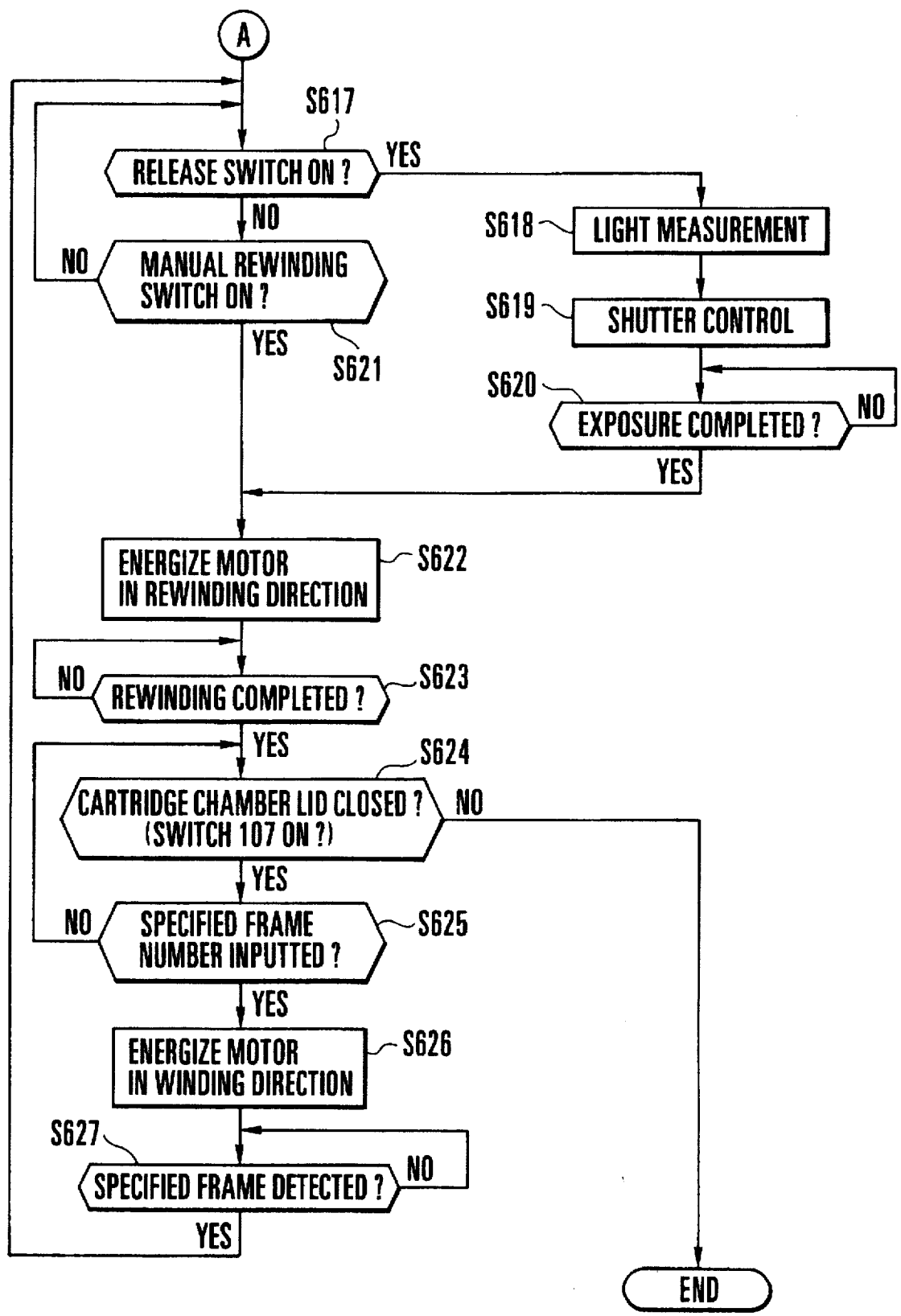
FIG. 52 is a flowchart showing the remaining part of the operation of FIG. 51.

FIGS. 48 to 52 are views showing a seventh embodiment of the present invention. FIGS. 48 to 50 are partly cross-sectional views showing the process in which a film cartridge containing partly or fully exposed film is loaded by the manipulation of a multiple-exposure knob. FIGS. 51 and 52 are a flowchart of the CPU 141.

The circuit construction of the seventh embodiment is similar to that shown in FIG. 36, and the description thereof is omitted.

Referring to FIG. 48, if the film cartridge 101 which contains partly exposed film (P) or fully exposed film (E) is to be loaded, such film cartridge 101 cannot be inserted beyond the position shown in FIG. 48. This is because the data disk 101g is stopped in a rotational phase indicative of the partly exposed film (P) or the fully exposed film (E) and the recess 101b of the film cartridge 101 is exposed to the outside so that the hook portion 109a of the hook lever 109 engages with the recess 101h during the insertion of the film cartridge 101.

If the multiple-exposure knob 113 is slid toward the left for the purpose of performing multiple exposure using this film cartridge 101, the end face 113b presses the projecting portion 109b of the hook lever 109 to rotate the hook lever 109 against the spring 111 in the clockwise direction, thereby withdrawing the hook portion 109a from the cartridge chamber lid 103 as described previously. Thus, the film cartridge 101 becomes able to be loaded as shown in FIG. 49.

After that, if the spring 106 is slid toward the right by the spring 106, the cartridge chamber lid 103 is completely locked as shown in FIG. 50, and the contact pieces 107a and 107b of the lid-locking completion switch 107 are brought into contact with each other, whereby the lid-locking completion switch 107 is turned on. Also, during the state shown in FIG. 49, the lug detecting part 102aa is pressed by the bendable lug portion 101a to bring the contact portion 102ab and the pattern 104b of the flexible printed circuit board 104 into contact with each other as shown in FIG. 33. Accordingly, the patterns 104a and 104b are shorted and the state-of-lug detecting switch 102 is also on.

The sequence operation will be described below with reference to the flowchart shown in FIGS. 51 and 52.

Referring to FIG. 51, if it is determined in Steps S601 and S602 that the camera is in the state shown in FIG. 50, i.e., the cartridge chamber lid 103 is completely locked by the lid locking member 105 and the film cartridge 101 loaded in the camera contains undeveloped film, the process proceeds to Step S603, in which the photo-reflector 116 for reading the data disk 101g is activated. Then, the motor 127 is driven in the rewinding direction in Step S604, and it is determined in Step S605 whether the photo-reflector 116 can detect the movement of the data disk 101g.

If it is determined in Step S605 that the photo-reflector 116 can detect the movement of the data disk 101g, the phase of the fork gear 119 at that time is detected through the phase of contact between the contact piece 118 and the printed circuit board 117, i.e., the state of the film cartridge 101 is detected. Then, in Step S607, the content of the data disk 101g is read and stored. In Step S608, it is determined whether the state of the film cartridge 101 detected in Step S606 is a partly exposed state (P) or a fully exposed state (E). If the state of the film cartridge 101 detected in Step S606 is the partly or fully exposed state (P) or (E), the process proceeds to Step S612, in which a multiple-exposure mode is set.

When the film cartridge 101 which is placed in the partly exposed state (P) or the fully exposed state (E) is inserted into the camera, the camera can determine that the user has intentionally manipulated the multiple-exposure knob 113 and loaded the film cartridge 101 in the partly exposed state (P) or fully exposed state (E), and performs setting of the multiple-exposure mode. Accordingly, the camera is capable of setting the multiple-exposure mode without the need to provide any electrical-signal generating means in the multiple-exposure knob 113.

After the multiple-exposure mode has been set, it is determined in Step S613 whether the lid-locking completion switch 107 remains on. If the lid-locking completion switch 107 is off, the sequence is brought to an end. If the lid-locking completion switch 107 remains on, the process proceeds to Step S614, in which it is determined whether a frame number to be subjected to multiple exposure has been inputted. If a frame number to be subjected to multiple exposure has not yet been inputted, the process returns to Step S613 and waits for such frame number to be inputted. During this time, although not specifically described herein, the display 132 of FIG. 32 provides visual display to that effect to inform the user that the camera is in the waiting state.

Incidentally, in Step S614, the process does not proceed to the next step so far as no frame number to be subjected to multiple exposure is inputted, for the purpose of preventing accidental multiple exposure. In addition, since the process returns to Step S614 to S613, the user can cancel multiple exposure even while the camera is in the waiting state, if desired. In Step S613, if the cartridge chamber lid 103 is opened, the sequence is brought to an end in the above-described manner.

If a frame number to be subjected to multiple exposure is inputted in Step S614, the process proceeds to Step S615, in which the motor 127 is energized in the winding direction. In Step S616, it is determined whether the frame number specified in Step S614 has been detected. If the specified frame number is detected, it is determined that a multiple-exposure preparing operation has been completed, and the process proceeds to Step S617 of FIG. 52. In Step S617, it is determined whether the release switch 135a has been turned on by pressing the release button 135. If the release switch 135a has not been turned on, the process proceeds from Step S617 to Step S621, in which it is determined whether the manual rewinding switch 136 has been turned on for the purpose of cancelling multiple exposure after the completion of the multiple-exposure preparing operation. If the manual rewinding switch 136 has been turned on, the process proceeds to Step S622, in which the motor 127 is energized in rewinding direction. In Step S623, it is determined from the output of the photo-reflector 125 whether the rewinding of the film has been completed. If the rewinding of the film is completed, it is determined in Step S624 whether the cartridge chamber lid 103 has been opened, and if the cartridge chamber lid 103 is open, the process proceeds to Step S625 and waits until a frame number to be subjected to multiple exposure is again inputted.

If it is determined in Step S617 that the release switch 135a has been turned on for the purpose of multiple exposure, the process proceeds from Step S617 to Step S618, in which the measuring circuit 130 and the associated constituent elements are driven to perform a light measuring operation. Then, in Steps S619 and S620, the shutter controlling circuit 128 and the associated constituent elements are used to perform a shutter opening operation (exposure operation) for a time period based on the data and the like obtained from the aforesaid light measuring operation. Thus, the desired frame is subjected to multiple exposure.

When the aforesaid multiple-exposure operation is completed, the process proceeds to Step S622, in which the motor 127 is energized in the film rewinding direction to rewind the film. Then, it is determined in Step S623 whether the rewinding of the film has been completed. If the rewinding of the film is completed, it is determined in Step S624 whether the cartridge chamber lid 103 has been opened to bring multiple exposure to an end. If the cartridge chamber lid 103 has not been opened, the process proceeds to Step S625, in which it is determined whether a frame number to be subjected to multiple exposure has been inputted. In Steps S624 and S625, the process waits for such frame number to be inputted. This sequence is intended to allow a photography preparing operation for multiple exposure to be performed for only a specified frame, thereby preventing accidental multiple exposure. It is to be noted that although only one frame can be specified at a time as a frame to be subjected to multiple exposure, another inputting method may also be realized by a similar sequence. For example, a plurality of frames may be specified at a time or all the frames that follow a particular frame may be specified at a time.

Another merit of the above-described processing is that if the user sets the multiple-exposure mode on the camera loaded with a film cartridge in the partly exposed state (P), the user can perform normal exposure of a desired unexposed frame of the film contained in the film cartridge, by specifying the desired unexposed frame as a frame to be subjected to multiple exposure.

If the cartridge chamber lid 103 is opened in Step S624, the sequence is brought to an end. If the cartridge chamber lid 103 is not opened, the process proceeds to Step S625 and waits until a frame number to be subjected to multiple exposure is again inputted, as described previously. If such frame number is inputted, the process proceeds to Step S626, in which the motor 127 is energized in the winding direction. If this specified frame number is detected in Step S627, the process returns to Step S617 and waits for a shutter release operation to be performed.

If it is determined in Step S608 that the film cartridge 101 is not in the partly exposed state (P) or the fully exposed state (E), it is determined in Step S628 whether the film cartridge 101 is in a developed state (D). If the film cartridge 101 is in the developed state (D), it is determined that an error has occurred, an abnormality signal is generated and the display 140 is made to provide a warning display (Step S629). If not so, this indicates that the loaded film cartridge contains unexposed film, and the process proceeds to Step S609 for the purpose of a photography preparing operation. In Step S609, the motor 127 is energized in the winding direction, and, in Step S610, it is detected whether the first frame of the film has reached an aperture position, from the output of the photo-reflector 125 for detecting the state of film transport. If it is detected that the first frame of the film has reached the aperture position, the process proceeds to Step S611, in which the energization of the motor 127 is stopped. Thus, the photography preparing operation for the first frame is completed and the sequence is brought to an end.

In addition to the above description of the arrangement and construction as well as the operation of each of the embodiments of the present invention, a brief description will be given of the primary effects and advantages of the respective embodiments.

According to the first to third embodiments, even if it is impossible to securely stop the first state displaying means (the data disk 6) in an appropriate rotational phase (stop phase), the state of the second state displaying means (the lug portion 2c) which ensures accurate state detection at all times is preferentially detected. Accordingly, it is possible to securely prevent users from performing photography by mistakenly using a film cartridge which contains developed film. The first state displaying means is arranged to provide state display in the stop phase, and once the camera fails to detect the state of the film, the camera will be unable to again detect the state of the film. For this reason, it is necessary to back up the first state displaying means by an appropriate method. The first to third embodiments offer an extremely effective method which can solve such a problem. In addition, in the first embodiment, even if the state of the film cannot be detected through either of the above-described displaying means, the reading magnetic head 19 is employed to detect whether magnetic information is stored on the film for each frame, and a final decision is made as to the state of the film on the basis of the detection result obtained from the reading magnetic head 19. Accordingly, it is possible to more securely solve the above-described problem.

In addition, merely by providing a single switch for detecting the state of loading of a film cartridge, as in the second embodiment, it is possible to securely determine whether a loaded film cartridge contains developed film, even if the film cartridge in a developed state is loaded in a different state. Accordingly, it is possible to compatibly satisfy low cost and high reliability (since occurrence of unnecessary photographing operation is prevented). In addition, with the above-described arrangement, it is possible to equivalently cope with the state in which a developed-film cartridge is loaded and the state in which a film cartridge is unloaded. It is, therefore, possible to securely prevent users from performing unnecessary photography with no film cartridge loaded.

According to the first to third embodiments, if a user draws a developed negative film from a film cartridge by using a simple negative-film drawing device or the like for the purpose of visual check and intentionally or mistakenly loads the film cartridge into the camera according to these embodiments without returning the stop phase of the first state displaying means (the data disk 6) to a prescribed position, the camera detects the second state displaying means and automatically and forcedly modifies the rotational phase of the first state displaying means to a correct stop phase position. Accordingly, it is possible to achieve great advantages; for example, it is possible to prevent an accident from occurring when a film cartridge is loaded into a camera having means for detecting only the first state displaying means.

According to the fourth to sixth embodiments, in a camera which can be loaded with a film cartridge which can be made to display that a developed film is accommodated therein, by bending the bendable lug portion 101a provided at one end face of the film cartridge, no lid-locking completion signal is generated if a film cartridge is loaded with the bendable lug portion 101a being bent. Accordingly, unlike conventional examples, if a film cartridge which contains developed film is loaded into the camera, it is not necessary to cause the camera to perform unnecessary operations for detecting the state of the film cartridge, such as the operation of driving a fork gear of the camera and optically detecting the output of the data disk 101g provided on the film cartridge, or the operation of detecting the state of the film cartridge from the phase of the film winding spool of the film cartridge.

According to the fourth, fifth and seventh embodiments, a switch for detecting the state of the bendable lug portion 101a (the state-of-lug detecting switch 102) and the associated constituent elements are provided in series with a switch for detecting whether the film-cartridge chamber lid is opened or closed (the lid-locking completion switch 107). Accordingly, it is not necessary to provide a circuit for detecting a signal indicating that a film cartridge has been loaded with the bendable lug portion 101a being bent, whereby it is possible not only to remarkably improve reliability but also to reduce costs.

According to the seventh embodiment, a user can load a film cartridge which contains partly or fully exposed film, by manipulating the multiple-exposure knob 113. The multiple-exposure knob 113 merely mechanically releases a loading inhibiting member (the hook lever 109) and it is not necessary to transmit any electrical signal to the CPU 141 of the camera. Accordingly, it is possible to reduce costs and also to realize a highly reliable system.

In the case of a film cartridge in which a film has been rewound once, since the lid-locking completion switch is turned on after having been turned off once by the manipulation of the lid locking member 105, the CPU 141 will determine that a new film cartridge has been loaded. For this reason, it has normally been necessary to provide a removal-of-film-cartridge detecting switch or the like for preventing malfunction. However, in the seventh embodiment, even if the lid locking member 105 is manipulated without removing the film cartridge from the camera, if the camera determines that the film cartridge contains partly or fully exposed film, the camera can select the multiple-exposure mode without causing any problem. In addition, it is not necessary to provide the removal-of-film-cartridge detecting switch or the like in the camera.

Further, if the multiple-exposure mode is selected, the camera can give a user a warning to that effect by performing a photography preparing operation for only a frame which is specified by the user as a frame to be subjected to multiple exposure. The number of frames to be specified for the purpose of multiple exposure is not limited to one, and it is also possible to adopt an arrangement which enables multiple exposure of a plurality of frames or all the frames that follow a particular frame. Another merit of the seventh embodiment is that if the user loads a film cartridge in the partly exposed state (P) and specifies multiple exposure of an unexposed portion of the film, it becomes possible to perform normal exposure of the unexposed portion.

According to the sixth embodiment, a common switch is used for detecting the bendable lug portion 101a and the presence or absence of a film cartridge. Since a film cartridge in the developed state (D) is not needed for the camera, even if such film cartridge is loaded into the camera, the camera can determine that there is no film cartridge (refer to Steps S502 and S503 of FIG. 47), without checking whether the loaded film cartridge is in the developed state (D), by using a photo-reflector or the like. In addition, after the presence of a film cartridge in the camera has been detected through the detection of the state of the bendable lug portion 101a, if it is determined through the photo-reflector or the like that the loaded film cartridge is in the developed state (D), the CPU 141 determines that an error has occurred, and outputs an abnormality signal so that the camera can give the user a warning (refer to Steps S628 and S629 of FIG. 51).

The above-described arrangement and construction of the camera for handling a developed-film cartridge as well as those of an apparatus adapted for the camera are not limited to any of the above-described embodiments, and the present invention can be applied to any type of camera or apparatus as required.

The present invention is not limited to the arrangement in which a film cartridge is loaded or unloaded from below or above the camera as described above in connection with the embodiments. For example, the present invention can be applied to an arrangement in which a film cartridge is loaded from either side of the camera.

The present invention is not limited to the arrangement in which the film cartridge is loaded or unloaded in the axial direction thereof as described above in connection with the embodiments.

The present invention can also be applied to various image recording media other than film.

The present invention can also be applied to a film cartridge of any type other than the ones referred to in the description of the embodiments, a cartridge having an image recording medium other than film, any other kind of cartridge and a battery or a similar loading/unloading type of subject other than such a cartridge.

In addition, in the present invention, any type of means, such as electronic, optical or magnetic, can be used as means for making a decision as to the state of an image recording medium incorporated in a cartridge.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be practised by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various types of cameras such as a single-lens reflex camera, a lens shutter camera or a video camera, optical apparatuses other than such cameras, apparatuses other than the optical apparatuses, apparatuses adapted for the cameras or the optical or other apparatuses, or elements which constitute part of such apparatuses.

What is claimed is:

1. A camera adapted to an image recording medium cartridge in which an image recording medium is contained, comprising:

a first determination device which determines a state of use of the image recording medium contained in the image recording medium cartridge; and a second determination device which determines whether the image recording medium contained in the image recording medium cartridge is already developed, a determination of said second determination device having priority over a determination of said first determination device.

2. A camera according to claim 1, wherein the image recording medium includes a film.

3. A camera according to claim 1, wherein said second determination device includes means for determining an index indicating whether the image recording medium is already developed.

4. A camera according to claim 1, wherein said second determination device includes means for determining an index of the image recording medium cartridge, which index indicates whether the image recording medium is already developed.

5. A camera according to claim 1, wherein said second determination device includes lug-portion determination means for determining a state of a lug portion of the image recording medium cartridge, which lug portion indicates whether the image recording medium is already developed.

6. A camera according to claim 5, wherein said first determination device includes means for determining whether the image recording medium contained in the image recording medium cartridge is already developed.

7. A camera according to claim 5, further comprising means for correcting, in accordance with a determination result provided by said lug-portion determination means, an index of the image recording medium cartridge which is different from the lug portion which indicates whether the image recording medium is already developed.

8. A camera according to claim 1, wherein said first determination device includes means for determining a bar code of the image recording medium cartridge indicating the state of use of the image recording medium contained in the image recording medium cartridge.

9. A camera according to claim 1, wherein said first determination device includes means for determining the state of use of the image recording medium contained in the image recording medium cartridge.

10. A camera according to claim 1, further comprising control means for controlling said camera in accordance with a determination result provided by said second determination device.

11. A camera according to claim 10, wherein said control means includes means for disabling said camera from performing a photographing operation, if said second determination device determines that the image recording medium is already developed.

12. A camera according to claim 1, further comprising means for disabling loading of the image recording medium cartridge from being completed, if said second determination device determines that the image recording medium is already developed.

13. A camera according to claim 1, further comprising means for disabling, if said second determination device determines that the image recording medium is already developed, outputting of a signal indicative of a completion of closing of a lid of a cartridge chamber into which to load the image recording medium cartridge.

14. A camera according to claim 1, wherein said first determination device determining the state of use of the image recording medium contained in the image recording medium cartridge after said second determination device has determined the image recording medium contained in the image recording medium cartridge is already developed.

15. A camera adapted to an image recording medium cartridge in which an image recording medium is contained, comprising:

(A) a prevention device for preventing re-photography of a photographed image recording medium contained in the image recording medium cartridge by determining a state of the image recording medium cartridge; and (B) an allowing device for allowing re-photography of the photographed image recording medium.

16. A camera according to claim 15, wherein said allowing device includes means for setting a multiple-photography mode.

17. A camera according to claim 15, wherein the image recording medium includes a film.

18. An apparatus adapted to an image recording medium cartridge in which an image recording medium is contained, comprising:

a first determination device which determines a state of use of the image recording medium contained in the image recording medium cartridge; and a second determination device which determines whether the image recording medium contained in the image recording medium cartridge is already developed, a determination of said second determination device having priority over a determination of said first determination device.

19. An apparatus according to claim 18, wherein the image recording medium includes a film.

20. An apparatus according to claim 18, wherein said second determination device includes means for determining an index indicating whether the image recording medium is already developed.

21. An apparatus according to claim 18, wherein said second determination device includes means for determining an index of the image recording medium cartridge, which index indicates whether the image recording medium is already developed.

22. An apparatus according to claim 18, wherein said second determination device includes lug-portion determination means for determining a state of a lug portion of the image recording medium cartridge, which lug portion indicates whether the image recording medium is already developed.

23. An apparatus according to claim 22, wherein said first determination device includes means for determining whether the image recording medium contained in the image recording medium cartridge is already developed.

24. An apparatus according to claim 22, further comprising means for correcting, in accordance with a determination result provided by said lug-portion determination means, an index of the image recording medium cartridge which is different from the lug portion which indicates whether the image recording medium is already developed.

25. An apparatus according to claim 18, wherein said first determination device includes means for determining a bar code of the image recording medium cartridge indicating the state of use of the image recording medium contained in the image recording medium cartridge.

26. An apparatus according to claim 18, wherein said first determination device includes means for determining the state of use of the image recording medium contained in the image recording medium cartridge.

27. An apparatus according to claim 18, further comprising control means for controlling said camera in accordance with a determination result provided by said second determination device.

28. An apparatus according to claim 27, wherein said control means includes means for disabling said camera from performing a photographing operation, if said second determination device determines that the image recording medium is already developed.

29. An apparatus according to claim 18, further comprising means for disabling loading of the image recording medium cartridge from being completed, if said second determination device determines that the image recording medium is already developed.

30. An apparatus according to claim 18, further comprising means for disabling, if said second determination device determines that the image recording medium is already developed, outputting of a signal indicative of a completion of closing of a lid of a cartridge chamber into which to load the image recording medium cartridge.

31. An apparatus according to claim 18, wherein said first determination device determining the state of use of the image recording medium contained in the image recording medium cartridge after said second determination device has determined the image recording medium contained in the image recording medium cartridge is already developed.

32. An apparatus adapted to an image recording medium cartridge in which an image recording medium is contained, comprising:

(A) a prevention device for preventing re-photography of a photographed image recording medium contained in the image recording medium cartridge by determining a state of the image recording medium cartridge; and (B) an allowing device for allowing re-photography of the photographed image recording medium.

33. An apparatus according to claim 32, wherein said allowing device includes means for setting a multiple-photography mode.

34. An apparatus according to claim 32, wherein the image recording medium includes a film.

* * * * *

UNITED STATES PATENT AND TRADEMARK OFFICE
CERTIFICATE OF CORRECTION

PATENT NO. : 5,687,414
DATED : November 11, 1997
INVENTOR(S): Haraguchi et al.

It is certified that error appears in the above-identified patent and that said Letters Patent is hereby corrected as shown below:

Col. 6, line 24, delete "looking" and insert -- locking --.

Col. 21, line 17, delete "101b" and insert -- 101h --.

Signed and Sealed this

Seventh Day of April, 1998

Attest:

BRUCE LEHMAN

Attesting Officer

Commissioner of Patents and Trademarks